(12) United States Patent
Sun

(10) Patent No.: US 12,225,187 B2
(45) Date of Patent: *Feb. 11, 2025

(54) METHOD, APPARATUS AND DEVICE FOR CODING AND DECODING

(71) Applicant: HANGZHOU HIKVISION DIGITAL TECHNOLOGY CO., LTD., Zhejiang (CN)

(72) Inventor: Yucheng Sun, Zhejiang (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 311 days.

This patent is subject to a terminal disclaimer.

(21) Appl. No.: 17/914,317

(22) PCT Filed: Mar. 23, 2021

(86) PCT No.: PCT/CN2021/082465
§ 371 (c)(1),
(2) Date: Sep. 23, 2022

(87) PCT Pub. No.: WO2021/190515
PCT Pub. Date: Sep. 30, 2021

(65) Prior Publication Data
US 2023/0353723 A1    Nov. 2, 2023

(30) Foreign Application Priority Data

Mar. 25, 2020   (CN) ........................ 202010220130.1

(51) Int. Cl.
H04N 19/105    (2014.01)
H04N 19/137    (2014.01)
(Continued)

(52) U.S. Cl.
CPC ......... *H04N 19/105* (2014.11); *H04N 19/137* (2014.11); *H04N 19/176* (2014.11); *H04N 19/46* (2014.11)

(58) Field of Classification Search
CPC .............. H04N 19/105; H04N 19/137; H04N 19/159; H04N 19/167; H04N 19/176; H04N 19/46; H04N 19/523
See application file for complete search history.

(56) References Cited

U.S. PATENT DOCUMENTS 6,320,676 B1    11/2001   Yoshidome
9,609,343 B1    3/2017    Chen et al.
(Continued)

FOREIGN PATENT DOCUMENTS

CN    101502120    8/2009
CN    104539967    4/2015
(Continued)

OTHER PUBLICATIONS

"Generalized Bi-prediction Method for Future Video Coding"—Chen et al., 978-1-5090-5966-9/16/$31.00 A © 2016 IEEE (Year: 2016).*

(Continued)

*Primary Examiner* — Mainul Hasan
(74) *Attorney, Agent, or Firm* — Ladas & Parry, LLP

(57) ABSTRACT

The present disclosure provides methods, apparatuses and devices for coding and decoding. When determining to enable a weighted prediction for a current block, the method includes: for the current block, obtaining a weighted prediction angle of the current block; for each pixel position of the current block, determining a surrounding matching position pointed by the pixel position from surrounding positions outside the current block based on the weighted prediction angle of the current block; determining a target weight value (Continued)

of the pixel position based on a reference weight value associated with the surrounding matching position; determining an association weight value of the pixel position based on the target weight value of the pixel position; determining a first prediction value of the pixel position based on a first prediction mode of the current block; determining a second prediction value of the pixel position based on a second prediction mode of the current block; and based on the first prediction value, the target weight value, the second prediction value and the association weight value, determining a weighted prediction value of the pixel position; and determining weighted prediction values of the current block based on the weighted prediction values of all pixel positions of the current block.

18 Claims, 9 Drawing Sheets

(51) Int. Cl.
    *H04N 19/176*   (2014.01)
    *H04N 19/46*    (2014.01)

(56) References Cited

U.S. PATENT DOCUMENTS

| | | | |
|---|---|---|---|
| 2012/0207214 | A1 | 8/2012 | Zhou et al. |
| 2013/0114716 | A1* | 5/2013 | Gao ............... H04N 19/182 375/240.14 |
| 2017/0347094 | A1 | 11/2017 | Su et al. |
| 2017/0347102 | A1 | 11/2017 | Panusopone et al. |
| 2018/0184110 | A1 | 6/2018 | Panusopone et al. |
| 2018/0288245 | A1 | 10/2018 | Oguma |
| 2018/0288425 | A1 | 10/2018 | Panusopone et al. |
| 2018/0332303 | A1 | 11/2018 | Young |
| 2019/0014316 | A1* | 1/2019 | Panusopone ......... H04N 19/159 |
| 2019/0124339 | A1 | 4/2019 | Young |
| 2020/0077110 | A1 | 3/2020 | Zhang et al. |
| 2020/0213593 | A1* | 7/2020 | Chiang ............... H04N 19/513 |
| 2021/0227212 | A1* | 7/2021 | Lee .................. H04N 19/105 |
| 2021/0235072 | A1* | 7/2021 | Ko .................... H04N 19/52 |
| 2022/0224910 | A1* | 7/2022 | Huo .................. H04N 19/46 |
| 2022/0272373 | A1* | 8/2022 | Moon ................ H04N 19/513 |

FOREIGN PATENT DOCUMENTS

| | | | |
|---|---|---|---|
| CN | 108781283 | | 11/2018 |
| CN | 109803145 | | 5/2019 |
| CN | 109862369 | | 6/2019 |
| CN | 109996081 | A | 7/2019 |
| CN | 110121073 | A | 8/2019 |
| CN | 110225346 | | 9/2019 |
| CN | 110312132 | A | 10/2019 |
| JP | 7375224 | B2 | 11/2023 |
| RU | 2571550 | C2 | 12/2015 |
| WO | WO-2020057648 | A1 * | 3/2020 ........... H04N 19/105 |
| WO | WO-2020098782 | A1 * | 5/2020 ........... H04N 19/103 |

OTHER PUBLICATIONS

"Rotational Weighted Averaged Template Matching for Intra Prediction"—Zhang et al., 978-1-7281-2940-2/19/$31.00 A © 2019 IEEE (Year: 2019).*
"A Novel Motion Compensated Prediction Framework Using Weighted AMVP Prediction for HEVC"—Yu et al., 2013 Visual Communications and Image Processing (VCIP); Date of Conference: Nov. 17-20, 2013 (Year: 2013).*
State Intellectual Property Office of the People's Republic of China, Office Action and Search Report Issued in Application No. 2021111527899, Oct. 14, 2022, 6 pages. (Submitted with Machine Translation).
European Patent Office, Extended European Search Report Issued in Application No. 21774249.3, Aug. 3, 2023, Germany, 14 pages.
Australian Patent Office, Office Action Issued in Application No. 2021243002, May 18, 2023, 3 pages.
Russian Patent Office, Office Action Issued in Application No. 2022123523, May 2, 2023, 14 pages. (Submitted with Machine Translation).
Liang Zhao et al, Non-CE: Weighted intra and inter prediction mode,Joint Video Experts Team (JVET) of ITU-T SG 16 WP 3 and ISO/IEC JTC 1/SC 29/WG 11, JVET-O0537,15th Meeting: Gothenburg, SE, Jul. 3-12, 2019, 6 pages.
Geert Van der Auwera et al, Extension of Simplified PDPC to Diagonal Intra Modes,Joint Video Experts Team (JVET), of ITU-T SG 16 WP 3 and ISO/IEC JTC 1/SC 29/WG 11, JVET-J0069, 10th Meeting: San Diego, USA, Apr. 10-20, 2018, 5 pages.
Yucheng Sun,CE4-related: On simplification for GEO weight derivation,Joint Video Experts Team (JVET) of ITU-T SG 16 WP 3 and ISO/IEC JTC 1/SC 29/WG 11, JVET-Q0312-v3,17th Meeting: Brussels, BE, Jan. 7-17, 2020, 7 pages.
Semih Esenlik et al, Non-CE4: Geometrical partitioning for inter blocks,Joint Video Experts Team (JVET) of ITU-T SG 16 WP 3 and ISO/IEC JTC 1/SC 29/WG 11, JVET-O0489, 15th Meeting: Gothenburg, SE, Jul. 3-12, 2019,9 pages.
Ru-Ling Liao et al, CE4-related: Unification of triangle partition mode and geometric merge mode,Joint Video Experts Team (JVET) of ITU-T SG 16 WP 3 and ISO/IEC JTC 1/SC 29/WG 11, JVET-P0305-v2,16th Meeting: Geneva, CH, Oct. 1-11, 2019, 7 pages.
Han Gao, et al.,"CE4: CE4-1.1, CE4-1.2 and CE4-1.14: Geometric Merge Mode (GEO)", Document: JVET-P0068-v2, JVET-P0068 (version 2), Joint Video Experts Team (JVET) of ITU-T SG 16 WP 3 and ISO/IEC JTC 1/SC 29/WG 11, Sep. 25, 2019, pp. 1-7.
Ru-Ling Liao, et al.,"CE10.3.1.b: Triangular prediction unit mode", Document: JVET-L0124-v2, [online], JVET-L0124 (version 2), Joint Video Exploration Team (JVET) of ITU-T SG 16 WP 3 and ISO/IEC JTC 1/SC 29/WG 11,Oct. 5, 2018, pp. 1-8.
Shohei Matsuo et al, "A Study on Enhancement of HEVC Intra Prediction Using Weight Function",Information Processing Society of Japan and the Institute of Electronics,Information and Communication Engineers, FIT2013, Aug. 20, 2023, pp. 7-10. (Submitted with Machine Translation).
Yucheng Sun, et al., "Angular weighted prediction for next-generation video coding standard", Proceedings of 2021 IEEE International Conference on Multimedia and Expo (ICME) IEEE Jun. 9, 2021 ISBN: 978-1-6654-3864-3, <DOI: 0.1109/ICME51207.2021.9428315>.
Shohei Matsuo et al., AHG7: Modification of intra angular prediction blending, Joint Collaborative Team on Video Coding (JCT-VC) of ITU-T SG 16 WP3 and ISO/IEC JTC 1/SC 29/WG 11, JCTVC-L0128, 12th Meeting: Geneva, Jan. 14-23, 2013.
Office Action in European patent Application No. 21774249.3, issued on Sep. 3, 2024.
Office Action in Indian patent Application No. 202217055632, issued on Mar. 22, 2024.
Office Action in Japanese patent Application No. 2023-182712, issued on Aug. 13, 2024.
International Search Report for PCT/CN2021/082465 mailed on Jun. 22, 2021 and its English translation provided by WIPO.
Written Opinion of the International Searching Authority for PCT/CN2021/082465 mailed on Jun. 22, 2021 and its English translation provided by Google Translate.
Krit Panusopone et al., "Weighted Angular Prediction,", Joint Video Exploration Team (JVET) of ITU-T SG 16 WP 3 and ISO/IEC JTC 1/SC 29/WG 11, 6th Meeting, JVET-F0104, Apr. 4, 2017, all pages.

* cited by examiner

METHOD, APPARATUS AND DEVICE FOR CODING AND DECODING

CROSS-REFERENCE TO RELATED APPLICATIONS

The present application is a U.S. National Application of International application No. PCT/CN2021/082465 filed on Mar. 23, 2021, which claims a priority to the Chinese patent application No. 202010220130.1 filed on Mar. 25, 2020, the disclosures of which are incorporated herein by reference in their entireties for all purposes.

TECHNICAL FIELD

The present disclosure relates to methods, apparatuses and devices for coding and decoding.

BACKGROUND

For achieving the purpose of saving spaces, videos or images are transmitted after being coded. A video coding method may include processes such as prediction, transform, quantization, entropy coding, filtering and so on. Prediction coding may include intra coding and inter coding. Further, the inter coding refers to an operation of utilizing a temporal correlation of a video to predict current pixels of a current picture by using pixels of a neighbouring coded picture, so as to achieve the purpose of effectively removing temporal redundancy of the video. The intra coding refers to an operation of utilizing a spatial correlation of a video to predict current pixels by using pixels of one or more coded blocks of the current picture, so as to achieve the purpose of effectively removing spatial redundancy of the video.

SUMMARY

The present disclosure provides methods, apparatuses and devices for coding and decoding.

The present disclosure provides a coding and decoding method. When determining to enable a weighted prediction for a current block, the method includes: for the current block, obtaining a weighted prediction angle of the current block; for each pixel position of the current block, determining a surrounding matching position pointed by the pixel position from surrounding positions outside the current block based on the weighted prediction angle of the current block; determining a target weight value of the pixel position based on a reference weight value associated with the surrounding matching position, determining an association weight value of the pixel position based on the target weight value of the pixel position; for each pixel position of the current block, determining a first prediction value of the pixel position based on a first prediction mode of the current block, determining a second prediction value of the pixel position based on a second prediction mode of the current block; and based on the first prediction value, the target weight value, the second prediction value and the association weight value, determining a weighted prediction value of the pixel position; and determining weighted prediction values of the current block based on the weighted prediction values of all pixel positions of the current block.

The present disclosure provides a coding apparatus, including a module configured to, when determining to enable a weighted prediction for a current block, obtain a weighted prediction angle of the current block for the current block; a module configured to, for each pixel position of the current block, determine a surrounding matching position pointed by the pixel position from surrounding positions outside the current block based on the weighted prediction angle of the current block; a module configured to determine a target weight value of the pixel position based on a reference weight value associated with the surrounding matching position, and determine an association weight value of the pixel position based on the target weight value of the pixel position; a module configured to, for each pixel position of the current block, determine a first prediction value of the pixel position based on a first prediction mode of the current block, determine a second prediction value of the pixel position based on a second prediction mode of the current block; and based on the first prediction value, the target weight value, the second prediction value and the association weight value, determine a weighted prediction value of the pixel position; and a module configured to determine weighted prediction values of the current block based on the weighted prediction values of all pixel positions of the current block.

The present disclosure provides a decoding apparatus, including a module configured to, when determining to enable a weighted prediction for a current block, obtain a weighted prediction angle of the current block for the current block; a module configured to, for each pixel position of the current block, determine a surrounding matching position pointed by the pixel position from surrounding positions outside the current block based on the weighted prediction angle of the current block; a module configured to determine a target weight value of the pixel position based on a reference weight value associated with the surrounding matching position, and determine an association weight value of the pixel position based on the target weight value of the pixel position; a module configured to, for each pixel position of the current block, determine a first prediction value of the pixel position based on a first prediction mode of the current block, determine a second prediction value of the pixel position based on a second prediction mode of the current block; and based on the first prediction value, the target weight value, the second prediction value and the association weight value, determine a weighted prediction value of the pixel position; and a module configured to determine weighted prediction values of the current block based on the weighted prediction values of all pixel positions of the current block.

The present disclosure provides a decoder-side device, including a processor and a machine readable storage medium, where the machine readable storage medium stores machine executable instructions executable by the processor. The processor is configured to execute the machine executable instructions to perform: when determining to enable a weighted prediction for a current block, for the current block, obtaining a weighted prediction angle of the current block; for each pixel position of the current block, determining a surrounding matching position pointed by the pixel position from surrounding positions outside the current block based on the weighted prediction angle of the current block; determining a target weight value of the pixel position based on a reference weight value associated with the surrounding matching position, determining an association weight value of the pixel position based on the target weight value of the pixel position; for each pixel position of the current block, determining a first prediction value of the pixel position based on a first prediction mode of the current block, determining a second prediction value of the pixel position based on a second prediction mode of the current block; and based on the first prediction value, the target weight value, the second prediction value and the association weight value, determining a weighted prediction value of the pixel position; and determining weighted prediction values of the current block based on the weighted prediction values of all pixel positions of the current block.

The present disclosure provides a coder-side device, including a processor and a machine readable storage medium, where the machine readable storage medium stores machine executable instructions executable by the processor. The processor is configured to execute the machine executable instructions to perform: when determining to enable a weighted prediction for a current block, for the current block, obtaining a weighted prediction angle of the current block; for each pixel position of the current block, determining a surrounding matching position pointed by the pixel position from surrounding positions outside the current block based on the weighted prediction angle of the current block; determining a target weight value of the pixel position based on a reference weight value associated with the surrounding matching position, determining an association weight value of the pixel position based on the target weight value of the pixel position; for each pixel position of the current block, determining a first prediction value of the pixel position based on a first prediction mode of the current block, determining a second prediction value of the pixel position based on a second prediction mode of the current block; and based on the first prediction value, the target weight value, the second prediction value and the association weight value, determining a weighted prediction value of the pixel position; and determining weighted prediction values of the current block based on the weighted prediction values of all pixel positions of the current block.

As described above, in the embodiments of the present disclosure, an effective manner of setting weight values is provided, in which a reasonable target weight value is set for each pixel position of the current block, such that the prediction values of the current block are more approximate to raw pixels, thus improving the prediction accuracy, prediction performance and coding performance.

DETAILED DESCRIPTION

Figure 1:
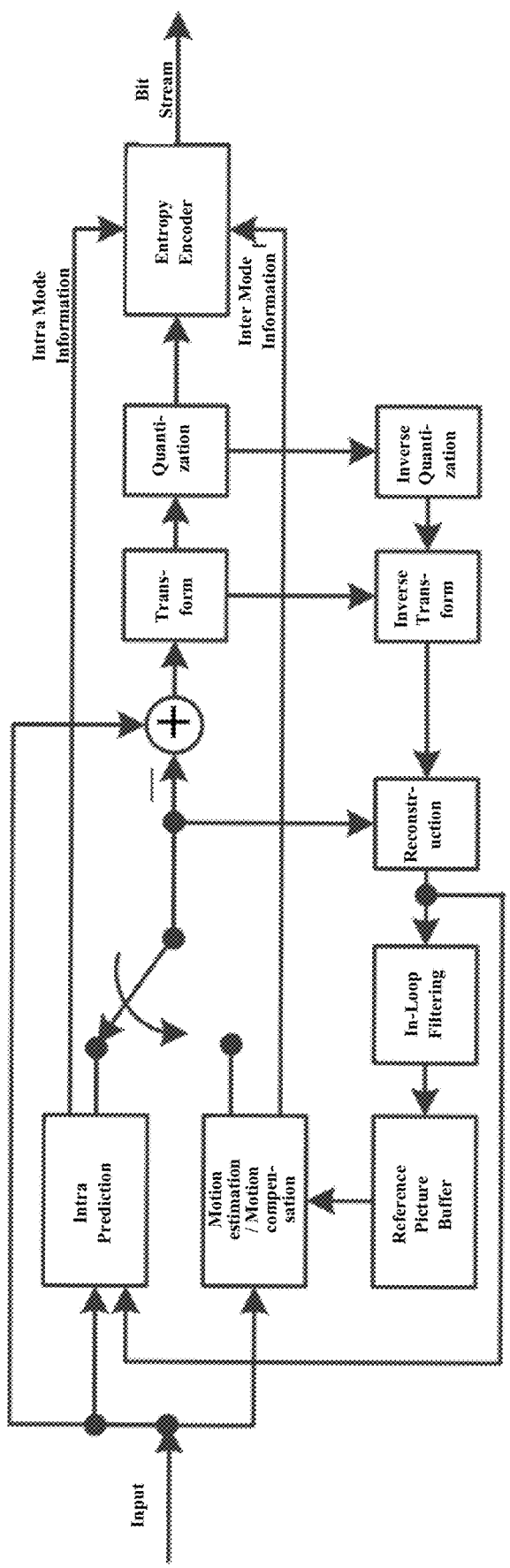
FIG. 1 is a schematic diagram of a framework of a video coding system.

Terms used herein are used to only describe a particular embodiment rather than limit the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items. It is noted that, although the terms "first," "second," "third," and the like may be used in the present disclosure to describe various information, such information should not be limited to these terms. These terms are only used to distinguish one category of information from another. For example, without departing from the range of the present disclosure, first information may be referred as second information; and similarly, the second information may also be referred as the first information. Depending on the context, the term "if" as used herein may be interpreted as "when" or "upon" or "in response to determining".

The present disclosure provides methods, apparatuses and devices for coding and decoding, which may involve the following concepts: intra prediction, inter prediction, and Intra Block Copy (IBC) prediction.

Intra prediction uses a spatial correlation of a video to predict a current pixel by using pixels of one or more coded blocks of a current picture, so as to remove spatial redundancy of the video. The intra prediction specifies multiple prediction modes, each of the prediction modes corresponds to one texture direction (except for a Direct Current (DC) mode). For example, if the texture of the picture is in horizontal direction, using a horizontal prediction mode may better predict picture information.

Inter prediction uses pixels of neighbouring coded picture(s) to predict pixels of a current picture based on temporal correlation of a video due to strong temporal correlation included in a video sequence, so as to effectively remove temporal redundancy of the video. The inter prediction part of video coding standards adopts a block-based motion compensation technology, in which a best matching block is found for each pixel block of the current picture in one or more previously-coded pictures. This process is referred to as Motion Estimation (ME).

The intra block copy allows referencing a same slice, where reference data of a current block comes from the same slice. In the intra block copy technology, a prediction value of the current block may be obtained by using a block vector of the current block. Illustratively, based on a characteristic that a large number of recurring textures within a same slice in a screen content, when the prediction value of the current block is obtained by using the block vector, the compression efficiency of the screen content sequence can be improved.

Prediction pixel refers to a pixel value derived from a coded/decoded pixel, and a residual is obtained based on difference between a raw pixel and a prediction pixel, and then a residual transform, quantization as well as coefficient coding are carried out. Inter prediction pixel refers to, for a current block, a pixel value derived from a reference picture, and since the pixel positions are discrete, interpolation operation is needed to obtain a final prediction pixel. The closer the prediction pixel is to the raw pixel, the smaller residual energy obtained by performing subtraction for both is, and the higher coding compression performance is.

Motion Vector (MV). In inter coding, a motion vector is used to represent a relative displacement between a current block of a current picture and a reference block of a reference picture. Each of divided blocks has a corresponding motion vector to be transmitted to a decoder-side. If the motion vector of each block is coded and transmitted independently, especially when there are a large number of smaller-sized blocks, more bits have to be consumed. To reduce the number of bits used to code the motion vector, spatial correlation among neighbouring blocks can be used to predict the motion vector of the current to-be-coded block based on the motion vector(s) of neighbouring coded block(s), and then a prediction difference is coded. Thus, the number of bits representing the motion vectors can be effectively reduced. Based on this, in the process of coding a motion vector of a current block, one or more motion vectors of one or more neighbouring coded blocks are firstly used to predict the motion vector of the current block, and then a Motion Vector Difference (MVD) between a Motion Vector Prediction (MVP) value and a real estimation value of the motion vector is coded.

Motion Information. Since a motion vector represents a position offset from a current block to a reference block, in order to accurately obtain information on an indicated block, in addition to the motion vector, index information on a reference picture is also needed to indicate which reference picture is used for the current block. In a video coding technology, for a current picture, a reference picture list can be established, and the index information on the reference picture indicates which reference picture listed in the reference picture list is used for the current block. In addition, many coding technologies also support multiple reference picture lists, so an index may also be used to indicate which reference picture list is used, and the index can be referred to as a reference direction. To sum up, in a video coding technology, information related to motion, such as the motion vector, the reference picture index information, and the reference direction, can be collectively referred to as motion information.

Block vector (BV). The block vector is applied in the intra block copy technology, which uses block vector for motion compensation, e.g., a prediction value of a current block is obtained by using the block vector. The block vector represents a relative displacement between the current block and a best matching block in coded block(s) of a current slice, which is different from the motion vector. Based on the characteristic that a large number of repeated textures are present in a same slice, when the prediction value of the current block is obtained by using the block vector, the compression efficiency can be improved.

Intra prediction mode. In the intra coding, the intra prediction mode is used to perform motion compensation, e.g., a prediction value of a current block is obtained by using the intra prediction mode. For example, the intra prediction mode may include but not limited to a Planar mode, a DC mode, and 33 angle modes. Referring to Table 1, it shows examples of the intra prediction mode, where the Planar mode corresponds to mode 0, the DC mode corresponds to mode 1, and the remaining 33 angle modes correspond to modes 2 to 34. The Planar mode is applicable to an area where pixel values change slowly, and uses two linear filters in the horizontal and vertical directions to take an average value of pixels in the two directions as a prediction value of the pixels of the current block. The DC mode is applicable to a large flat area, and takes an average value of surrounding pixels of the current block as a prediction value of the pixels of the current block. There are 33 angle modes available. A new generation coding and decoding standard VVC (Versatile Video Coding) adopts subdivided angle modes, for example, 65 angle modes.

TABLE 1

| Intra Prediction Mode | Intra Prediction Mode |
| --- | --- |
| 0 | Planar mode |
| 1 | DC mode |
| 2 . . . 34 | angular 2 . . . angular 34 |

Palette mode. In the palette mode, pixel values of a current block are represented by a small set of pixel values, that is, a palette. When a pixel value of a pixel position in the current block is close to a colour in the palette, the pixel position is coded with an index value of the corresponding colour in the palette. When the pixel value of the pixel position in the current block is not similar to all colours in the palette, the pixel position is to be coded with an "escape pixel" and the escape pixel is directly quantized and then coded into a bit stream. In a decoder-side, one palette is firstly obtained, for example, a palette storing {colour A, colour B, colour C}, and then whether each pixel position is coded as an escape pixel is determined. If a pixel position is not the escape pixel, an index of the pixel position is obtained from the bit stream and then a colour is obtained from the palette based on the index of the pixel position and assigned to the pixel position; otherwise, the escape pixel is parsed.

Rate-Distortion Optimization (RDO). There are two indicators for evaluating coding efficiency: bit rate and Peak Signal to Noise Ratio (PSNR). The smaller the bit stream is, the higher the compression rate is; and the higher the PSNR is, the better the quality of the reconstructed picture is. In a mode selection, a decision method is actually a comprehensive evaluation for both of them. For example, the cost corresponding to a mode can be calculated according to the following formula: $J(mode)=D+\lambda*R$, where D represents Distortion, usually measured by a Sum of Squared Errors (SSE), where SSE refers to a mean sum of square of differences between a reconstructed picture block and a source picture; $\lambda$ represents a Lagrangian multiplier; and R represents an actual number of bits needed for coding an picture block in this mode, including a total number of bits needed for coding mode information, motion information, residuals and the like. In the mode selection, if the RDO is used to make a comparative decision on coding modes, best coding performance can usually be guaranteed.

Framework of the video coding system. The framework of the video coding system shown in FIG. 1 may be used to perform the coder-side process in the embodiments of the present disclosure, and the framework of the video decoding system is similar to FIG. 1 and will not be repeated herein. The framework of the video decoding system may be used to perform the decoder-side process in the embodiments of the present disclosure. Illustratively, the framework of the video coding system and the framework of the video decoding system can include but not limited to an intra prediction module, a motion estimation/motion compensation module, a reference picture buffer, an in-loop filtering module, a reconstruction module, a transform module, a quantization module, an inverse transform module, an inverse quantization module, an entropy coder and the like. An encoder can perform the coder-side process through cooperation of these modules, and a decoder can perform the decoder-side process through cooperation of these modules.

Illustratively, a current block may be rectangular, while an edge of an object usually is not rectangular in practical situations. Therefore, for the edge of the object, there are usually two different entities (for example, the object presented in a foreground and a background and so on). When the motions of the two entities are inconsistent, the two entities cannot be well split based on rectangular partition. Therefore, the current block may be partitioned into two non-rectangular sub-blocks and a weighted prediction is performed on the two non-rectangular sub-blocks. Illustratively, the weighted prediction is to perform weighted operation based on multiple prediction values to obtain one or more final prediction values. The weighted prediction may include: Combined inter/intra Prediction, Combined inter/inter Prediction, Combined intra/intra Prediction, and so on. For the weight value(s) of the weighted prediction, the same weight value or different weight values may be set for all pixel positions of the current block.

Figure 2A:
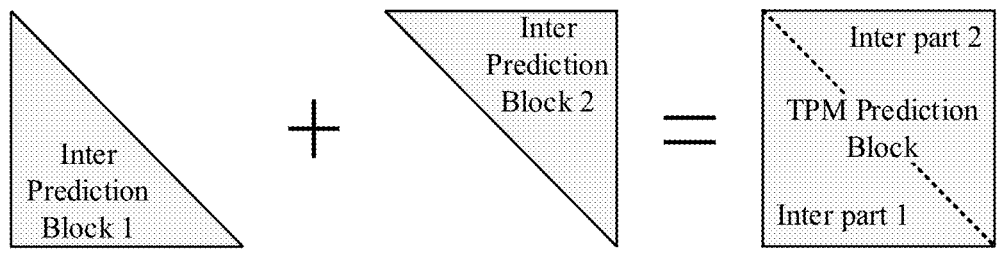
FIGS. 2A to 2C are schematic diagrams of a weighted prediction.

FIG. 2A is a schematic diagram illustrating a Triangular Partition Mode (TPM) of inter weighted prediction.

A TPM prediction block is obtained by combining an inter prediction block 1 (e.g., an inter prediction value 1 of multiple pixel positions is obtained by using the inter prediction mode) and an inter prediction block 2 (e.g., an inter prediction value 2 of multiple pixel positions is obtained by using the inter prediction mode). The TPM prediction block may be partitioned into two areas/parts, one area of which may be an inter area 1 and the other may be an inter area 2. The TPM prediction block may be rectangular and the two inter areas of the TPM prediction block may be non-rectangular and a boundary line between the two inter areas (as shown by a dotted line in FIG. 2B) may be a main diagonal or sub diagonal of the TPM prediction block.

Illustratively, each pixel position of the inter area 1 is mainly determined based on the inter prediction value of the inter prediction block 1. For example, an inter prediction value of the inter prediction block 1 of the pixel position and an inter prediction value of the inter prediction block 2 of the pixel position are weighted to obtain a combined prediction value of the pixel position, where the inter prediction value of the inter prediction block 1 has a larger weight value and the inter prediction value of the inter prediction block 2 has a smaller weight value or even 0. Each pixel position of the inter area 2 is mainly determined based on the inter prediction value of the inter prediction block 2. For example, an inter prediction value of the inter prediction block 1 of the pixel position and an inter prediction value of the inter prediction block 2 of the pixel position are weighted to obtain a combined prediction value of the pixel position, where the inter prediction value of the inter prediction block 2 has a larger weight value and the inter prediction value of the inter prediction block 1 has a smaller weight value or even 0. Finally, the combined prediction values of the pixel positions are combined to form the TPM prediction block.

Figure 2B:
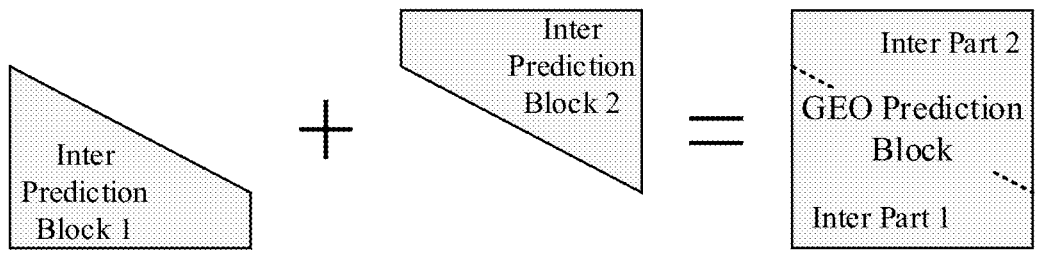

FIG. 2B is a schematic diagram illustrating a Geometrical partitioning for inter blocks (GEO) mode. The GEO mode is used to partition an inter prediction block into two sub-blocks by using one partition line. The GEO mode may adopt more partition directions, which is different from the TPM mode. The GEO mode is similar to the TPM mode in a weighted prediction process.

A GEO prediction block is obtained by combining an inter prediction block 1 (e.g., an inter prediction value 1 of multiple pixel positions is obtained using the inter prediction mode) and an inter prediction block 2 (e.g., an inter prediction value 2 of multiple pixel positions is obtained using the inter prediction mode). The GEO prediction block may be partitioned into two areas/parts, one area of which may be an inter area 1 and the other may be an inter area 2.

Illustratively, each pixel position of the inter area 1 is mainly determined based on the inter prediction value of the inter prediction block 1. For example, an inter prediction value of the inter prediction block 1 of the pixel position and an inter prediction value of the inter prediction block 2 of the pixel position are weighted to obtain a combined prediction value of the pixel position, where the inter prediction value of the inter prediction block 1 has a larger weight value and the inter prediction value of the inter prediction block 2 has a smaller weight value or even 0. Each pixel position of the inter area 2 is mainly determined based on the inter prediction value of the inter prediction block 2. For example, an inter prediction value of the inter prediction block 1 of the pixel position and an inter prediction value of the inter prediction block 2 of the pixel position are weighted to obtain a combined prediction value of the pixel position, where the inter prediction value of the inter prediction block 2 has a larger weight value and the inter prediction value of the inter prediction block 1 has a smaller weight value or even 0. Finally, the combined prediction values of the pixel positions are combined to form the GEO prediction block.

Figure 2C:
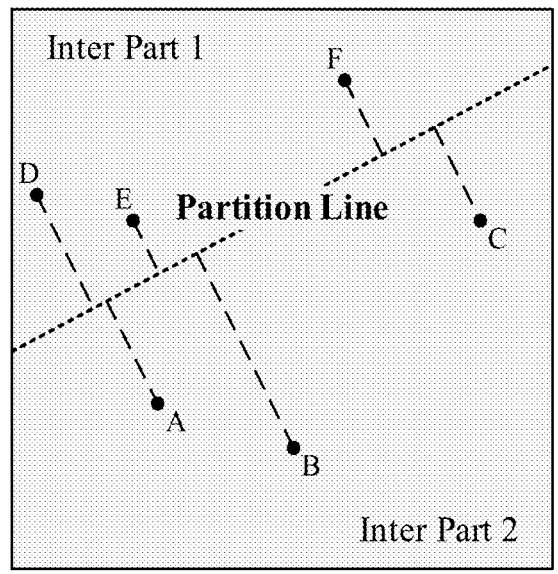

Illustratively, the weight values of the GEO prediction block are set with respect to a distance of the pixel position from the partition line. As shown in FIG. 2C, a pixel position A, a pixel position B and a pixel position C are located in a lower right side of the partition line, and a pixel position D, a pixel position E and a pixel position F are located in a upper left side of the partition line. For the pixel positions A, the pixel position B and the pixel position C, the weight values of the inter prediction block 2 are ranked as B≥A≥C and the weight values of the inter prediction block 1 are ranked as C≥A≥B. For the pixel positions D, the pixel position E and the pixel position F, the weight values of the inter prediction block 1 are ranked as D≥F≥E and the weight values of the inter prediction block 2 are ranked as E≥F≥D. The above manner needs to calculate the distance between the pixel position and the partition line and then determine the weight value of the pixel position.

For the above examples, to achieve a weighted prediction, one or more weight values of a prediction block corresponding to each pixel position of a current block is needed to be determined and the weighted prediction is performed based on the one or more weight values corresponding to each pixel position. But the setting of the one or more weight values depends on a partition line, and unreasonable setting of the one or more weight values may result in poor prediction effect and poor coding performance.

In view of this, embodiments of the present disclosure provide a manner of deriving one or more weight value. In this manner, based on reference weight values of surrounding positions outside the current block, a target weight value of each pixel position of the current block is determined, thus a more reasonable target weight value can be set for each pixel position. In this case, prediction values of the current block is more approximate to raw pixels, thereby improving prediction accuracy, prediction performance and coding performance.

The coding and decode method of the embodiments of the present disclosure will be detailed below in combination with several specific embodiments.

Figure 3:
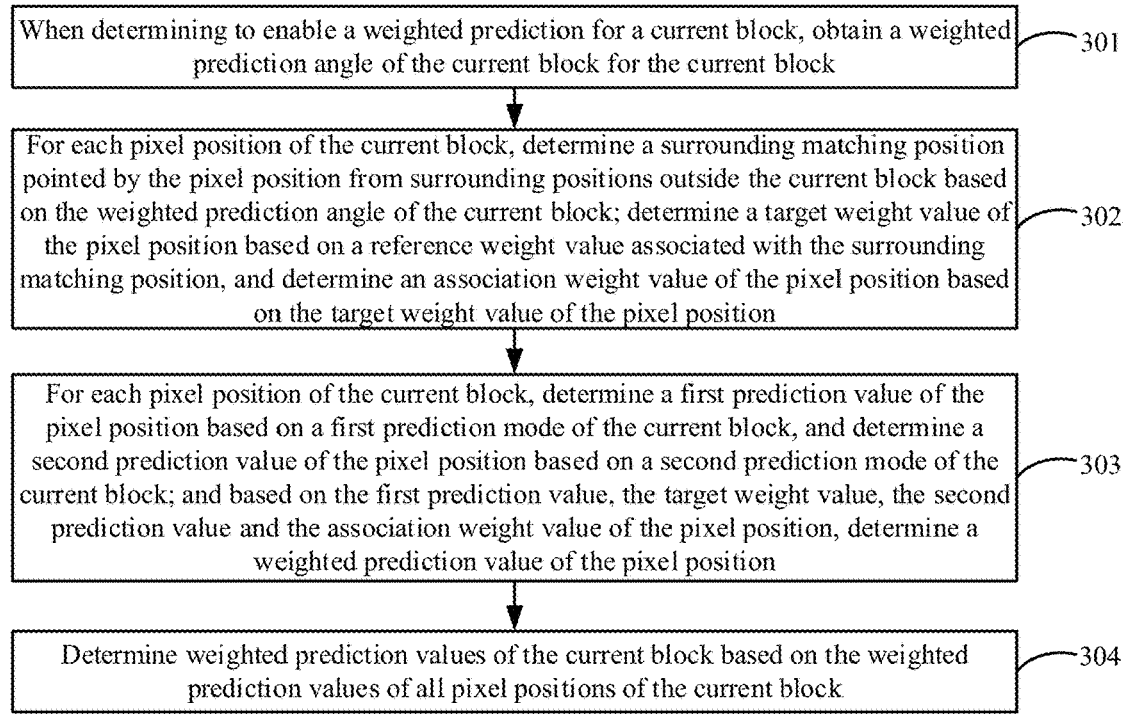
FIG. 3 is a flowchart illustrating a coding and decoding method according to an embodiment of the present disclosure.

Embodiment 1. FIG. 3 is a flowchart illustrating a coding and decoding method according to embodiments of the present disclosure. The coding and decoding method are applied to a decoder-side or a coder-side. The coding and decoding method includes the following steps 301-304.

At step 301, when determining to enable a weighted prediction for a current block, a weighted prediction angle of the current block is obtained for the current block.

In some examples, the current block may include one sub-block, that is, the sub-block is the current block itself. In this case, obtaining a weighted prediction angle of the sub-block means obtaining the weighted prediction angle of the current block.

Illustratively, when predicting the current block, the decoder-side or coder-side firstly determines whether to enable the weighted prediction for the current block. If it is determined to enable the weighted prediction for the current block, the weighted prediction angle of the current block is obtained by using the coding and decoding method of the embodiments of the present disclosure. If it is determined not to enable the weighted prediction for the current block, no limitation is made to related implementations in the embodiments of the present disclosure.

Illustratively, when determining to enable the weighted prediction for the current block, the weighted prediction angle of the current block is to be obtained, where weighted prediction angle refers to an angle direction pointed by a pixel position inside the current block. For example, the angle direction pointed by the pixel position inside the current block is determined based on a certain weighted prediction angle, where the angle direction points to a surrounding position outside the current block.

At step 302, for each pixel position of the current block, a surrounding matching position pointed by the pixel position is determined from surrounding positions outside the current block based on the weighted prediction angle of the current block; a target weight value of the pixel position is determined based on a reference weight value associated with the surrounding matching position; and an association weight value of the pixel position is determined based on the target weight value of the pixel position.

Illustratively, since the weighted prediction angle refers to an angle direction to which the pixel position inside the current block points, for each pixel position of the current block, an angle direction to which the pixel position points is determined based on the weighted prediction angle, and then, a surrounding matching position to which the pixel position points is determined from the surrounding positions outside the current block based on the angle direction.

For each pixel position of the current block, after the surrounding matching position to which the pixel position points is determined, a reference weight value associated with the surrounding matching position is determined, where the reference weight value associated with the surrounding matching position may be pre-configured or determined based on a strategy, which is not limited in the present disclosure as long as the surrounding matching position has an associated reference weight value.

Next, based on the reference weight value associated with the surrounding matching position, the target weight value of the pixel position is determined, for example, the reference weight value associated with the surrounding matching position may be determined as the target weight value of the pixel position.

After the target weight value of the pixel position is obtained, an association weight value of the pixel position may be determined based on the target weight value of the pixel position. For example, a sum of the target weight value and the association weight value of each pixel position may be a fixed preset value. Therefore, the association weight value may be difference between the preset value and the target weight value. Assuming that the preset value is 8 and the target weight value of the pixel position is 0, the association weight value of the pixel position is 8; assuming that the target weight value of the pixel position is 1, the association weight value of the pixel position is 7, and so on, as long as the sum of the target weight value and the association weight value is equal to 8.

At step 303, for each pixel position of the current block, a first prediction value of the pixel position is determined based on a first prediction mode of the current block, a second prediction value of the pixel position is determined based on a second prediction mode of the current block; and based on the first prediction value, the target weight value, the second prediction value and the association weight value of the pixel position, a weighted prediction value of the pixel position is determined.

Illustratively, if the target weight value is a weight value corresponding to the first prediction mode and the association weight value is a weight value corresponding to the second prediction mode, the weighted prediction value of the pixel position may be: (the first prediction value of the pixel position*the target weight value of the pixel position+ the second prediction value of the pixel position*the association weight value of the pixel position)/the fixed preset value.

In addition, if the target weight value is a weight value corresponding to the second prediction mode, and the association weight value is a weight value corresponding to the first prediction mode, the weighted prediction value of the pixel position may be: (the second prediction value of the pixel position*the target weight value of the pixel position+ the first prediction value of the pixel position*the association weight value of the pixel position)/the fixed preset value.

At step 304, weighted prediction values of the current block are determined based on the weighted prediction values of all pixel positions of the current block.

For example, for the current block, the weighted prediction values of all pixel positions of the current block are formed into the weighted prediction values of the current block.

As described above, in the embodiments of the present disclosure, an effective manner of setting weight values is provided, in which a reasonable target weight value is set for each pixel position of the current block, such that the prediction values of the current block are more approximate to raw pixels, thereby improving the prediction accuracy, prediction performance and coding performance.

Figure 4A:
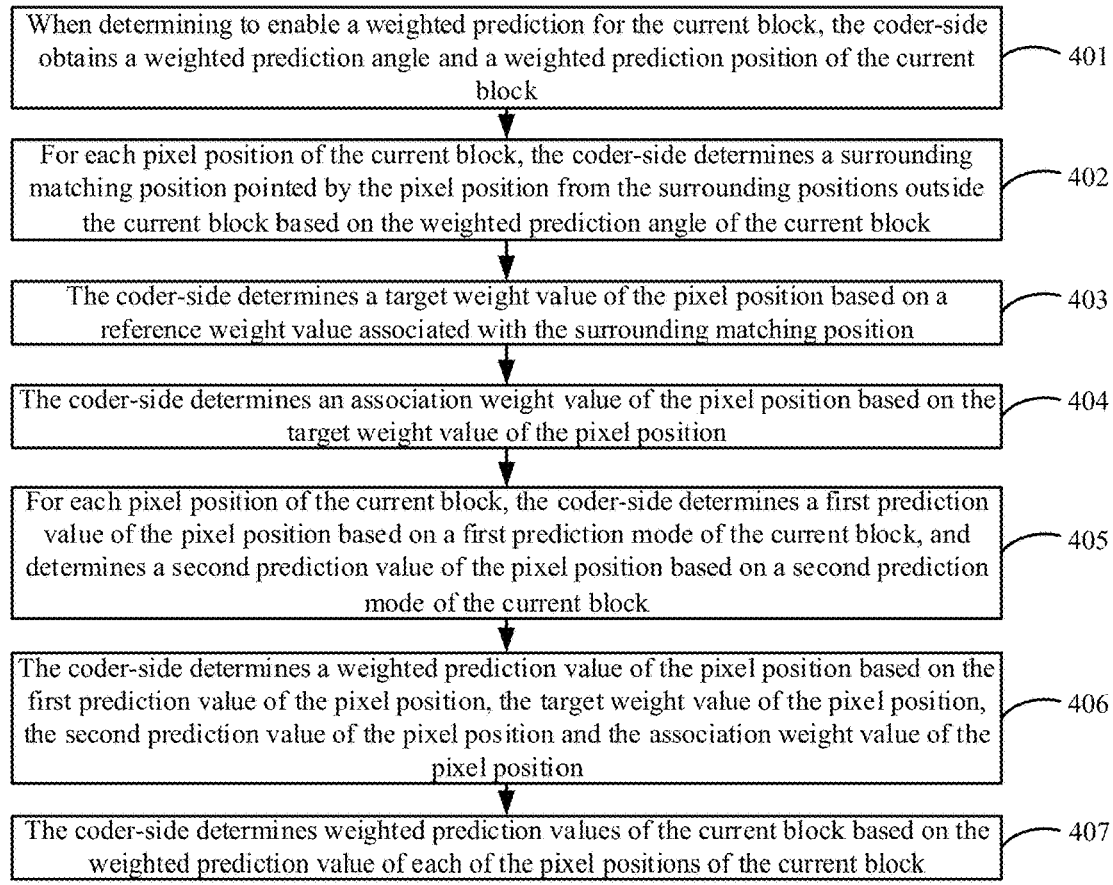
FIG. 4A is a flowchart illustrating a coding method according to an embodiment of the present disclosure.

Embodiment 2. In embodiment 1, the current block may include one sub-block, that is, the sub-block is the current block itself. For the current block, as shown in FIG. 4A which is a schematic diagram illustrating a flowchart of the coding method. The method is applied to a coder-side and includes the following steps 401 to 407.

At step 401, when determining to enable a weighted prediction for the current block, the coder-side obtains a weighted prediction angle and a weighted prediction position of the current block.

Illustratively, the coder-side needs to determine whether to allow the weighted prediction to be enabled for the current block. If the coder-side determines that allowing the weighted prediction to be enabled for the current block, the weighted prediction angle and the weighted prediction position of the current block are obtained and subsequent steps are performed, otherwise, the processing manner is not limited in the present disclosure.

In a possible implementation, if the current block satisfies a condition for enabling the weighted prediction, the coder-side may determine that the weighted prediction is to be enabled for the current block. If the current block does not satisfy the condition for enabling the weighted prediction, the coder-side may determine that the weighted prediction is not to be enabled for the current block. For example, the coder-side may determine whether feature information of the current block satisfies a specific condition. If the feature information of the current block satisfies the specific condition, it is determined to enable the weighted prediction for the current block, and if not, it is determined not to enable the weighted prediction for the current block.

Illustratively, the feature information includes but not limited to one or any combination of the followings: a slice type of a current slice where the current block is located, size information of the current block, and switching control information. The switching control information may include but not limited to: sequence level (e.g., Sequence Parameter Set (SPS) and Sequence Header (SH)) switching control information, picture level (e.g., Picture Parameter Set (PPS) and Picture Header (PH)) switching control information, slice level (e.g., Slice, Tile and Patch) switching control information, or Largest Coding Unit level (e.g., Largest Coding Unit (LCU) and Coding Tree Unit (CTU)) switching control information.

For example, if the feature information is the slice type of the current slice where the current block is located, the slice type of the current slice where the current block is located satisfying the specific condition includes but not limited to: if the slice type of the current slice where the current block is located is a B slice, it is determined that the slice type satisfies the specific condition; or, if the slice type of the current slice where the current block is located is an I slice, it is determined that the slice type satisfies the specific condition.

For example, if the feature information is the size information of the current block, for example, width and height of the current block, the size information of the current block satisfying the specific condition includes but not limited to: if the width is greater than or equal to a first value and the height is greater than or equal to a second value, it is determined that the size information of the current block satisfies the specific condition; or, if the width is greater than or equal to a third value, the height is greater than or equal to a fourth value, the width is less than or equal to a fifth value and the height is less than or equal to a sixth value, it is determined that the size information of the current block satisfies the specific condition; or, a product of the width and the height is greater than or equal to a seventh value, it is determined that the size information of the current block satisfies the specific condition. The above values may be configured based on experience, for example, configured as 8, 16, 32, 64 or 128 or the like, which is not limited herein. For example, the first value may be 8, the second value may be 8, the third value may be 8, the fourth value may be 8, the fifth value may be 64, the sixth value may be 64 and the seventh value may be 64. In this case, if the width is greater than or equal to 8 and the height is greater than or equal to 8, it is determined that the size information of the current block satisfies the specific condition; or, if the width is greater than or equal to 8, the height is greater than or equal to 8, the width is less than or equal to 64 and the height is less than or equal to 64, it is determined that the size information of the current block satisfies the specific condition; or, if the product of the width and the height is greater than or equal to 64, it is determined that the size information of the current block satisfies the specific condition. The above examples are only illustrative and not a limitation of the present disclosure.

For example, if the feature information is the size information of the current block, such as the width and the height of the current block, the size information of the current block satisfying the specific condition includes but not limited to: the width is not less than a and not greater than b, the height is not less than a and not greater than b, where a may be less than or equal to 16, and b may be greater than or equal to 16. For example, a is equal to 8 and b is equal to 64 or 32.

For example, if the feature information is the switching control information, the switching control information satisfying the specific condition includes but not limited to: if the switching control information is allowing the weighted prediction to be enabled for the current block, it is determined that the switching control information satisfies the specific condition.

For example, if the feature information is the slice type of the current slice where the current block is located and the size information of the current block, when the slice type satisfies the specific condition and the size information satisfies the specific condition, it is determined that the feature information of the current block satisfies the specific condition. If the feature information is the slice type of the current slice where the current block is located and the switching control information, when the slice type satisfies the specific condition and the switching control information satisfies the specific condition, it is determined that the feature information of the current block satisfies the specific condition. If the feature information is the size information of the current block and the switching control information, when the size information satisfies the specific condition and the switching control information satisfies the specific condition, it is determined that the feature information of the current block satisfies the specific condition. If the feature information is the slice type of the current slice where the current block is located, the size information of the current block and the switching control information, when the slice type, the size information and the switching control information all satisfy the specific conditions respectively, it is determined that the feature information of the current block satisfies the specific condition.

Figure 4B:
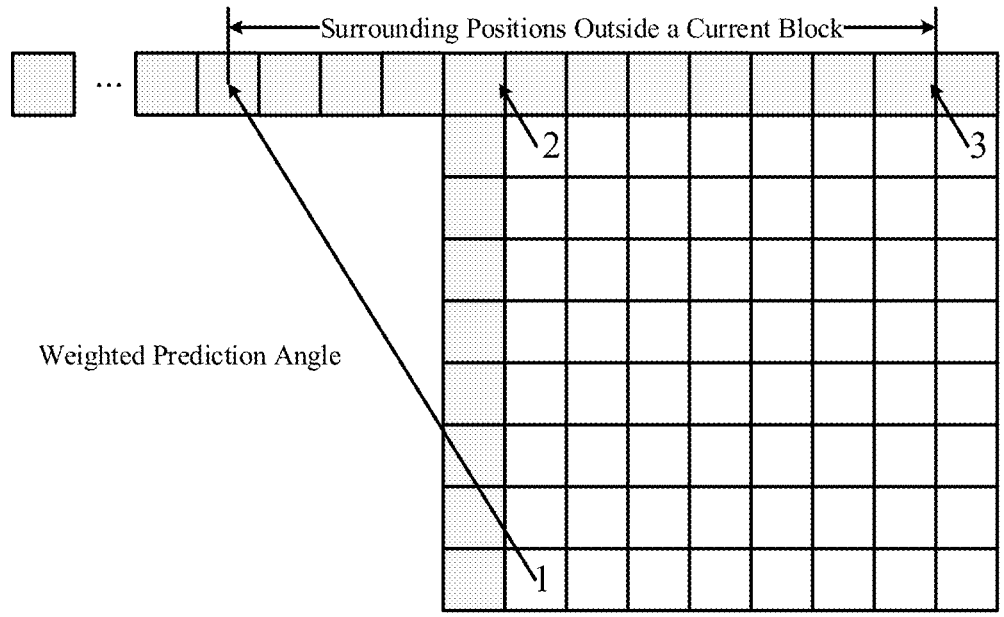
FIGS. 4B to 4E are schematic diagrams illustrating surrounding positions outside a current block.
Figure 4C:
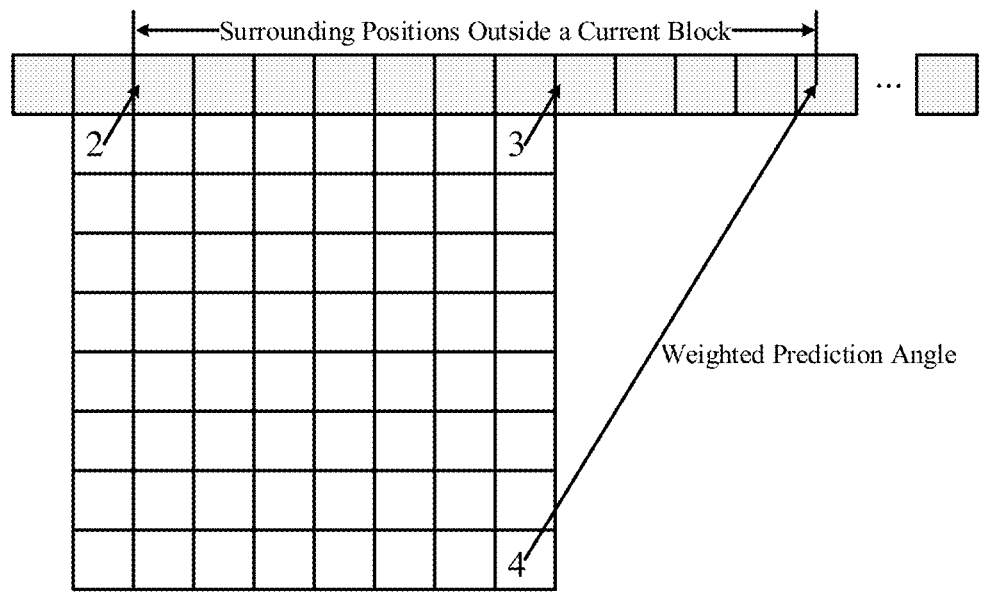

In a possible implementation, when determining to enable the weighted prediction for the current block, the coder-side obtains the weighted prediction angle and the weighted prediction position of the current block. As shown in FIG. 4B, based on a weighted prediction angle, an angle direction pointed by a pixel position (e.g., the pixel position 1, the pixel position 2 and the pixel position 3) inside the current block is shown, where the angle direction points to a surrounding position outside the current block. As shown in FIG. 4C, based on another weighted prediction angle, an angle direction pointed by a pixel position (e.g., the pixel position 2, the pixel position 3 and the pixel position 4)

inside the current block is shown, where the angle direction points to a surrounding position outside the current block.

The weighted prediction position (also called a distance parameter) is used to configure a reference weight value of a surrounding position outside the current block. For example, based on parameters such as the weighted prediction angle, a size of the current block and so on, a range of the surrounding positions outside the current block is determined, which is shown in FIGS. 4B and 4C. The range of the surrounding positions is equally divided into N parts where a value of N may be set arbitrarily, for example, may be set to 4, 6, or 8 or the like. The weighted prediction position is used to represent which surrounding position is used as a start position of a weight transform of the current block, such that the reference weight values of the surrounding positions outside the current block are configured based on the start position of the weight transform.

Figure 4D:
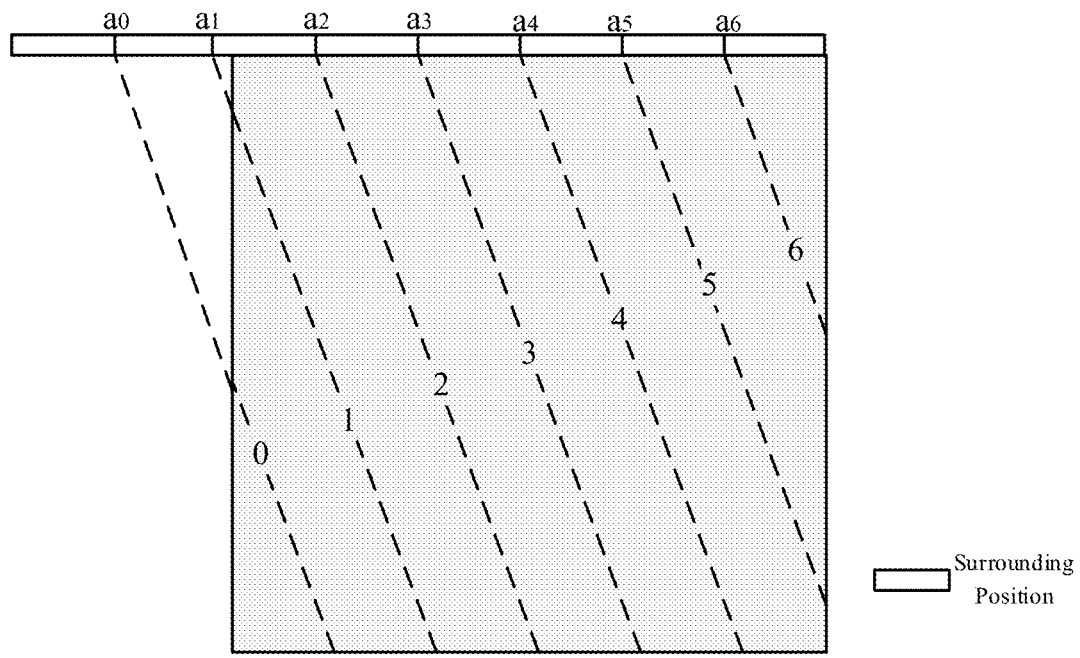

For example, descriptions are made with N=8. As shown in FIG. 4D, after all surrounding positions are partitioned into eight equal parts, seven weighted prediction positions can be obtained. When the weighted prediction position is 0, it indicates that the surrounding position $a_0$ (i.e., the surrounding position pointed by a dotted line 0. In practice, no dotted line 0 exists, and the dotted line 0 is used only to help understand the given examples. The dotted lines 0 to 6 are used to equally partition all surrounding positions into eight parts) serves as the start position of the weight transform of the current block. When the weighted prediction position is 1, it indicates that the surrounding position $a_1$ serves as the start position of the weight transform of the current block. By analogy, when the weighted prediction position is 6, it means that the surrounding position $a_6$ is used as the start position of the weight transform of the current block.

Illustratively, for different weighted prediction angles, values of N may be different. For example, for a weighted prediction angle A, the value of N may be 6, which indicates that the range of the surrounding positions determined based on the weighted prediction angle A is equally partitioned into six parts. For a weighted prediction angle B, the value of N may be 8, which indicates that the range of the surrounding positions determined based on the weighted prediction angle B is equally partitioned into eight parts.

For different weighted prediction angles, the values of N may be same. In a case of the same value of N, different numbers of weighted prediction positions may be selected. For example, for the weighted prediction angle A, the value of N is 8, which indicates that the range of the surrounding positions determined based on the weighted prediction angle A is equally partitioned into eight parts; and for the weighted prediction angle B, the value of N is 8 which indicates that the range of the surrounding positions determined based on the weighted prediction angle B is equally partitioned into eight parts. While, the weighted prediction positions corresponding to the weighted prediction angle A may be selected for a total of five positions from $a_1$ to $a_5$, and the weighted prediction positions corresponding to the weighted prediction angle B may be selected for a total of seven positions from $b_0$ to $b_6$.

Illustratively, for example, the range of the surrounding positions is equally partitioned into N parts as described above. In practice, an unequal division manner may also be adopted to partition the range of the surrounding positions into N parts rather than into N equal parts, which is not limited in the present disclosure.

Illustratively, after all surrounding positions are equally partitioned into eight parts, seven weighted prediction positions may be obtained. At step 401, the coder-side may obtain one weighted prediction position from the seven weighted prediction positions, or select some weighted prediction positions (e.g., five weighted prediction positions) from the seven weighted prediction positions and then obtain one weighted prediction position from the five weighted prediction positions.

Illustratively, the coder-side obtains the weighted prediction angle and the weighted prediction position of the current block in the following manners.

In a first manner, the coder-side and the decoder-side agree to take the same weighted prediction angle as the weighted prediction angle of the current block, and agree to take the same weighted prediction position as the weighted prediction position of the current block. For example, the coder-side and the decoder-side both take the weighted prediction angle A as the weighted prediction angle of the current block, and both take the weighted prediction position $a_4$ as the weighted prediction position of the current block.

In a second manner, the coder-side constructs a weighted prediction angle list which may include at least one weighted prediction angle, for example, the weighted prediction angle list may include the weighted prediction angle A and the weighted prediction angle B. The coder-side constructs a weighted prediction position list which may include at least one weighted prediction position, for example, the weighted prediction position list may include the weighted prediction positions $a_0$-$a_6$, the weighted prediction positions $b_0$-$b_6$, and so on. The coder-side traverses each weighted prediction angle in the weighted prediction angle list in sequence and traverses each weighted prediction position in the weighted prediction position list in sequence, that is, traverses a combination of each weighted prediction angle and each weighted prediction position. For each combination of the weighted prediction angle(s) and the weighted prediction position(s), a weighted prediction angle and a weighted prediction position in the combination may be taken as the weighted prediction angle and the weighted prediction position of the current block obtained at step 401, and steps 402 to 407 are performed based on the weighted prediction angle and the weighted prediction position to obtain a weighted prediction value of the current block.

For example, when the coder-side traverses to the weighted prediction angle A and the weighted prediction position $a_0$, the coder-side performs steps 402 to 407 based on the weighted prediction angle A and the weighted prediction position $a_0$ to obtain a weighted prediction value A-1 of the current block. When the coder-side traverses to the weighted prediction angle A and the weighted prediction position $a_1$, steps 402 to 407 are performed based on the weighted prediction angle A and the weighted prediction position $a_1$ to obtain a weighted prediction value A-2 of the current block. When the coder-side obtains the weighted prediction angle B and the weighted prediction position $b_0$ by traversal, steps 402 to 407 are performed based on the weighted prediction angle B and the weighted prediction position $b_0$ to obtain a weighted prediction value B-1 of the current block and so on. The coder-side can obtain a corresponding weighted prediction value based on each combination (each combination of weighted prediction angles and weighted prediction positions).

After obtaining all weighted prediction values based on the combination of weighted prediction angle(s) and weighted prediction position(s), the coder-side may determine an RDO cost value based on each weighted prediction value in any unlimited manner. The coder-side may obtain the RDO cost value of each combination and select a minimum RDO cost value from all RDO cost values.

Next, the coder-side takes a weighted prediction angle and a weighted prediction position in the combination corresponding to the minimum RDO cost value as a target weighted prediction angle and a target weighted prediction position of the current block respectively, and finally codes an index value of the target weighted prediction angle in the weighted prediction angle list and an index value of the target weighted prediction position in the weighted prediction position list into a bit stream. The specific implementation method of coding the index values into the bit stream can be referred to the application scenario shown in the second manner of the next embodiment.

The above manners are only illustrative and are not limited herein as long as the weighted prediction angle and the weighted prediction position of the current block can be obtained. For example, one weighted prediction angle may be selected randomly from the weighted prediction angle list as the weighted prediction angle of the current block and one weighted prediction position may be selected randomly from the weighted prediction position list as the weighted prediction position of the current block.

At step 402, for each pixel position of the current block, the coder-side determines a surrounding matching position pointed by the pixel position from the surrounding positions outside the current block based on the weighted prediction angle of the current block. For conveniences of distinguishing, in this embodiment, a surrounding position outside the current block pointed by the pixel position may be referred to as the surrounding matching position of the pixel position.

Illustratively, since the weighted prediction angle refers to an angle direction pointed by a pixel position inside the current block, for each pixel position of the current block, an angle direction pointed by the pixel position is determined based on the weighted prediction angle, and then a surrounding matching position pointed by the pixel position is determined from the surrounding positions outside the current block to which the pixel position belongs based on the angle direction.

Illustratively, the surrounding positions outside the current block may include surrounding positions at a row on the upper outside of the current block, for example, surrounding positions at a n1-st row on the upper outside of the current block, n1 may be 1 or 2, 3, etc., which is not limited herein; or, may include surrounding positions at a column on the left outside of the current block, for example, surrounding positions at a n2-nd column on the left outside of the current block, n2 may be 1, or 2, 3, etc., which is not limited herein; or, may include surrounding positions at a row on the lower outside of the current block, for example, surrounding positions at a n3-rd row on the lower outside of the current block, n3 may be 1, or 2, 3, etc., which is not limited herein; or, may include surrounding positions at a column on the right outside of the current block, for example, surrounding positions at a n4-th column on the right outside of the current block, n4 may be 1, or 2, 3 etc., which is not limited herein.

Above examples of surrounding positions are illustrative and not limited herein. In practice, in addition to the surrounding positions outside the current block, internal positions of the current block may also be used, that is, the internal positions of the current block are used to replace the above surrounding positions outside the current block, for example, the internal positions may include internal positions at a n5-th row inside the current block, n5 may be 1, or 2, 3, etc., or internal positions at a n6-th column inside the current block, where n6 may be 1, or 2, 3, etc. The length of the internal positions may exceed the range of the current block, for example, positions of a n7-th row may exceed the range of the current block, that is, extend outwardly from two sides of the current block.

The internal positions of the current block and the surrounding positions outside the current block may be used at the same time.

For using the internal positions of the current block, or using both the internal positions of the current block and the surrounding positions outside the current block, the current block may be partitioned into two sub-blocks, upper and lower, based on the row where the internal positions are located, or into two sub-blocks, left and right, based on the column where the internal positions are located. At this time, the two sub-blocks have the same weighted prediction angle and the same weighted prediction position.

Illustratively, the surrounding positions outside the current block may be located between pixel positions, e.g., at one or more sub-pixel positions, and for the case, the position of the current block cannot be simply described as the x-th row, but rather a sub-pixel position row located between the x-th row and the y-th row.

For convenience of description, in subsequent embodiments, the surrounding positions at the first row on the upper outside of the current block or the surrounding positions at the first column on the left outside of the current block are adopted as an example, and other surrounding positions may be implemented in a similar way.

Illustratively, for the range of the surrounding positions outside the current block, a range may be pre-designated as the range of the surrounding positions outside the current block. Or, the range of the surrounding positions outside the current block may be determined based on the weighted prediction angle, for example, a surrounding position pointed by each of the pixel positions inside the current block is determined based on the weighted prediction angle, and then the range of the surrounding positions outside the current block is determined based on a boundary of the surrounding positions pointed by all pixel positions. The range of the surrounding positions is not limited herein.

The surrounding positions outside the current block may include one or more integer pixel positions or one or more non-integer pixel positions. The non-integer pixel position may be a sub-pixel position, for example, ½ sub-pixel position, or ¼ sub-pixel position, or ¾ sub-pixel position or the like, which is not limited herein. In addition, the surrounding positions outside the current block may include both one or more integer pixel positions and one or more sub-pixel positions.

Illustratively, two surrounding positions outside the current block may correspond to one integer pixel position; or, four surrounding positions outside the current block may correspond to one integer pixel position; or, one surrounding position outside the current block may correspond to one integer pixel position; or, one surrounding position outside the current block may correspond to two integer pixel positions. The above are only several examples and not limited herein. The relationship between the surrounding position and the integer pixel position can be configured arbitrarily.

Figure 4E:
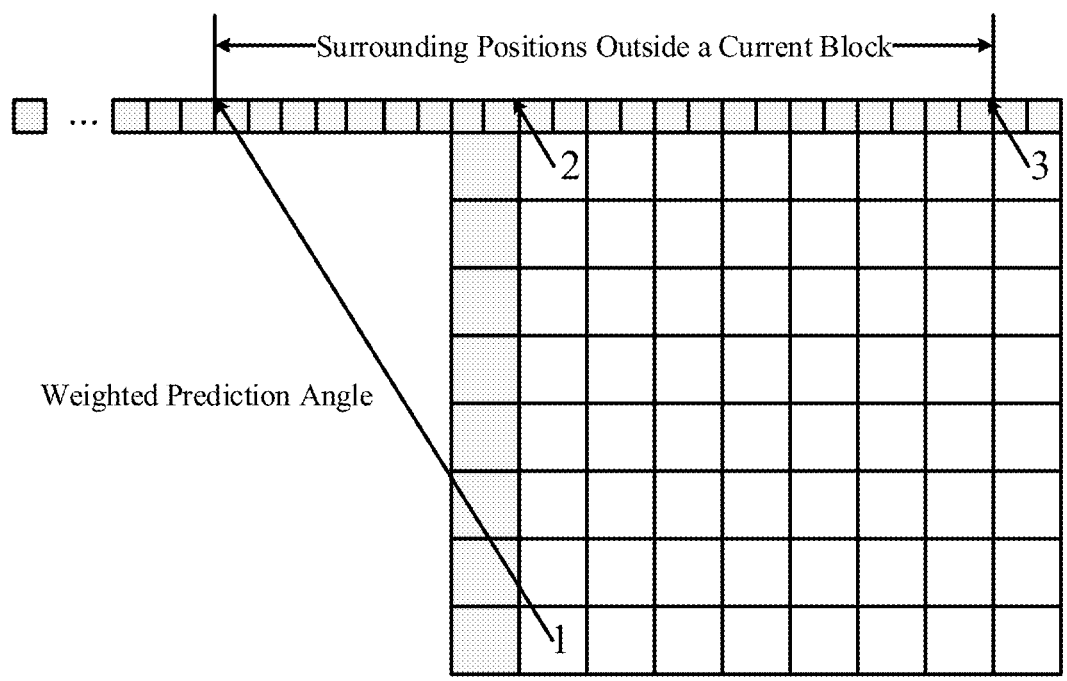

As shown in FIGS. 4B and 4C, one surrounding position corresponds to one integer pixel position, and as shown in FIG. 4E, two surrounding positions correspond to one integer pixel position. Other examples will not be redundantly described in this embodiment.

At step 403, the coder-side determines a target weight value of the pixel position based on a reference weight value associated with the surrounding matching position.

Illustratively, for each pixel position of the current block, after determining the surrounding matching position pointed by the pixel position, the coder-side determines the reference weight value associated with the surrounding matching position. The reference weight value associated with the surrounding matching position may be pre-configured, or determined based on a strategy where the specific determination manner may be referred to subsequent embodiments.

Next, the coder-side determines the target weight value of the pixel position based on the reference weight value associated with the surrounding matching position, for example, the reference weight value associated with the surrounding matching position may be determined as the target weight value of the pixel position.

Illustratively, one or more reference weight values may be set for the surrounding positions outside the current block. The specific process can be referred to subsequent embodiments. The surrounding positions outside the current block may be one or more integer pixel positions or one or more sub-pixel positions. For example, one or more reference weight values may be set for the one or more integer pixel positions outside the current block, and/or one or more reference weight value may be set for the one or more sub-pixel positions outside the current block.

In a possible implementation, the target weight value of the pixel position is determined based on the reference weight value associated with the surrounding matching position may include the following five cases. Case 1. If the surrounding matching position is an integer pixel position and the integer pixel position is set with a reference weight value, the target weight value of the pixel position may be determined based on the reference weight value of the integer pixel position. Case 2. If the surrounding matching position is an integer pixel position and the integer pixel position is not set with a reference weight value, the target weight value of the pixel position may be determined based on reference weight value(s) of neighbouring position(s) of the integer pixel position. For example, an upward rounding operation is performed for a reference weight value of a neighbouring position to obtain the target weight value of the pixel position; or, a downward rounding operation is performed for a reference weight value of a neighbouring position to obtain the target weight value of the pixel position; or, the target weight value of the pixel position is determined based on the interpolation of the reference weight values of the neighbouring positions of the integer pixel position. The determination manner is not limited herein. Case 3. If the surrounding matching position is a sub-pixel position and the sub-pixel position is set with a reference weight value, the target weight value of the pixel position is determined based on the reference weight value of the sub-pixel position. Case 4. If the surrounding matching position is a sub-pixel position and the sub-pixel position is not set with a reference weight value, the target weight value of the pixel position is determined based on one or more reference weight values of one or more neighbouring positions of the sub-pixel position. For example, an upward rounding operation is performed for a reference weight value of a neighbouring position to obtain the target weight value of the pixel position; or, a downward rounding operation is performed for a reference weight value of a neighbouring position to obtain the target weight value of the pixel position; or the target weight value of the pixel position is determined based on the interpolation of the reference weight values of the neighbouring positions of the sub-pixel position. The determination manner is not limited herein. Case 5, the target weight value of the pixel position is determined based on multiple reference weight values associated with the surrounding matching position. For example, regardless of whether the surrounding matching position is an integer pixel position or a sub-pixel position, reference weight values of multiple neighbouring positions of the surrounding matching position can be obtained. If the surrounding matching position is set with a reference weight value, a weighted operation is performed for the reference weight value of the surrounding matching position and the reference weight values of multiple neighbouring positions to obtain the target weight value of the pixel position. If the surrounding matching position is not set with a reference weight value, a weighted operation is performed for the reference weight values of multiple neighbouring positions to obtain the target weight value of the pixel position.

The above cases 1 to 5 are only examples and the manners of determining the target weight value are not limited herein.

At step 404, the coder-side determines an association weight value of the pixel position based on the target weight value of the pixel position.

At step 405, for each pixel position of the current block, the coder-side determines a first prediction value of the pixel position based on a first prediction mode of the current block, and determines a second prediction value of the pixel position based on a second prediction mode of the current block.

Illustratively, the first prediction mode may be any one of: an intra block copy prediction mode, an intra prediction mode, an inter prediction mode and a palette mode; and the second prediction mode may be any one of: the intra block copy prediction mode, the intra prediction mode, the inter prediction mode and the palette mode. For example, the first prediction mode may be the intra block copy prediction mode and the second prediction mode may be the intra block copy prediction mode; the first prediction mode may be the inter prediction mode and the second prediction mode may be the inter prediction mode, and so on.

A process of determining the prediction value based on the first prediction mode and the second prediction mode can be referred to the subsequent embodiments.

At step 406, the coder-side determines a weighted prediction value of the pixel position based on the first prediction value of the pixel position, the target weight value of the pixel position, the second prediction value of the pixel position and the association weight value of the pixel position.

At step 407, the coder-side determines weighted prediction values of the current block based on the weighted prediction value of each of the pixel positions of the current block.

As described above, in the embodiments of the present disclosure, an effective manner of setting weight values is provided to set a reasonable target weight value for each of the pixel positions of the current block, such that the prediction values of the current block are more closer to that of raw pixels, thus improving the prediction accuracy, prediction performance and coding performance.

Figure 4F:
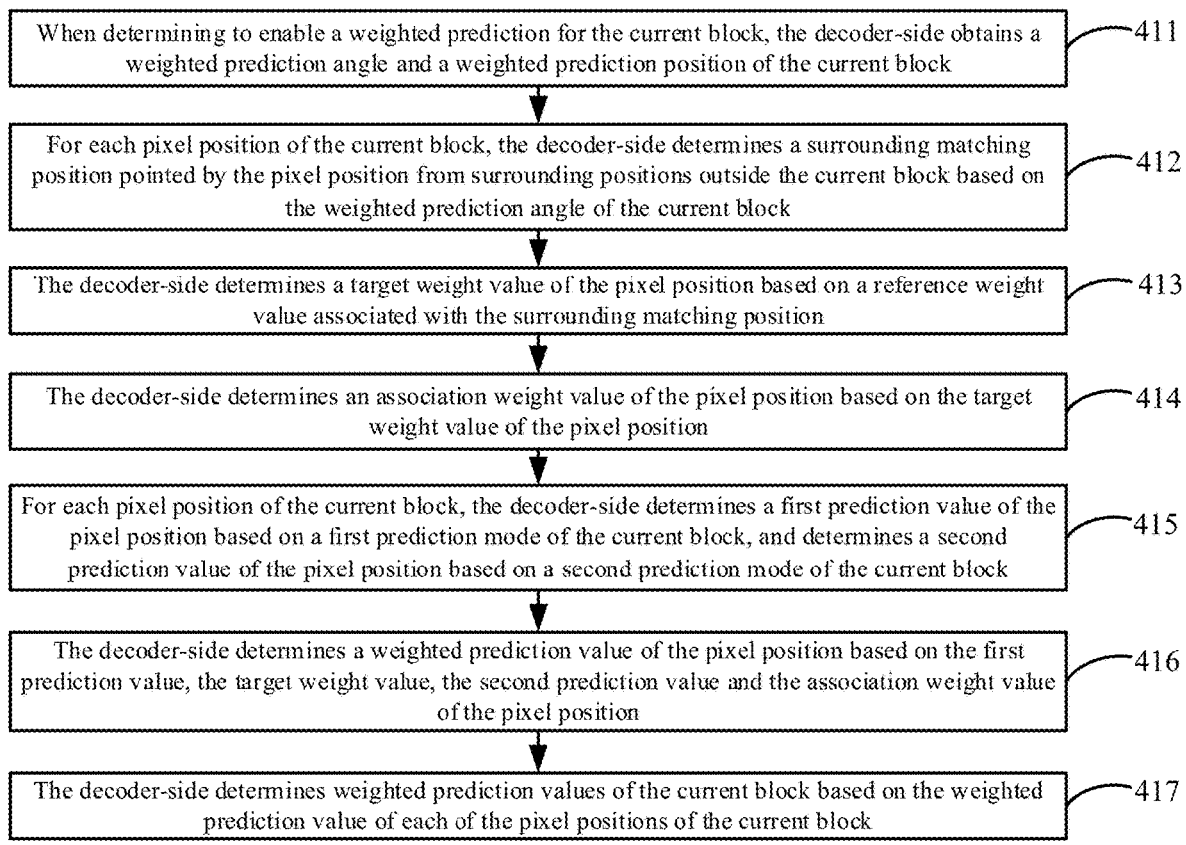
FIG. 4F is a flowchart illustrating a decoding method according to an embodiment of the present disclosure.

Embodiment 3. In the embodiment 1, the current block may include one sub-block, that is, the sub-block is the current block itself. For the current block, as shown in FIG. 4F which is a schematic diagram illustrating a flowchart of a decoding method. The method is applied to a decoder-side and includes the following steps 411 to 417.

At step 411, when determining to enable a weighted prediction for the current block, the decoder-side obtains a weighted prediction angle and a weighted prediction position of the current block.

Illustratively, the decoder-side also needs to determine whether to allow a weighted prediction to be enabled for the current block. If the decoder-side determines that allowing the weighted prediction to be enabled for the current block, the weighted prediction angle and the weighted prediction position of the current block are obtained and subsequent steps are performed, otherwise, a processing manner is not limited in the present disclosure.

In a possible implementation, a coder-side determines whether feature information of the current block satisfies a specific condition, and if the feature information satisfies the specific condition, the coder-side determines to enable the weighted prediction for the current block. The decoder-side also determines whether the feature information of the current block satisfies the specific condition, and if the feature information satisfies the specific condition, the decoder-side determines to enable the weighted prediction for the current block, otherwise, the decoder-side determines not to enable the weighted prediction for the current block. A manner in which the decoder-side determines whether to enable the weighted prediction for the current block based on the feature information can be referred to the step 401 and will not be repeated herein.

In another possible implementation, the coder-side determines whether the current block supports the weighted prediction based on the feature information of the current block. When the current block supports the weighted prediction, another strategy may also be adopted to determine whether to enable the weighted prediction for the current block, for example, an RDO is adopted to determine whether to enable the weighted prediction for the current block. After determining whether to enable the weighted prediction for the current block or not, when the coder-side sends a coded bit stream of the current block, the coded bit stream may include a syntax for whether to enable the weighted prediction for the current block, where the syntax represents whether to enable the weighted prediction for the current block. The decoder-side determines whether the current block supports the weighted prediction based on the feature information of the current block, and the specific implementation may be referred to the step 401 and will not be repeated herein. When determining the current block supports the weighted prediction, the decoder-side may also decode the syntax for whether to enable the weighted prediction for the current block from the coded bit stream and determine whether to enable the weighted prediction for the current block based on the syntax.

In a possible implementation, when determining to enable the weighted prediction for the current block, the decoder-side obtains the weighted prediction angle and the weighted prediction position of the current block, where the relevant description of the weighted prediction angle and the weighted prediction position can be referred to the step 401 and will not be repeated herein. The decoder-side may obtain the weighted prediction angle and the weighted prediction position of the current block in the following manners.

In a first manner, the decoder-side and the coder-side agree to take the same weighted prediction angle as the weighted prediction angle of the current block, and agree to take the same weighted prediction position as the weighted prediction position of the current block. The specific contents can be referred to the first manner in the above embodiment.

In a second manner, the decoder-side constructs a weighted prediction angle list which is same as the weighted prediction angle list in the coder-side. The decoder-side constructs a weighted prediction position list which is same as the weighted prediction position list in the coder-side. The specific contents may be referred to the second manner of the above embodiment. After receiving the coded bit stream of the current block, the decoder-side parses indication information from the coded bit stream, and selects one weighted prediction angle from the weighted prediction angle list as the weighted prediction angle of the current block based on the indication information, and selects one weighted prediction position from the weighted prediction position list as the weighted prediction position of the current block based on the indication information.

The implementation process of the second manner will be described below in combination with several specific application scenarios.

Application scenario 1: when the coder-side sends a coded bit stream to the decoder-side, the coded bit stream may include indication information 1 used to indicate both the weighted prediction angle of the current block (i.e., a target weighted prediction angle) and the weighted prediction position of the current block (i.e., a target weighted prediction position). For example, when the indication information 1 is 0, the indication information 1 may indicate the first weight prediction angle in the weighted prediction angle list and the first weighted prediction position in the weighted prediction position list, and so on, there is no limitation on a value of the indication information 1, which weighted prediction angle and which weighted prediction position is used to indicate, as long as the coder-side and the decoder-side agree on it.

After receiving the coded bit stream, the decoder-side decodes the indication information 1 from the coded bit stream. Based on the indication information 1, the decoder-side may select a weighted prediction angle corresponding to the indication information 1 from the weighted prediction angle list and take the weighted prediction angle as the weighted prediction angle of the current block. Based on the indication information 1, the decoder-side may select a weighted prediction position corresponding to the indication information 1 from the weighted prediction position list and take the weighted prediction position as the weighted prediction position of the current block.

Application scenario 2: when the coder-side sends a coded bit stream to the decoder-side, the coded bit stream may include indication information 2 and indication information 3. The indication information 2 indicates a target weighted prediction angle of the current block, for example, an index value 1 of the target weighted prediction angle in the weighted prediction angle list, where the index value 1 indicates which weighted prediction angle in the weighted prediction angle list is the target weighted prediction angle. The indication information 3 indicates the target weighted prediction position of the current block, for example, an index value 2 of the target weighted prediction position in the weighted prediction position list, where the index value 2 indicates which weighted prediction position in the weighted prediction position list is the target weighted prediction position.

After receiving the coded bit stream, the decoder-side parses the indication information 2 and the indication information 3 from the coded bit stream. Based on the indication information 2, the decoder-side may select a weighted prediction angle corresponding to the index value 1 in the weighted prediction angle list and take the weighted prediction angle as the weighted prediction angle of the current block. Based on the indication information 3, the decoder-side may select a weighted prediction position corresponding to the index value 2 in the weighted prediction position list and take the weighted prediction position as the weighted prediction position of the current block.

Application scenario 3: the coder-side and the decoder-side may agree on a preferred configuration combination. The preferred configuration combination can be configured according to practical experience, which is not limited herein. For example, they may agree on the preferred configuration combination includes a preferred configuration combination 1 including a weighted prediction angle A and a weighted prediction position $a_4$ may be agreed on, a preferred configuration combination 2 including a weighted prediction angle B and a weighted prediction position $b_4$, or the like.

After determining the target weighted prediction angle and the target weighted prediction position of the current block, the coder-side determines whether the combination of the target weighted prediction angle and the target weighted prediction position belongs to the preferred configuration combination. If the combination is included in the preferred configuration combination, when the coder-side sends a coded bit stream to the decoder-side, the coded bit stream may include indication information 4 and indication information 5. The indication information 4 indicates whether the preferred configuration combination is used for the current block. For example, the indication information 4 is a first value (e.g., 0), indicating that the preferred configuration combination is used for the current block. The indication information 5 indicates which preferred configuration combination is used for the current block. For example, when a value of the indication information 5 is 0, it may indicate that a preferred configuration combination 1 is used for the current block, and when the value of the indication information 5 is 1, it may indicate that a preferred configuration combination 2 is used for the current block.

After receiving the coded bit stream, the decoder-side may parse the indication information 4 and the indication information 5 from the coded bit stream. Based on the indication information 4, the decoder-side may determine whether the preferred configuration combination is used for the current block. If the indication information 4 is the first value, the decoder-side determines that the preferred configuration combination is used for the current block. When the preferred configuration combination is used for the current block, the decoder-side may determine which preferred configuration combination is used for the current block based on the indication information 5. For example, when the value of the indication information 5 is 0, the decoder-side may determine that the preferred configuration combination 1 is used for the current block, e.g., the weighted prediction angle of the current block is the weighted prediction angle A, and the weighted prediction position of the current block is the weighted prediction position $a_4$. For another example, when the value of the indication information 5 is 1, the decoder-side may determine that the preferred configuration combination 2 is used for the current block, e.g., the weighted prediction angle of the current block is the weighted prediction angle B and the weighted prediction position of the current block is the weighted prediction position $b_4$.

Illustratively, if the coder-side and the decoder-side agree on only one combination set in the preferred configuration combination, for example, the preferred configuration combination only including the weighted prediction angle A and the weighted prediction position $a_4$, the coded bit stream may only include the indication information 4 without the indication information 5, where the indication information 4 indicates the preferred configuration combination is used for the current block. After the decoder-side parses the indication information 4 from the coded bit stream, if the indication information 4 is the first value, the decoder-side determines that the preferred configuration combination is used for the current block. Based on the preferred combination, the decoder-side determines that the weighted prediction angle of the current block is the weighted prediction angle A and the weighted prediction position of the current block is the weighted prediction position $a_4$.

Application scenario 4: the coder-side and the decoder-side may agree on a preferred configuration combination. After determining the target weighted prediction angle and the target weighted prediction position of the current block, the coder-side may determine whether the combination of the target weighted prediction angle and the target weighted prediction position belongs to the preferred configuration combination. If it does not belong to the preferred configuration combination, when the coder-side sends a coded bit stream to the decoder-side, the coded bit stream may include the indication information 4 and indication information 6. The indication information 4 indicates whether the preferred configuration combination is used for the current block. If the indication information 4 is a second value (e.g., 1), the indication information 4 may indicate that the preferred configuration combination is not used for the current block. The indication information 6 indicates both the target weighted prediction angle of the current block and the target weighted prediction position of the current block.

After receiving the coded bit stream, the decoder-side may parse the indication information 4 and the indication information 6 from the coded bit stream. Based on the indication information 4, the decoder-side may determine whether the preferred configuration combination is used for the current block. If the indication information 4 is the second value, the decoder-side determines that the preferred configuration combination is not used for the current block. When the preferred configuration combination is not used for the current block, the decoder-side may, based on the indication information 6, select a weighted prediction angle corresponding to the indication information 6 from the weighted prediction angle list and take the weighted prediction angle as the weighted prediction angle of the current block; and based on the indication information 6, the decoder-side may select a weighted prediction position corresponding to the indication information 6 from the weighted prediction position list and take the weighted prediction position as the weighted prediction position of the current block.

Application scenario 5: the coder-side and the decoder-side may agree on a preferred configuration combination. After determining the target weighted prediction angle and the target weighted prediction position of the current block, the coder-side may determine whether the combination of the target weighted prediction angle and the target weighted prediction position are in the preferred configuration combination. If the combination is not in the preferred configuration combination, when the coder-side sends a coded bit stream to the decoder-side, the coded bit stream may include the indication information 4, indication information 7 and indication information 8. Illustratively, the indication information 4 indicates whether the preferred configuration combination is used for the current block. If the indication information 4 is a second value, the indication information 4 may indicate that the preferred configuration combination is not used for the current block. The indication information 7 indicates the target weighted prediction angle of the current block. The indication information 8 indicates the target weighted prediction position of the current block.

After receiving the coded bit stream, the decoder-side parses the indication information 4, the indication information 7 and the indication information 8 from the coded bit stream. Based on the indication information 4, the decoder-side may determine whether the preferred configuration combination is used for the current block. If the indication information 4 is the second value, the decoder-side determines that the preferred configuration combination is not used for the current block. When there is no preferred configuration combination used for the current block, the decoder-side may, based on the indication information 7, select a corresponding weighted prediction angle from the weighted prediction angle list and take the weighted prediction angle as the weighted prediction angle of the current block; and based on the indication information 8, the decoder-side may select a corresponding weighted prediction position from the weighted prediction position list and take the weighted prediction position as the weighted prediction position of the current block.

The above first and second manners are merely illustrative and are not limited herein, as long as the decoder-side can obtain the weighted prediction angle (i.e., target weighted prediction angle) and the weighted prediction position (i.e., target weighted prediction position) of the current block.

At step 412, for each pixel position of the current block, the decoder-side determines a surrounding matching position pointed by the pixel position from surrounding positions outside the current block based on the weighted prediction angle of the current block.

At step 413, the decoder-side determines a target weight value of the pixel position based on a reference weight value associated with the surrounding matching position.

At step 414, the decoder-side determines an association weight value of the pixel position based on the target weight value of the pixel position.

At step 415, for each pixel position of the current block, the decoder-side determines a first prediction value of the pixel position based on a first prediction mode of the current block, and determines a second prediction value of the pixel position based on a second prediction mode of the current block.

At step 416, based on the first prediction value, the target weight value, the second prediction value and the association weight value of the pixel position, the decoder-side determines a weighted prediction value of the pixel position.

At step 417, the decoder-side determines weighted prediction values of the current block based on the weighted prediction value of each of the pixel positions of the current block.

Illustratively, implementation processes of steps 412 to 417 can be referred to that of the steps 402 to 407, with difference being that the steps 412 to 417 are the processes at the decoder-side rather than the processes at the coder-side, and will not be repeated herein.

As described above, in embodiments of the present disclosure, an effective manner of setting weight values is provided, in which a reasonable target weight value is set for each of the pixel positions of the current block such that the prediction values of the current block are more approximate to raw pixels, thereby improving the prediction accuracy, prediction performance and decoding performance.

In the above embodiments 2 and 3, the current block includes one sub-block, that is, processing on the current block can be denoted as a inter Angular Weighted Prediction (AWP) mode.

Figure 5A:
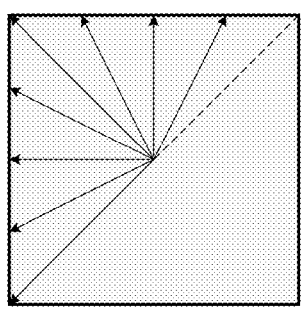
FIGS. 5A and 5B are schematic diagrams illustrating a weighted prediction angle according to an embodiment of the present disclosure.

Embodiment 4. In the above embodiments 1 to 3, a weighted prediction angle is involved. The weighted prediction angle may be any angle, for example, any angle within 180 degrees, or any angle within 360 degrees, such as 10 degrees, 20 degrees, 30 degrees or the like, which is not limited herein. In a possible implementation, the weighted prediction angle may be a horizontal angle (e.g., angle 2 in FIG. 5B); or, the weighted prediction angle may be a vertical angle (e.g., angle 6 in FIG. 5B); or, an absolute value of a slope of the weighted prediction angle (the slope of the weighted prediction angle is a tangent value of the weighted prediction angle) may be n-th power of 2, where n is an integer, such as a positive integer, 0 and a negative integer. For example, the absolute value of the slope of the weighted prediction angle may be 1 (i.e., a value of 0-th power of 2), 2 (i.e., a value of $1^{st}$ power of 2), ½ (i.e., a value of $-1^{st}$ power of 2), 4 (i.e., a value of $2^{nd}$ power of 2), ¼ (i.e., a value of $-2^{nd}$ power of 2), 8 (i.e., a value of $3^{rd}$ power of 2), and ⅛ (i.e., a value of $-3^{rd}$ power of 2) and the like. Illustratively, as shown in FIG. 5A, eight weighted prediction angles are shown, where the absolute values of the slopes of the weighted prediction angles are values of n-th power of 2. In subsequent embodiments, a shift operation may be performed for the weighted prediction angle. Therefore, when the absolute value of the slope of the weighted prediction angle is n-th power of 2, a division operation may be avoided during the shift operation for the weighted prediction angle, thereby facilitating the shift implementation.

Illustratively, the numbers of the weighted prediction angles supported by different block sizes may be same or different.

Embodiment 5. In the above embodiments 1 to 3, for each pixel position, a target weight value of the pixel position may be determined based on a reference weight value associated with a surrounding matching position pointed by the pixel position. In the embodiments 2 and 3, the surrounding matching position is a surrounding matching position of a current block.

The reference weight value associated with the surrounding matching position may be obtained in the following manner: based on a coordinate value of the surrounding matching position of the current block and a coordinate value of a weight transform start position of the current block, the reference weight value associated with the surrounding matching position is determined.

Illustratively, if the surrounding matching position is a surrounding position at one row on the upper outside or one row on the lower outside of the current block, the coordinate value of the surrounding matching position is an abscissa value of the surrounding matching position and the coordinate value of the weight transform start position is an abscissa value of the weight transform start position. Alternatively, if the surrounding matching position is a surrounding position at one column on the left outside or one column on the right outside of the current block, the coordinate value of the surrounding matching position is an ordinate value of the surrounding matching position and the coordinate value of the weight transform start position is an ordinate value of the weight transform start position.

Illustratively, a pixel position at an upper left corner of the current block (e.g., a first pixel position of the upper left corner) may be used as a coordinate origin, and the coordinate value of the surrounding matching position of the current block (e.g., abscissa value or ordinate value) and the coordinate value of the weight transform start position of the current block (e.g., abscissa value or ordinate value) both are the coordinate values relative to the coordinate origin. Another pixel position of the current block may also be taken as a coordinate origin and the implementation manner is similar to that of using the pixel position at the upper left corner as the coordinate origin.

In a possible implementation, when the reference weight value associated with the surrounding matching position is determined based on the coordinate value of the surrounding matching position and the coordinate value of the weight transform start position of the current block, difference between the coordinate value of the surrounding matching position and the coordinate value of the weight transform start position of the current block may be calculated. If the difference is less than a first threshold, the reference weight value associated with the surrounding matching position is determined as the first threshold. If the difference is greater than a second threshold, the reference weight value associated with the surrounding matching position is determined as the second threshold. If the difference is not less than the first threshold and not greater than the second threshold, the reference weight value associated with the surrounding matching position is determined as the difference. In another possible implementation, when the reference weight value associated with the surrounding matching position is determined based on the coordinate value of the surrounding matching position and the coordinate value of the weight transform start position of the current block, the reference weight value associated with the surrounding matching position is directly determined based on a size relationship between the coordinate value of the surrounding matching position and the coordinate value of the weight transform start position of the current block.

For example, if the coordinate value of the surrounding matching position is less than the coordinate value of the weight transform start position of the current block, the reference weight value associated with the surrounding matching position may be determined as the first threshold; and if the coordinate value of the surrounding matching position is not less than the coordinate value of the weight transform start position of the current block, the reference weight value associated with the surrounding matching position may be determined as the second threshold.

For another example, if the coordinate value of the surrounding matching position is less than the coordinate value of the weight transform start position of the current block, the reference weight value associated with the surrounding matching position may be determined as the second threshold; and if the coordinate value of the surrounding matching position is not less than the coordinate value of the weight transform start position of the current block, the reference weight value associated with the surrounding matching position may be determined as the first threshold.

Illustratively, the first threshold and the second threshold may be configured based on experience and the first threshold is less than the second threshold. The first threshold and the second threshold are not limited herein. In some examples, the first threshold may be a minimum value of pre-agreed reference weight values, for example, 0, and the second threshold may be a maximum value of the pre-agreed reference weight values, for example, 8, where 0 and 8 are only examples.

Illustratively, as shown in FIG. 4D, all the surrounding positions are equally divided into eight parts to obtain seven weighted prediction positions. When the weighted prediction position is 0, it indicates a surrounding position $a_0$, i.e., the coordinate value of the weight transform start position is a coordinate value of the surrounding position $a_0$. When the weighted prediction position is 1, it indicates a surrounding position $a_1$, i.e., the coordinate value of the weight transform start position is a coordinate value of the surrounding position $a_1$, and so on. The manner of determining the coordinate value of the weight transform start position will not be repeated herein.

Embodiment 6. In the above embodiments 1 to 3, for each pixel position, the target weight value of the pixel position may be determined based on the reference weight value associated with the surrounding matching position pointed by the pixel position. Subsequent descriptions are made with a surrounding matching position of the current block as an example. The reference weight value associated with the surrounding matching position can be obtained in the following manner: a reference weight value list of the current block is determined, where the reference weight value list may include a plurality of reference weight values which are pre-configured or configured based on weight configuration parameters. Based on a target index, a valid number of reference weight values are selected from the reference weight value list and one or more reference weight values of surrounding positions outside the current block are set based on the valid number of reference weight values. Illustratively, the valid number may be determined based on a size of the current block and a weighted prediction angle of the current block; the target index may be determined based on the size of the current block, the weighted prediction angle of the current block and a weighted prediction position of the current block.

To sum up, since one or more reference weight values have already been set for the surrounding positions outside the current block, that is, each of the surrounding positions has a reference weight value, after the surrounding matching position pointed by the pixel position is determined from the surrounding positions outside the current block, the reference weight value associated with the surrounding matching position, e.g., a target weight value of the pixel position, can be determined.

Figure 6A:
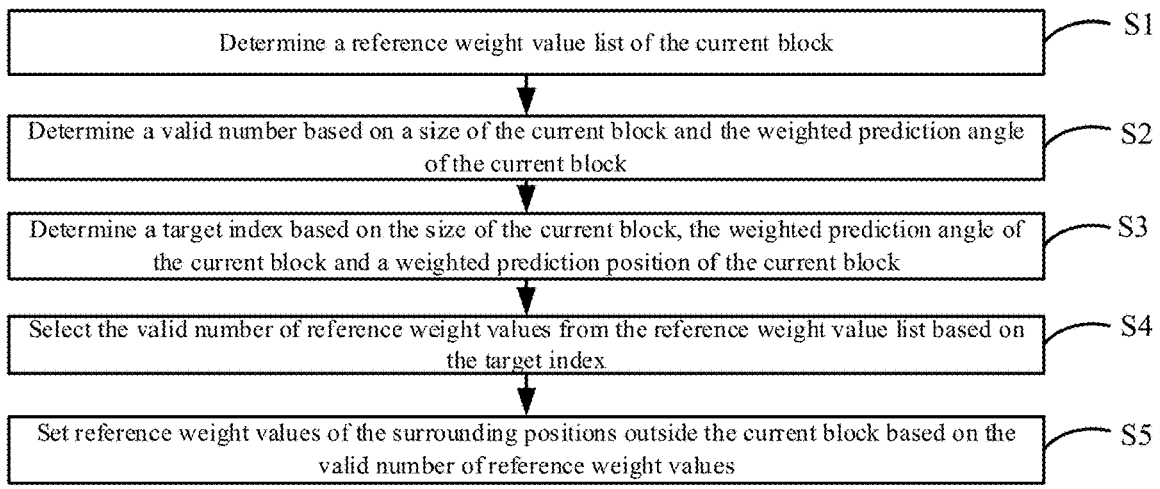
FIG. 6A is a flowchart of determining a reference weight value of a surrounding position according to an embodiment of the present disclosure.

In combination with specific implementation steps shown in FIG. 6A, a process of setting the reference weight values of the surrounding positions will be described below.

At step S1, a reference weight value list of the current block is determined.

In a possible implementation, a sequence-level reference weights list may be determined as the reference weight value list of the current block. For example, both the coder-side and the decoder-side may be configured with a sequence-level reference weights list A1. For multiple sequence level pictures, these pictures all use the reference weight value list A1. Regardless of what are the weighted prediction angle and the weighted prediction position, the current blocks of the multiple pictures of sequence level share the same reference weight value list A1.

In another possible implementation, a preset reference weight value list may be determined as the reference weight value list of the current block. For example, both the coder-side and the decoder-side may preset the reference weight value list. For all pictures in multiple sequences, this reference weight value list is used. Regardless of what are the weighted prediction angle and the weighted prediction position, the current blocks of the all pictures in multiple sequences share the same reference weight value list.

In another possible implementation, a reference weight value list corresponding to the weighted prediction angle of the current block may be determined as the reference weight value list of the current block. For example, both the coder-side and the decoder-side are configured with a plurality of reference weight value lists, and several weighted prediction angles may share a same reference weight value list. For example, a reference weight value list A2 and a reference weight value list A3 are configured, a weighted prediction angle 1 and a weighted prediction angle 2 share the reference weight value list A2 and a weighted prediction angle 3 uses the reference weight value list A3. Based on this, after the weighted prediction angle of the current block is obtained, if the weighted prediction angle of the current block is the weighted prediction angle 1, the reference weight value list A2 corresponding to the weighted prediction angle 1 is determined as the reference weight value list of the current block.

In another possible implementation, a reference weight value list corresponding to the weighted prediction angle of the current block and the weighted prediction position of the current block may be determined as the reference weight value list of the current block. For example, both the coder-side and the decoder-side are configured with a plurality of reference weight value lists, different combinations of the weighted prediction angle and the weighted prediction position may correspond to same or different reference weight value lists. For example, a reference weight value list A4, a reference weight value list A5 and a reference weight value list A6 are configured. A weighted prediction angle 1 and weighted prediction positions 0 to 2 share the reference weight value list A4, the weighted prediction angle 1 and weighted prediction positions 3 to 5 share the reference weight value list A5, and a weighted prediction angle 2 and weighted prediction positions 0 to 5 share the reference weight value list A6. Based on this, after the weighted prediction angle and the weighted prediction position of the current block are obtained, if the weighted prediction angle of the current block is the weighted prediction angle 1 and the weighted prediction position of the current block is a weighted prediction position 4, the reference weight value list A5 corresponding to the weighted prediction angle 1 and the weighted prediction position 4 is determined as the reference weight value list of the current block.

In another possible implementation, a reference weight value list corresponding to the size of the current block and the weighted prediction angle of the current block is determined as the reference weight value list of the current block. For example, both the coder-side and the decoder-side are configured with a plurality of reference weight value lists, different combinations of the size and the weighted prediction angle may correspond to same or different reference weight value lists. For example, a reference weight value list A7 and a reference weight value list A8 are configured. A weighted prediction angle 1 and a size 1 adopt the reference weight value list A7. The weighted prediction angle 1 and a size 2, and a weighted prediction angle 2 and the size 1 both adopt the reference weight value list A8. Based on this, if the weighted prediction angle of the current block is the weighted prediction angle 1 and the size of the current block is the size 1, the reference weight value list A7 corresponding to the weighted prediction angle 1 and the size 1 is determined as the reference weight value list of the current block.

To sum up, the reference weight value list of the current block may be determined, and the reference weight value list may include the plurality of reference weight values which are pre-configured or configured based on the weight configuration parameters.

For the reference weight value list of the current block, a number of the reference weight values in the reference weight value list may be a set fixed value, and the fixed value may be set arbitrarily based on experience, which is not limited herein. Or, the number of the reference weight values in the reference weight value list may be related to the size (e.g., width or height) of a current slice where the current block is located, for example, the number of the reference weight values may be greater than the width of the current slice or same as the width of the current slice; and the number of the reference weight values may be greater than the height of the current slice or same as the height of the current slice, which is not limited herein. The number of the reference weight values may be selected based on practical needs.

Illustratively, for the plurality of reference weight values in the reference weight value list, the plurality of reference weight values may be inconsistent reference weight values, for example, the plurality of reference weight values in the reference weight value list may not be completely same.

In a possible implementation, the plurality of reference weight values in the reference weight value list may monotonically increase or monotonically decrease. In addition, the plurality of reference weight values in the reference weight value list may firstly monotonically increase and then monotonically decrease, or, firstly monotonically decrease and then monotonically increase. In addition, the plurality of reference weight values in the reference weight value list may firstly include a plurality of first reference weight values and then a plurality of second reference weight values, or firstly include the plurality of second reference weight values and then the plurality of first reference weight values. In combination with several circumstances, the contents of the above reference weight value list are described below.

Circumstance 1: the plurality of reference weight values in the reference weight value list may monotonically increase or monotonically decrease. For example, the reference weight value list may be [8 8 8 8 . . . 8 8 7 6 5 4 3 2 1 0 0 0 0 . . . 0 0], that is, the plurality of reference weight values in the reference weight value list monotonically decrease. For another example, the reference weight value list may be [0 0 0 0 . . . 0 0 1 2 3 4 5 6 7 8 8 8 8 . . . 8 8], that is, the plurality of reference weight values in the reference weight value list monotonically increase. The above are only examples and the reference weight value list is not limited herein.

Illustratively, the reference weight values in the reference weight value list may be pre-configured or configured based on the weight configuration parameters. The weight configuration parameters may include a weight transform rate and a weight transform start position. The weight transform rate may be a value set based on experience and the weight transform start position may also be a value set based on experience.

The plurality of reference weight values in the reference weight value list may monotonically increase or monotonically decrease. For example, if a maximum value of the reference weight values is M1 and a minimum value of the reference weight values is M2, the plurality of reference weight values in the reference weight value list monotonically decrease from the maximum value M1 to the minimum value M2; or monotonically increase from the minimum value M2 to the maximum value M1. If M1 is 8 and M2 is 0, the plurality of reference weight values monotonically decrease from 8 to 0, or monotonically increase from 0 to 8.

Illustratively, in a process of pre-configuring the reference weight values in the reference weight value list, the plurality of reference weight values in the reference weight value list can be arbitrarily configured as long as the plurality of reference weight values monotonically increase or monotonically decrease.

Illustratively, in a process of configuring the reference weight values in the reference weight value list based on the weight configuration parameters, the weight transform rate and the weight transform start position can be firstly obtained, and then, based on the weight transform rate and the weight transform start position, the plurality of reference weight values in the reference weight value list are determined. The weight transform rate and the weight transform start position may be preset values which can be configured based experience, and not limited herein.

For example, the reference weight values in the reference weight value list can be determined in the following manner: y(x)=Clip3 (minimum, maximum, a*(x−s)), where x represents a position index in the reference weight value list, for example, x is 1 which indicates the first position in the reference weight value list, y(x) represents an x-th reference weight value in the reference weight value list, "a" represents the weight transform rate, s represents the weight transform start position, and a Clip3 function is used to limit the reference weight values to be between a minimum value and a maximum value. The maximum value and the minimum value can be configured based experience. For ease of descriptions, subsequent descriptions are given by taking the minimum value being 0 and the maximum value being 8 as an example.

"a" represents a weight transform rate which can be configured based on experience, for example, "a" may be a non-zero integer, for example, "a" may be −4, −3, −2, −1, 1, 2, 3 or 4 or the like. For ease of descriptions, descriptions are made with "a" being 1 as an example. If "a" is 1, the reference weight values need to pass through 0, 1, 2, 3, 4, 5, 6, 7, 8 from 0 to 8, or pass through 8, 7, 6, 5, 4, 3, 2, 1, 0 from 8 to 0.

s may represent a weight transform start position, which can be configured based on experience, for example, s may be a half of a total number of the reference weight values in the reference weight value list; or, s may be slightly smaller than the half of the total number of the reference weight values, such as the half of the total number of the reference weight values minus 4; or, s may be slightly larger than the half of the total number of the reference weight values, such as the half of the total number of the reference weight values plus 4. The above values of s are only examples and not limited herein.

To sum up, the reference weight values in the reference weight value list may be configured based on the weight configuration parameters in the following manner: ReferenceWeightsWhole[x]=Clip3(0, 8, x−Z); or, ReferenceWeightsWhole[x]=Clip3(0, 8, Z−x); or, ReferenceWeightsWhole[x]=Clip3(0, 4, x−Z); or, ReferenceWeightsWhole[x]=Clip3(0, 4, Z−x). The above manners are only examples and the implementation manner is not limited herein.

In the above formulas, x ranges from 0 to WholeLength−1. When x is 1, ReferenceWeightsWhole[x] may represent the first reference weight value in the reference weight value list; when x is 2, ReferenceWeightsWhole[x] may represent the second reference weight value in the reference weight value list; and so on. Illustratively, if surrounding positions outside the current block are surrounding positions at an upper one row or a lower one row, the WholeLength is determined based on the width of the current slice; and if the surrounding positions outside the current block are surrounding positions at a left one column or a right one column, the WholeLength is determined based on the height of the current slice.

In the above formula a*(x−s), if "a" is 1, a*(x−s)=x−s, that is, x−Z in Clip3(0, 8, x−Z) is equivalent to x−s, where Z represents a weight transform start position. If "a" is −1, a*(x−s)=s−x, that is, Z−x in Clip3(0, 8, Z−x) is equivalent to s−x, where Z represents a weight transform start position. When "a" is another value, the implementation process is similar as long as the reference weight values in the reference weight value list satisfy y(x)=Clip3 (minimum, maximum, a*(x−s)). Clip3(0, 8) is used to limit the reference weight values to be between 0 and 8, and Clip3(0, 4) is used to limit the reference weight values to be between 0 and 4.

In the above formulas, Z represents the weight transform start position, which can be configured based on experience. Assuming that x is in the range 0 to 511 and Z is 255, Z is substituted into the formula ReferenceWeightsWhole[x]= Clip3(0, 8, x−Z), and for any value from 0 to 511, ReferenceWeightsWhole[x] can be obtained, i.e., 512 reference weight values can be obtained, and the 512 reference weight values form the reference weight value list. For example, when x is in the range 0 to 255, the corresponding reference weight values are all 0, when x is 256, the reference weight value is 1, and so on, when x is 262, the reference weight value is 7, and when x varies from 263 to 511, the reference weight values are all 8. In a word, when "a" is 1, Clip3(0, 8, x−Z) is used to make the reference weight values to monotonically increase. Similarly, Z can be substituted into another formula to obtain 512 reference weight values, and the reference weight value list is formed based on the 512 reference weight values. For example, when "a" is −1, Clip3(0, 8, Z−x) is used to make the reference weight values to monotonically decrease. Clip3(0, 4) is used to limit the reference weight values to be between 0 and 4, which is not repeated herein.

In a word, the reference weight value list of the current block may be obtained, and the reference weight value list may include a plurality of reference weight values which may monotonically increase or monotonically decrease. In a possible implementation, the reference weight value list may also include one or more reference weight values of target positions (area), one or more reference weight values of first neighbouring positions (area) of the target positions and one or more reference weight values of second neighbouring positions (area) of the target positions.

The target positions include one or more reference weight values determined based on the weight transform start position. For example, based on the weight transform start position, one reference weight value is determined and is taken as the target positions. For example, the weight transform start position s is 255, a 259-th reference weight value can be taken as the target positions, or a 258-th reference weight value can be taken as the target positions, or a 260-th reference weight value can be taken as the target positions. The above are only several examples and not limited herein. For another example, based on the weight transform start position, a plurality of reference weight values are determined and are taken as the target positions. For example, 256-th to 262-nd reference weight values are taken as the target positions, or 258-th to 260-th reference weight values are taken as the target positions. The above are only several examples and not limited herein.

For example, the target positions may include a reference weight value with a value of 4. For example, the 259-th reference weight value is 4. Hence, if the target positions include one reference weight value, the target positions may include the 259-th reference weight value, or if the target positions include a plurality of reference weight values, the target positions may include the 256-th to 262-nd reference weight values, or the 258-th to 260-th reference weight values, which is not limited herein as long as the 259-th reference weight value is within the target positions.

In a word, the target positions may include one reference weight value; or the target positions may include a plurality of reference weight values. If the target positions include a plurality of reference weight values, the plurality of reference weight values of the target positions are monotonically increasing or monotonically decreasing. The monotonically increasing may be strictly monotonically increasing (i.e., the plurality of reference weight values within the target positions strictly monotonically increase); and the monotonically decreasing may be strictly monotonically decreasing (i.e., the plurality of reference weight values within the target positions strictly monotonically decrease). For example, the plurality of reference weight values of the target positions monotonically increase from 1 to 7 or monotonically decrease from 7 to 1.

Illustratively, the reference weight values of the first neighbouring positions are all first reference weight values, and the reference weight values of the second neighbouring positions monotonically increase or monotonically decrease. For example, the reference weight values of the first neighbouring positions are all 0, the target positions include one reference weight value which is 1, and the reference weight values of the second neighbouring positions monotonically increase from 2 to 8.

Optionally, the reference weight values of the first neighbouring positions are all second reference weight values, and the reference weight values of the second neighbouring positions are all third reference weight values, where the second reference weight values are different from the third reference weight values. For example, the reference weight values of the first neighbouring positions are all 0, the target positions include a plurality of reference weight values which monotonically increase from 1 to 7, and the reference weight values of the second neighbouring positions are all 8. Obviously, the reference weight values of the first neighbouring positions are different from that of the second neighbouring positions.

Optionally, the reference weight values of the first neighbouring positions and the reference weight values of the second neighbouring positions monotonically increase or monotonically decrease at the same time. For example, the reference weight values of the first neighbouring positions monotonically increase, and the reference weight values of the second neighbouring positions also monotonically increase. For another example, the reference weight values of the first neighbouring positions monotonically decrease, and the reference weight values of the second neighbouring positions also monotonically decrease. For example, the reference weight values of the first neighbouring positions monotonically increase from 0 to 3, the target positions include one reference weight value which is 4, and the reference weight values of the second neighbouring positions monotonically increase from 5 to 8.

Circumstance 2: the plurality of reference weight values in the reference weight value list firstly monotonically increase and then monotonically decrease, or, firstly monotonically decrease and then monotonically increase. For example, the reference weight value list may be [8 8 . . . 8 8 7 6 5 4 3 2 1 0 0 . . . 0 0 1 2 3 4 5 6 7 8 8 . . . 8 8], that is, the plurality of reference weight values in the reference weight value list firstly monotonically decrease and then monotonically increase. For another example, the reference weight value list may be [0 0 . . . 0 0 1 2 3 4 5 6 7 8 8 . . . 8 8 7 6 5 4 3 2 1 0 0 . . . 0 0], that is, the plurality of reference weight values in the reference weight value list firstly monotonically increase and then monotonically decrease. The above examples are only illustrative and the reference weight value list is not limited herein.

Illustratively, the reference weight values in the reference weight value list may be pre-configured or configured based on weight configuration parameters. The weight configuration parameters may include a weight transform rate and a weight transform start position. The weight transform rate may be a value set based on experience and the weight transform start position may also be a value set based on experience.

Illustratively, if the maximum value of the reference weight values is M1 and the minimum value of the reference weight values is M2, the plurality of reference weight values in the reference weight value list monotonically decrease from the maximum value M1 to the minimum value M2, and then monotonically increase from the minimum value M2 to the maximum value M1, or monotonically increase from the minimum value M2 to the maximum value M1 and then monotonically decrease from the maximum value M1 to the minimum value M2. If M1 is 8 and M2 is 0, the plurality of reference weight values monotonically decrease from 8 to 0 and then monotonically increase from 0 to 8; or, the plurality of reference weight values monotonically increase from 0 to 8 and then monotonically decrease from 8 to 0.

Illustratively, in a process of pre-configuring the reference weight values in the reference weight value list, the plurality of reference weight values in the reference weight value list can be arbitrarily configured as long as the plurality of reference weight values firstly monotonically increase and then monotonically decrease or the plurality of reference weight values firstly monotonically decrease and then monotonically increase. No limitation is made to the reference weight values.

Illustratively, in the process of configuring the reference weight values in the reference weight value list based on the weight configuration parameters, a first weight transform rate, a second weight transform rate, a first weight transform start position and a second weight transform start position may be firstly obtained, and then, based on the first weight transform rate, the second weight transform rate, the first weight transform start position and the second weight transform start position, the plurality of reference weight values in the reference weight value list are determined. The first weight transform rate, the second weight transform rate, the first weight transform start position and the second weight transform start position all may be preset values, and no limitation is made to the first weight transform rate, the second weight transform rate, the first weight transform start position and the second weight transform start position.

For example, the reference weight values in the reference weight value list can be determined in the following manner: when x is located in [0, k], y(x)=Clip3 (minimum, maximum, a1*(x−s1)). When x is located in [k+1, t], y(x)=Clip3 (minimum, maximum, a2*(x−s2)). x represents a position index in the reference weight value list, for example, x is 1, which indicates the first position in the reference weight value list, y(x) represents an x-th reference weight value in the reference weight value list. k is a value configured based on experience, which is not limited herein, for example, k may be a half of a total number of the reference weight values in the reference weight value list, or another value as long as k is less than t, where t is a total number of the reference weight values in the reference weight value list. a1 represents the first weight transform rate, a2 represents the second weight transform rate, s1 represents the first weight transform start position and s2 represents the second weight transform start position.

The Clip3 is used to limit the reference weight values to be between a minimum value and a maximum value, where the minimum value and the maximum value may be configured based on experience. For ease of descriptions, subsequent descriptions are given by taking the minimum value being 0 and the maximum value being 8 as an example.

a1 and a2 represent weight transform rates which can be configured based on experience. For example, a1 may be a non-zero integer, for example, a1 may be −4, −3, −2, −1, 1, 2, 3 or 4 or the like. a2 may be a non-zero integer, for example, a2 may be −4, −3, −2, −1, 1, 2, 3 or 4 or the like. Illustratively, when a1 is a positive integer, a2 may be a negative integer; when a1 is a negative integer, a2 may be a positive integer. For example, a1 may be −a2, that is, change rates of the two are same, which is reflected in the setting of the reference weight values, that is, the reference weight values have a same gradually-changing width. For ease of descriptions, take a1 being 1 and a2 being −1 as an example, the reference weight values need to pass through 0, 1, 2, 3, 4, 5, 6, 7, 8 from 0 to 8, and then pass through 8, 7, 6, 5, 4, 3, 2, 1, 0 from 8 to 0. Optionally, the reference weight values pass through 8, 7, 6, 5, 4, 3, 2, 1, 0 from 8 to 0 and then pass through 0, 1, 2, 3, 4, 5, 6, 7, 8 from 0 to 8. Take a1 being 2 and a2 being −2 as an example, the reference weight values pass through 0, 2, 4, 6, 8 from 0 to 8 and then pass through 8, 6, 4, 2, 0 from 8 to 0. Optionally, the reference weight values pass through 8, 6, 4, 2, 0 from 8 to 0 and then pass through 0, 2, 4, 6, 8 from 0 to 8.

s1 and s2 may represent weight transform start positions, which can be configured based on experience. For example, s1 may be a weight transform start position of reference weight values in an interval [0, k], and may be a half of k; or, s1 may be slightly less than the half of k, such as the half of k minus 4; or, s1 may be slightly greater than the half of k, such as the half of k plus 4. The above examples are only illustrative and the value of s1 is not limited herein. s2 may be a weight transform start position of reference weight values in an interval [k+1, t], and s2 may be a half of q (e.g., difference between t and k+1); or, s2 may be slightly less than the half of q, such as the half of q minus 4; or, s2 may be slightly greater than the half of q, such as the half of q plus 4. The above examples are only illustrative and the value of s2 is not limited herein.

In a word, the reference weight value list of the current block can be obtained and the reference weight value list may include a plurality of reference weight values which firstly monotonically increase and then monotonically decrease, or firstly monotonically decrease and then monotonically increase. In a possible implementation, the reference weight value list may also include one or more reference weight values of first target positions, one or more reference weight values of second target positions, one or more reference weight values of first neighbouring positions only neighbouring the first target positions, one or more reference weight values of second neighbouring positions neighbouring both the first target positions and the second target positions, and one or more reference weight values of third neighbouring positions only neighbouring the second target positions.

The first target positions include one or more reference weight values determined based on the first weight transform start position. For example, based on the first weight transform start position, one reference weight value is determined and is taken as the first target positions. Optionally, based on the first weight transform start position, a plurality of reference weight values are determined and are taken as the first target positions. If the first target positions include a plurality of reference weight values, the plurality of reference weight values in the first target positions are monotonically increasing or decreasing. The monotonically increasing may be a monotonic increase of the plurality of reference weight values of the first target positions, and the monotonically decreasing may be a monotonic decrease of the plurality of reference weight values of the first target positions.

The second target positions include one or more reference weight values determined based on the second weight transform start position. For example, based on the second weight transform start position, one reference weight value is determined and is taken as the second target positions. Optionally, based on the second weight transform start position, a plurality of reference weight values are determined and are taken as the second target positions. If the second target positions include a plurality of reference weight values, the plurality of reference weight values in the second target positions are monotonically increasing or decreasing. The monotonically increasing may be strictly monotonically increasing (the plurality of reference weight values of the second target positions strictly monotonically increase); and the monotonically decreasing may be strictly monotonically decreasing (the plurality of reference weight values of the second target positions strictly monotonically decrease).

If the plurality of reference weight values of the first target positions monotonically increase (for example, strictly monotonically increase), the plurality of reference weight values of the second target positions monotonically decrease (for example, strictly monotonically decrease). Optionally, if the plurality of reference weight values of the first target positions monotonically decrease (for example, strictly monotonically decrease), the plurality of reference weight values of the second target positions monotonically increase (for example, strictly monotonically increase).

Illustratively, the reference weight values of the first neighbouring positions are all first reference weight values, the reference weight values of the second neighbouring positions are all second reference weight values, and the reference weight values of the third neighbouring positions are all third reference weight values. The first reference weight values may be same as the third reference weight values, the first reference weight values may be different from the second reference weight values, and the third reference weight values may be different from the second reference weight values. For example, the reference weight values of the first neighbouring positions are all 0, the reference weight values of the second neighbouring positions are all 8, and the reference weight values of the third neighbouring positions are all 0. Optionally, the reference weight values of the first neighbouring positions are all 8, the reference weight values of the second neighbouring positions are all 0, and the reference weight values of the third neighbouring positions are all 8.

Optionally, the reference weight values of the first neighbouring positions are all first reference weight values; the reference weight values of the second neighbouring positions monotonically decrease; and the reference weight values of the third neighbouring positions monotonically increase. For example, the reference weight values of the first neighbouring positions are all 8, the first target positions include one reference weight value 7, the reference weight values of the second neighbouring positions monotonically decrease from 6 to 0, the second target positions include one reference weight value 1, and the reference weight values of the third neighbouring positions monotonically increase from 2 to 8.

Optionally, the reference weight values of the first neighbouring positions monotonically decrease; the reference weight values of the second neighbouring positions firstly monotonically decrease and then monotonically increase; the reference weight values of the third neighbouring positions monotonically increase. For example, the reference weight values of the first neighbouring positions monotonically decrease from 8 to 5, the first target positions include one reference weight value 4, the reference weight values of the second neighbouring positions firstly monotonically decrease from 3 to 0 and then monotonically increase from 0 to 3, the second target positions include one reference weight value 4, and the reference weight values of the third neighbouring positions monotonically increase from 5 to 8.

Optionally, the reference weight values of the first neighbouring positions monotonically decrease; the reference weight values of the second neighbouring positions monotonically increase; the reference weight values of the third neighbouring positions are all third reference weight values. For example, the reference weight values of the first neighbouring positions monotonically decrease from 8 to 1, the first target positions include one reference weight value 0, the reference weight values of the second neighbouring positions monotonically increase from 0 to 7, the second target positions include one reference weight value 8, and the reference weight values of the third neighbouring positions are all 8.

Optionally, the reference weight values of the first neighbouring positions are all first reference weight values; the reference weight values of the second neighbouring positions monotonically increase; the reference weight values of the third neighbouring positions monotonically decrease. For example, the reference weight values of the first neighbouring positions are all 0, the first target positions include one reference weight value 1, the reference weight values of the second neighbouring positions monotonically increase from 2 to 8, the second target positions include one reference weight value 7, and the reference weight values of the third neighbouring positions monotonically decrease from 6 to 0.

Optionally, the reference weight values of the first neighbouring positions monotonically increase; the reference weight values of the second neighbouring positions firstly monotonically increase and then monotonically decrease; the reference weight values of the third neighbouring positions monotonically decrease. For example, the reference weight values of the first neighbouring positions monotonically increase from 0 to 3, the first target positions include one reference weight value 4, the reference weight values of the second neighbouring positions firstly monotonically increase from 5 to 8 and then monotonically decrease from 8 to 5, the second target positions include one reference weight value 4, and the reference weight values of the third neighbouring positions monotonically decrease from 3 to 0.

Optionally, the reference weight values of the first neighbouring positions monotonically increase; the reference weight values of the second neighbouring positions monotonically decrease; the reference weight values of the third neighbouring positions are all third reference weight values. For example, the reference weight values of the first neighbouring positions monotonically increase from 0 to 7, the first target positions include one reference weight value 8, the reference weight values of the second neighbouring positions monotonically decrease from 8 to 1, the second target positions include one reference weight value 0, and the reference weight values of the third neighbouring positions are all 0.

The above examples are only illustrative and no limitation is made herein as long as the plurality of reference weight values in the reference weight value list can satisfy followings: increasing from 0 to 8 and then decreasing from 8 to 0; or, decreasing from 8 to 0 and then increasing from 0 to 8.

Circumstance 3: the plurality of reference weight values in the reference weight value list may firstly include a plurality of first reference weight values and then include a plurality of second reference weight values, or firstly include the plurality of second reference weight values and then include the plurality of first reference weight values. For example, the reference weight value list may be [8 8 . . . 8 8 0 0 . . . 0 0], or [0 0 . . . 0 0 8 8 . . . 8 8].

Illustratively, the reference weight values in the reference weight value list may be pre-configured or configured based on weight configuration parameters. The weight configuration parameters may include a weight transform start position. The weight transform start position may be a value set based on experience.

In a process of pre-configuring the reference weight values in the reference weight value list, the plurality of reference weight values in the reference weight value list can be arbitrarily configured as long as the plurality of reference weight values include the first reference weight values and the second reference weight values.

In a process of configuring the reference weight values in the reference weight value list based on the weight configuration parameters, the weight transform start position may be firstly obtained, and then, the plurality of reference weight values in the reference weight value list are determined based on the weight transform start position. For example, the weight transform start position represents an s-th reference weight value in the reference weight value list. Therefore, all reference weight values before the s-th reference weight value (excluding the s-th reference weight value) are first reference weight values (e.g., 8), and all reference weight values after the s-th reference weight value (including the s-th reference weight value) are second reference weight values (e.g., 0). Optionally, all reference weight values before the s-th reference weight value (excluding the s-th reference weight value) are second reference weight values (e.g., 0), and all reference weight values after the s-th reference weight value (including the s-th reference weight value) are first reference weight values (e.g., 8).

Based on the above circumstances, the reference weight value list of the current block can be obtained. For ease of descriptions, in subsequent embodiments, descriptions are made with the reference weight value list of the circumstance 1 as an example, and the reference weight value lists of other circumstances can be implemented in a similar way.

At step S2, a valid number is determined based on a size of the current block and the weighted prediction angle of the current block.

Illustratively, the valid number refers to presence of a valid number of surrounding positions outside the current block, for example, pixel positions inside the current block can only point to the valid number of surrounding positions, that is, a target weight value of each of pixel positions inside the current block can be obtained by setting reference weight values for the valid number of surrounding positions.

Illustratively, a number of the surrounding positions outside the current block is determined based on the size of the current block and/or the weighted prediction angle of the current block. In this embodiment, the number of the surrounding positions outside the current block is denoted as a valid number ValidLength.

For example, the valid number can be determined in the following formula: ValidLength=(N+(M>>X))<<1 or, ValidLength=(M+(N>>X))<<1. In the above formulas, ValidLength represents the valid number, M represents the width of the current block, N represents the height of the current block, X represents a log 2 logarithmic value of an absolute value of a slope of the weighted prediction angle of the current block, such as 0 or 1, << refers to arithmetic left shift, and >> refers to arithmetic right shift.

In the present disclosure, a<<b can be understood as arithmetic left shift of a two's complement integer representation of a by b binary digits, and this operation is defined at the time of b being a positive number. Simply speaking, a<<b can be understood as multiplying a by 2 to the b-th power. In the present disclosure, a>>b can be understood as arithmetic right shift of a two's complement integer representation of a by b binary digits, and this operation is defined at the time of b being a positive number. Simply speaking, a>>b can be understood as dividing a by 2 to the b-th power.

At step S3, based on the size of the current block, the weighted prediction angle of the current block and a weighted prediction position of the current block, a target index is determined.

Illustratively, the target index may refer to the numbering of a reference weight value in the reference weight value list, for example, when the target index is 259, it may indicate the 259-th reference weight value in the reference weight value list.

For example, the target index can be determined in following formulas: FirstIndex=(HalfLength−4)−((ValidLength>>1)−a+Y*((ValidLength−1)>>3)); or, FirstIndex=(HalfLength−4)−((ValidLength>>1)−b+Y*((ValidLength−1)>>3)−((M<<1)>>X)); or, FirstIndex=(HalfLength−4)−((ValidLength>>1)−c+Y*((Valid-Length−1)>>3)−((N<<1)>>X)); or, FirstIndex=(HalfLength−4)−((ValidLength>>1)−d+Y*((ValidLength−1)>>3)). In the above formulas, FirstIndex refers to the target index, ValidLength refers to the valid number, which is determined based on the size of the current block and the weighted prediction angle of the current block, Y refers to the weighted prediction position of the current block, a value of HalfLength−4 refers to the weight transform start position, M refers to a width of the current block, N refers to a height of the current block, X is the log 2 logarithmic value of the absolute value of the slope of the weighted prediction angle of the current block, and a, b, c and d are preset constant values.

In the above process, ValidLength is related to the weighted prediction angle of the current block and the size of the current block. For simplification of scheme, some parameters may be fixed to achieve optimization, for example, the weighted prediction angle of the current block may be set to a fixed parameter value, and the ValidLength is only related to the size of the current block. In other embodiments, the ValidLength can be determined in a similar way.

In the above process, FirstIndex is related to the weighted prediction angle of the current block, the size of the current block, and the weighted prediction position of the current block. For simplification of scheme, some parameters may be fixed to achieve optimization, for example, the weighted prediction angle of the current block may be set to a fixed parameter value, and the FirstIndex is only related to the size of the current block and the weighted prediction position of the current block. Optionally, the weighted prediction position of the current block may be set to a fixed parameter value, and the FirstIndex is only related to the size of the current block and the weighted prediction angle of the current block. Optionally, the weighted prediction angle of the current block and the weighted prediction position of the current block may be set to fixed parameter values which may be same or different for different current blocks, and the FirstIndex is only related to the size of the current block. In other embodiments, the FirstIndex (or FirstPos) can be determined in a similar way, which will not be repeated herein.

At step S4, the valid number of reference weight values are selected from the reference weight value list based on the target index.

Illustratively, it is assumed that the target index is q1 and the valid number is r. If the target index is a first one reference weight value to be selected in the reference weight value list, q1-st to q2-nd reference weight values are selected from the reference weight value list and difference between an index related to q2 and an index related to q1 is r−1, and thus r reference weight values are selected from the reference weight value list. Or, if the target index is a last one reference weight value to be selected in the reference weight value list, q3-rd to q1-st reference weight values are selected from the reference weight value list and difference between an index related to q1 and an index related to q3 is r−1, and thus r reference weight values are selected from the reference weight value list.

The above manners are only examples and the target index may also be a middle one reference weight value to be selected in the reference weight value list, the implementation is similar and will not be repeated herein. Subsequent descriptions are made with the target index being the first one reference weight value to be selected in the reference weight value list as an example, that is, the q1-st to q2-nd reference weight values are selected.

At step S5, based on the valid number of reference weight values, reference weight values of the surrounding positions outside the current block are set.

Illustratively, the number of the surrounding positions outside the current block is the valid number, and the valid number of reference weight values are selected from the reference weight value list. Thus, the number of the surrounding positions is equal to the number of the selected reference weight values, and the valid number of reference weight values in the reference weight value list may be set as the reference weight values of the surrounding positions outside the current block, respectively.

For example, for a first one reference weight value within the valid number of reference weight values, the first one reference weight value is set as a reference weight value of a first one surrounding position outside the current block; for a second one reference weight value within the valid number of reference weight values, the second one reference weight value is set as a reference weight value of a second one surrounding position outside the current block, and so on.

In a possible implementation, if r reference weight values are selected from the reference weight value list, the r reference weight values are intercepted from the reference weight value list and set as reference weight values of r surrounding positions outside the current block, respectively. Alternatively, if r reference weight values are selected from the reference weight value list, instead of intercepting the r reference weight values from the reference weight value list, the r reference weight values are used as the reference weight values of the r surrounding positions outside the current block by moving the reference weight values in the reference weight value list.

Embodiment 7. In the above embodiments 1 to 3, for each pixel position, based on the reference weight value associated with the surrounding matching position pointed by the pixel position, the target weight value of the pixel position is determined. Subsequently, descriptions are made with the surrounding matching position of the current block as an example. The reference weight value associated with the surrounding matching position can be obtained in the following manner: a reference weight value is directly set for each of surrounding positions outside the current block, for example, a valid number of reference weight values are obtained (not selected from a reference weight value list) and based on the valid number of reference weight values, reference weight values of the surrounding positions outside the current block are set.

Illustratively, the reference weight values configured for the surrounding positions outside the current block may be pre-configured or configured based on weight configuration parameters. The weight configuration parameters may include a weight transform rate and a weight transform start position. For the weight transform start position of each current block, the weight transform start position is determined based on at least one of the following parameters: a weighted prediction angle of the current block, a weighted prediction position of the current block, or a size of the current block. When the current block includes one sub-block, a number of the surrounding positions outside the current block (e.g., a valid number) is determined based on the size of the current block and the weighted prediction angle of the current block.

To sum up, since the reference weight values have been set for the surrounding positions outside the current block, that is, each surrounding position has a reference weight value, after a surrounding matching position pointed by the pixel position is determined from the surrounding positions outside the current block, the reference weight value associated with the surrounding matching position, e.g., the target weight value of the pixel position, can be determined.

The process of setting the reference weight values of the surrounding positions is described below in combination with implementations.

A valid number of reference weight values are firstly obtained. Then, based on the valid number of reference weight values, the reference weight values of the surrounding positions outside the current block are set, where the reference weight values of the surrounding positions outside the current block may monotonically increase or monotonically decrease.

It is noted that, a valid number of reference weight values are also obtained in the previous embodiment and the valid number of the previous embodiment may be same as or different from the valid number of this embodiment. For distinguishing purpose, the valid number of the previous embodiment may be considered as a first valid number and the valid number of this embodiment can be considered as a second valid number.

Illustratively, the number of the surrounding positions outside the current block is the valid number, and the valid number of reference weight values are to be obtained. For example, the valid number can be determined in the following formula: ValidLength=(N+(M>>X))<<1, where N and M respectively represent a height and a width of the current block, and X represents a log 2 logarithmic value of an absolute value of a slope of the weighted prediction angle of the current block, for example, 0 or 1.

In a possible implementation, the valid number of reference weight values may monotonically increase or monotonically decrease. Optionally, the valid number of reference weight values may firstly monotonically increase and then monotonically decrease, or firstly monotonically decrease and then monotonically increase. Optionally, the valid number of reference weight values may firstly include a plurality of first reference weight values and then include a plurality of second reference weight values, or firstly include the plurality of second reference weight values and then include the plurality of first reference weight values. Descriptions will be made below in combination with several circumstances.

Circumstance 1: the valid number of reference weight values may monotonically increase or monotonically decrease.

Illustratively, the reference weight values may be pre-configured or configured based on weight configuration parameters. The weight configuration parameters may include a weight transform rate and a weight transform start position. The weight transform rate may be a value set based on experience and the weight transform start position may also be a value set based on experience, or the weight transform start position may also be determined based on the weighted prediction position or determined based on the weighted prediction angle and the weighted prediction position.

Illustratively, in a process of pre-configuring the plurality of reference weight values, the plurality of reference weight values can be arbitrarily configured as long as the plurality of reference weight values monotonically increase or monotonically decrease. In addition, in a process of configuring the plurality of reference weight values based on the weight configuration parameters, the weight transform rate and the weight transform start position can be firstly obtained, and then, based on the weight transform rate and the weight transform start position, the plurality of reference weight values are determined. The weight transform start position is determined based on the weighted prediction position of the current block, or determined based on the weighted prediction angle and the weighted prediction position of the current block.

For example, the reference weight values can be determined in the following manner: y(x)=Clip3 (minimum, maximum, a*(x−s)), where x represents an index of a surrounding position, which ranges from 1 to the valid number value, for example, x is 1 which indicates the first surrounding position, and y(x) represents a reference weight value of an x-th surrounding position, "a" represents the weight transform rate, s represents the weight transform start position.

A Clip3 function is used to limit the reference weight values to be between a minimum value and a maximum value. The maximum value and the minimum value can be configured based experience. For ease of descriptions, subsequent descriptions are given by taking the minimum value being 0 and the maximum value being 8 as an example.

"a" represents a weight transform rate which can be configured based on experience, for example, "a" may be a non-zero integer, for example, "a" may be −4, −3, −2, −1, 1, 2, 3 or 4 or the like. For ease of descriptions, descriptions are made with "a" being 1 as an example. If "a" is 1, the reference weight values need to pass through 0, 1, 2, 3, 4, 5, 6, 7, 8 from 0 to 8, or pass through 8, 7, 6, 5, 4, 3, 2, 1, 0 from 8 to 0. Illustratively, when "a" is a positive integer, "a" may be positively correlated with the number of the surrounding positions, that is, the more the surrounding positions outside the current block are, the larger the value of "a" is. When "a" is a negative integer, "a" may be negatively correlated with the number of the surrounding positions, that is, the more the surrounding positions outside the current block are, the smaller the value of "a" is. The above are examples of a value of "a" and no limitation is made herein.

s may represent the weight transform start position, which can be determined based on the weighted prediction position. For example, $s=f$ (weighted prediction position), that is, s is a function relating to the weighted prediction position. For example, after a range of the surrounding positions outside the current block is determined, the valid number of the surrounding positions is determined and all the surrounding positions are equally divided into N parts, where a value of N may be set arbitrarily, such as 4, 6 or 8 or the like. The weighted prediction position is used to represent which surrounding position outside the current block is adopted as a target surrounding positions of the current block, and a surrounding position corresponding to the weighted prediction position is the weight transform start position. Optionally, s may be determined based on the weighted prediction angle and the weighted prediction position, for example, $s=f$ (weighted prediction angle and weighted prediction position), that is, s is a function relating to the weighted prediction angle and the weighted prediction position. For example, the range of the surrounding positions outside the current block may be determined based on the weighted prediction angle. After the range of the surrounding positions outside the current block is determined, the valid number of the surrounding positions may be determined and all the surrounding positions are equally divided into N parts. The weighted prediction position is used to represent which surrounding position outside the current block is adopted as the target surrounding positions of the current block and a surrounding position corresponding to the weighted prediction position is the weight transform start position.

To sum up, in the $y(x)=Clip3$ (minimum, maximum, $a*(x-s)$), the weight transform rate "a" and the weight transform start position s both are known values. For each of the surrounding positions outside the current block, the reference weight value of the surrounding position can be determined based on the functional relationship. For example, if the weight transform rate a is 2 and the weight transform start position s is 2, the functional relationship is $y(x)=Clip3(minimum, maximum, 2*(x-2))$. For each surrounding position x outside the current block, a reference weight value y can be obtained.

To sum up, a valid number of reference weight values of the current block can be obtained and these reference weight values may monotonically increase or monotonically decrease. In a possible implementation, the reference weight values of the surrounding positions outside the current block include one or more reference weight values of target positions, one or more reference weight values of first neighbouring positions of the target positions and one or more reference weight values of second neighbouring positions of the target positions.

The target positions, the reference weight values of the target positions, the reference weight values of the first neighbouring positions and the reference weight values of the second neighbouring positions can be referred to the descriptions of the circumstance 1 in the previous embodiment and will not be repeated herein.

Circumstance 2: the valid number of reference weight values firstly monotonically increase and then monotonically decrease, or firstly monotonically decrease and then monotonically increase.

Illustratively, the valid number of reference weight values may be pre-configured or configured based on the weight configuration parameters. The weight configuration parameters may include the weight transform rate and the weight transform start position. The weight transform rate may be a value set based on experience, and the weight transform start position may also be a value set based on experience or determined based on the weighted prediction position or determined based on the weighted prediction angle and the weighted prediction position.

Illustratively, in a process of pre-configuring the plurality of reference weight values, the plurality of reference weight values can be arbitrarily configured as long as the plurality of reference weight values firstly monotonically increase and then monotonically decrease, or firstly monotonically decrease and then monotonically increase. In a process of configuring the plurality of reference weight values based on the weight configuration parameters, a first weight transform rate, a second weight transform rate, a first weight transform start position and a second weight transform start position can be firstly obtained, and then, based on the first weight transform rate, the second weight transform rate, the first weight transform start position and the second weight transform start position, the plurality of reference weight values are determined.

For example, the plurality of reference weight values can be determined in the following manner: when x is located in $[0, k]$, $y(x)=Clip3$ (minimum, maximum, $a1*(x-s1)$). When x is located in $[k+1, t]$, $y(x)=Clip3(minimum, maximum, a2*(x-s2))$. X represents a position index of a surrounding position, for example, x is 1, which indicates the first surrounding position, and y(x) represents a reference weight value of an x-th surrounding position. K is a value configured based on experience, which is not limited herein, for example, k may be a half of the valid number, or another value as long ask is less than t, where t is a total number of the surrounding positions, i.e., the above valid number. A1 represents the first weight transform rate, a2 represents the second weight transform rate, s1 represents the first weight transform start position and s2 represents the second weight transform start position.

The Clip3 is used to limit the reference weight values to be between a minimum value and a maximum value, where the minimum value and the maximum value may be configured based on experience. For ease of descriptions, subsequent descriptions are given by taking the minimum value being 0 and the maximum value being 8 as an example.

a1 and a2 represent weight transform rates which can be configured based on experience. For example, a1 may be a non-zero integer, for example, a1 may be −4, −3, −2, −1, 1, 2, 3 or 4 or the like. A2 may be a non-zero integer, for example, a2 may be −4, −3, −2, −1, 1, 2, 3 or 4 or the like.

s1 and s2 may represent weight transform start positions, which can be configured based on experience. S1 may be a weight transform start position of reference weight values in an interval $[0, k]$, and s2 may be a weight transform start position of reference weight values in an interval $[k+1, t]$.

s1 can be determined based on the weighted prediction position. For example, $s1=f$ (weighted prediction position), that is, s1 is a function relating to the weighted prediction position. For example, after the range of the surrounding positions outside the current block is determined, a range $[0, k]$ is determined from all the surrounding positions, and all surrounding positions within the range [0, k] are equally divided into N parts, where a value of N may be arbitrarily set. The weighted prediction position is used to represent which surrounding position within the range [0, k] is adopted as the target surrounding positions of the current block, and a surrounding position corresponding to the weighted prediction position is the weight transform start position s1. Optionally, s1 may be determined based on the weighted prediction angle and the weighted prediction position, for example, s1=f (weighted prediction angle, weighted prediction position), that is, s1 is a function relating to the weighted prediction angle and the weighted prediction position. For example, the range of the surrounding positions outside the current block may be determined based on the weighted prediction angle, and the range [0, k] is determined from all the surrounding positions. All surrounding positions within the range [0, k] are equally divided into N parts. The weighted prediction position is used to represent which surrounding position within the range [0, k] is adopted as the target surrounding positions of the current block so as to obtain the weight transform start position s1.

s2 may be determined based on the weighted prediction position or determined based on the weighted prediction angle and the weighted prediction position. A process of determining s2 can be referred to the process of determining s1 except that the range is changed to [k+1, t], which will not be repeated herein.

Examples of determining the weight transform start positions s1 and s2 are given above and no limitation is made herein.

To sum up, the plurality of reference weight values may be obtained, and these reference weight values may firstly monotonically increase and then monotonically decrease, or firstly monotonically decrease and then monotonically increase. In a possible implementation, the reference weight values of a plurality of surrounding positions outside the current block may also include one or more reference weight values of first target positions, one or more reference weight values of second target positions, one or more reference weight values of first neighbouring positions only neighbouring the first target positions, one or more reference weight values of second neighbouring positions neighbouring both the first target positions and the second target positions, and one or more reference weight values of third neighbouring positions only neighbouring the second target positions.

For the first target positions, the second target positions, the reference weight value of the first target positions, the reference weight value of the second target positions, the reference weight value of the first neighbouring positions, the reference weight value of the second neighbouring positions, and the reference weight value of the third neighbouring positions and the like, reference may be made to the descriptions of the circumstance 2 in the previous embodiment and no redundant descriptions are made herein.

Circumstance 3: the valid number of reference weight values may firstly include a plurality of first reference weight values and then include a plurality of second reference weight values, or firstly include the plurality of second reference weight values and then include the plurality of first reference weight values. The valid number of reference weight values may be pre-configured or configured based on the weight configuration parameters. The weight configuration parameters may include the weight transform start position. In a process of configuring the reference weight values based on the weight configuration parameters, the weight transform start position may be obtained and the plurality of reference weight values are determined based on the weight transform start position.

Based on the above several circumstances, the valid number of the reference weight values can be obtained. For ease of descriptions, in subsequent embodiments, descriptions are made with the reference weight value of the circumstance 1 as an example, and the reference weight values of other circumstances are implemented in a similar way.

After the valid number of reference weight values are obtained, the reference weight values of the surrounding positions outside the current block are set based on the valid number of reference weight values, where the reference weight values of the surrounding positions outside the current block may monotonically increase or monotonically decrease.

Illustratively, the number of the surrounding positions outside the current block is the valid number and the number of the reference weight values is the valid number. Therefore, the valid number of reference weight values can be set as the reference weight values of the surrounding positions outside the current block.

For example, the first reference weight value is set as a reference weight value of the first surrounding position outside the current block, and the second reference weight value is set as a reference weight value of the second surrounding position outside the current block and so on.

Figure 6B:
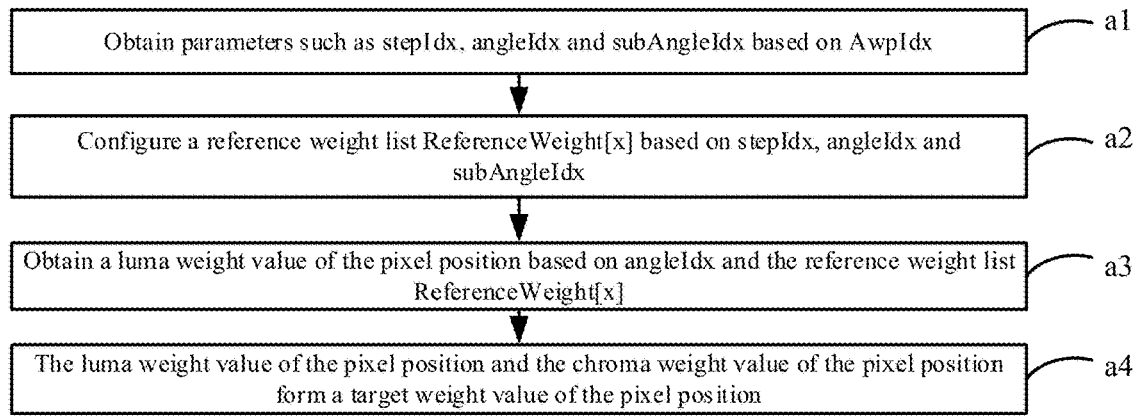
FIG. 6B is a flowchart of deriving a weight array according to an embodiment of the present disclosure.

Embodiment 8. In the above embodiments 1 to 7, the current block may include one sub-block, that is, the sub-block is the current block itself. For the current block, M and N represents a width and a height of the current block (i.e., a current prediction unit) respectively. In this case, as shown in FIG. 6B, a weight array derivation manner of an angular weighted prediction (AWP) may include steps a1 to a4.

At step a1, parameters such as stepIdx, angleIdx and subAngleIdx are obtained based on AwpIdx.

AwpIdx represents an index value of a weighted prediction angle and a weighted prediction position. If there are 7 weighted prediction positions and 8 weighted prediction angles, a value range of AwpIdx is 0 to 55. If the weighted prediction position is −3 to 3 (representing a fourth one weighted prediction position is a centre and the fourth one weighted prediction position is 0), and if an index of the weighted prediction angle is 0-7, the weighted prediction positions and the weighted prediction angles corresponding to 56 index values of AwpIdx are shown in Table 2.

TABLE 2

Figure 5B:
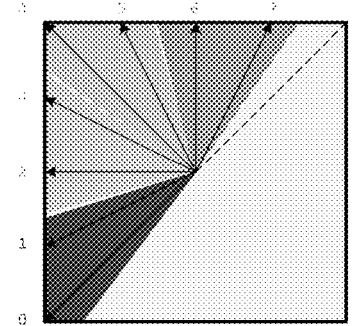

| AwpIdx | Weighted Prediction Position | Weighted Prediction Angle |
|--------|------------------------------|---------------------------|
| 0      | −3                           | 0                         |
| 1      | −3                           | 1                         |
| ...    | ...                          | ...                       |
| 7      | −3                           | 7                         |
| 8      | −2                           | 0                         |
| 9      | −2                           | 1                         |
| ...    | ...                          | ...                       |
| 55     | 3                            | 7                         | stepIdx represents a weighted prediction position which ranges from −3 to 3. For example, for a first one weighted prediction position, the weighted prediction position is −3; for a second one weighted prediction position, the weighted prediction position is −2, and so on; for a seventh one weighted prediction position, the weighted prediction position is 3.

angleIdx represents a log 2 logarithmic value of an absolute value of a slope of the weighted prediction angle (e.g., 0, or 1, or a larger constant), and subAngleIdx represents an angle area where the weighted prediction angle is located. FIG. 5B shows eight weighted prediction angles, where angleIdx of a weighted prediction angle 0 is a log 2 logarithmic value of an absolute value of a slope of the weighted prediction angle 0, and angleIdx of a weighted prediction angle 1 is a log 2 logarithmic value of an absolute value of a slope of the weighted prediction angle 1, and so on, and angleIdx of a weighted prediction angle 7 is a log 2 logarithmic value of an absolute value of a slope of the weighted prediction angle 7. The weighted prediction angle 0 and the weighted prediction angle 1 are located in an angle area 0, a weighted prediction angle 2 and a weighted prediction angle 3 are located in an angle area 1, a weighted prediction angle 4 and a weighted prediction angle 5 are located in an angle area 2, and a weighted prediction angle 6 and the weighted prediction angle 7 are located in an angle area 3.

Illustratively, stepIdx may be determined in a following formula: stepIdx=(AwpIdx>>3)−3.

Illustratively, modAngNum (angle index) may be firstly determined based on a following formula: modAngNum=AwpIdx % 8; then, angleIdx is determined based on modAngNum in a following manner: if modAngNum is equal to 2, angleIdx=7; if modAngNum is equal to 6, angleIdx=8; otherwise, angleIdx=modAngNum % 2.

Illustratively, subAngleIdx may be determined in a following formula: subAngleIdx=modAngNum>>1.

To sum up, after determining the weighted prediction angle of the current block and the weighted prediction position of the current block, a coder-side may, based on the weighted prediction angle and the weighted prediction position, determine the value of AwpIdx, as shown in Table 2. When the coder-side sends a coded bit stream to a decoder-side, the coded bit stream may carry the value of AwpIdx. In this way, the decoder-side may obtain the value of AwpIdx and then obtain stepIdx, angleIdx and subAngleIdx based on AwpIdx.

Illustratively, based on angleIdx and subAngleIdx, one weighted prediction angle can be uniquely determined as shown in Table 3. The weighted prediction angle may also be determined in another way, for example, by changing a partition number and so on.

TABLE 3

| Angle Index modAngNum | Angle Area subAngleIdx | Log2 Logarithmic Value of the Absolute Value of the Slope of the Weighted Prediction Angle angleIdx |
|---|---|---|
| 0 | 0 | 0 |
| 1 | 0 | 1 |
| 2 | 1 | Horizontal, and thus set a maximum value to make the value of ((x << 1) >> angleidx) to be 0 |
| 3 | 1 | 1 |
| 4 | 2 | 0 |
| 5 | 2 | 1 |
| 6 | 3 | Vertical, and thus set a maximum value to make the value of ((y << 1) >> angleidx) to be 0 |
| 7 | 3 | 1 |

At step a2, based on stepIdx, angleIdx and subAngleIdx, a reference weight list ReferenceWeight[x] is configured, which means setting reference weight values for surrounding positions outside the current block. Based on subAngleIdx, ReferenceWeight[x] can be calculated in following several circumstances.

Circumstance 1: if subAngleIdx is 0, that is, the weighted prediction angle is in the angle area 0, for example, the weighted prediction angle is the weighted prediction angle 0 or the weighted prediction angle 1, a weight transform start position FirstPos may be determined in a following formula: FirstPos=(ValidLength_H>>1)−6+DeltaPos_H. Then, the reference weight values of the surrounding positions outside the current block may be determined in a following formula: ReferenceWeights[x]=Clip3(0, 8, x−FirstPos). In the formula, descriptions are made with a minimum value of the reference weight values being 0, a maximum value of the reference weight values being 8 and a weight transform rate being 1 as an example, that is, the above formula may be equivalent to ReferenceWeights[x]=Clip3(minimum, maximum, a*(x−FirstPos)), where x may refer to an index of the surrounding positions outside the current block, x ranges between 0 and ValidLength_H−1 and "a" represents the weight transform rate.

In the above formula, ValidLength_H represents a number of the surrounding positions outside the current block (e.g., a valid number, also called a valid length). When subAngleIdx is 0, surrounding positions outside the current block pointed by the weighted prediction angle may be surrounding positions at a left one column. Therefore, the valid number is denoted as ValidLength_H. Illustratively, the valid number ValidLength_H may be determined in a following formula: ValidLength_H=(N+(M>>angleIdx))<<1, the shift left by one bit is because the formula adopts ½-pel precision. If 1-pel precision is used, the formula is: ValidLength_H=(N+(M>>angleIdx)). If ¼-pel precision is adopted, the formula is: ValidLength_H=(N+(M>>angleIdx))<<2. If it adopts an accuracy of 2-pel, ValidLength_H=(N+(M>>angleIdx))>>1. Other pixel precision are made in the same way, and no redundant descriptions are made herein. In subsequent formulas, the operations involved>>1 may change for different pixel precision.

In the above formula, DeltaPos_H represents a position variation parameter (e.g., an intermediate parameter). When subAngleIdx is 0, the surrounding positions outside the current block pointed by the weighted prediction angle may be surrounding positions at the left one column. Therefore, the position variation parameter is denoted as DeltaPos_H. Illustratively, DeltaPos_H is determined in a following formula: DeltaPos_H=stepIdx*((ValidLength_H>>3)−1).

Circumstance 2: if subAngleIdx is 1, that is, the weighted prediction angle is in the angle area 1, for example, the weighted prediction angle is the weighted prediction angle 2 or the weighted prediction angle 3, a weight transform start position FirstPos may be determined in a following formula: FirstPos=(ValidLength_H>>1)−4+DeltaPos_H−((M<<1)>>angleIdx). Then, the reference weight values of the surrounding positions outside the current block may be determined in a following formula: ReferenceWeights[x]=Clip3(0, 8, x−FirstPos). In the formula, descriptions are made with a minimum value of the reference weight values being 0, a maximum value of the reference weight values being 8 and a weight transform rate being 1 as an example. X represents an index of the surrounding positions outside the current block, and x ranges between 0 and ValidLength_H−1.

In the above formula, ValidLength_H and DeltaPos_H can be referred to the circumstance 1 and will not be repeated herein.

Circumstance 3: if subAngleIdx is 2, that is, the weighted prediction angle is in the angle area 2, for example, the weighted prediction angle is the weighted prediction angle 4 or the weighted prediction angle 5, a weight transform start position FirstPos may be determined in a following formula: FirstPos=(ValidLength_W>>1)−4+DeltaPos_W−((N<<1)>>angleIdx). Then, the reference weight values of the surrounding positions outside the current block may be determined in a following formula: ReferenceWeights[x]=Clip3(0, 8,x−FirstPos). In the formula, descriptions are made with a minimum value of the reference weight values being 0, a maximum value of the reference weight values being 8 and a weight transform rate being 1 as an example. X represents an index of the surrounding positions outside the current block, and x ranges between 0 and ValidLength_W−1.

In the above formula, ValidLength_W represents a number of the surrounding positions outside the current block (e.g., a valid number, also called a valid length). When subAngleIdx is 2, surrounding positions outside the current block pointed by the weighted prediction angle may be surrounding positions at an upper one row. Therefore, the valid number is denoted as ValidLength_W. Illustratively, the valid number ValidLength_W may be determined in a following formula: ValidLength_W=(M+(N>>angleIdx))<<1.

In the above formula, DeltaPos_W represents a position variation parameter (e.g., an intermediate parameter). When subAngleIdx is 2, the surrounding positions outside the current block pointed by the weighted prediction angle may be surrounding positions at the upper one row. Therefore, the position variation parameter is denoted as DeltaPos_W. Illustratively, DeltaPos_W is determined in a following formula: DeltaPos_W=stepIdx*((ValidLength_W>>3)−1).

Circumstance 4: if subAngleIdx is 3, that is, the weighted prediction angle is in the angle area 3, for example, the weighted prediction angle is the weighted prediction angle 6 or the weighted prediction angle 7, a weight transform start position FirstPos may be determined in a following formula: FirstPos=(ValidLength_W>>1)−6+DeltaPos_W. Then, the reference weight values of the surrounding positions outside the current block may be determined in a following formula: ReferenceWeights[x]=Clip3(0, 8, x−FirstPos). In the formula, descriptions are made with a minimum value of the reference weight values being 0, a maximum value of the reference weight values being 8 and a weight transform rate being 1 as an example. x represents an index of the surrounding positions outside the current block, and x ranges between 0 and ValidLength_W−1.

In the above formula, ValidLength_W and DeltaPos_W can be referred to the circumstance 3 and will not be repeated herein.

To sum up, which circumstance is to be used may be determined based on subAngleIdx, for example, in the circumstances 1 and 2, ValidLength_H and DeltaPos_H are determined based on angleIdx and stepIdx, and FirstPos is determined based on ValidLength_H and DeltaPos_H, and then, the reference weight values are set based on FirstPos. In the circumstances 3 and 4, ValidLength_W and DeltaPos_W are determined based on angleIdx and stepIdx, and FirstPos is determined based on ValidLength_W and DeltaPos_W, and then, the reference weight values are set based on FirstPos.

Figure 6C:
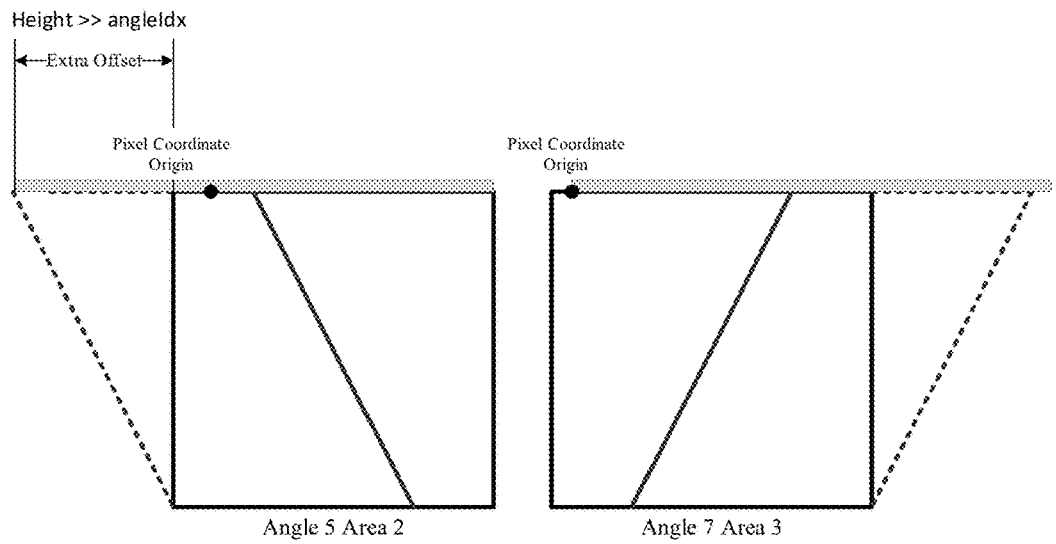
FIGS. 6C to 6D are schematic diagrams of angles of a current block at different areas according to an embodiment of the present disclosure.

The formulas of the above circumstances differ in that: when an upper left corner of the current block is used as a coordinate origin, a start position of the reference weight list ReferenceWeights[x] changes. For example, as shown in FIG. 6C, examples of the angle area 2 and the angle area 3 are shown. When ½-pel precision is adopted, a start position of the reference weight list ReferenceWeights[x] is (height<<1)>>angleIdx, i.e., the offset in the formula is "−((N<<1)>>angleIdx)". The angle area 0 and the angle area 1 are implemented in a similar way except that the offset in the formula is "−((M<<1)>>angleIdx)", i.e., the height is changed to a width.

At step a3, a luma weight value of the pixel position is obtained based on angleIdx and the reference weight list ReferenceWeight[x]. Based on subAngleIdx, the luma weight value of the pixel position can be determined in following several circumstances.

Circumstance 1: if subAngleIdx is 0, a luma weight value of a pixel position (x, y) may be determined in a following formula: AwpWeightArrayY[x][y]=ReferenceWeights[(y<<1)+((x<<1)>>angleIdx)], where (y<<1)+((x<<1)>>angleIdx) represents a surrounding position pointed by the pixel position (x, y), ReferenceWeights[(y<<1)+((x<<1)>>angleIdx)] represents a reference weight value of the surrounding position. A value range of x is from 0 to M−1 and a value range of y is from 0 to N−1.

Circumstance 2: if subAngleIdx is 1, a luma weight value of the pixel position (x, y) may be determined in a following formula: AwpWeightArrayY[x][y]=ReferenceWeights[(y<<1)−((x<<1)>>angleIdx)], where (y<<1)−((x<<1)>>angleIdx) represents a surrounding position pointed by the pixel position (x, y), ReferenceWeights[(y<<1)−((x<<1)>>angleIdx)] represents a reference weight value of the surrounding position. A value range of x is from 0 to M−1 and a value range of y is from 0 to N−1.

Circumstance 3: if subAngleIdx is 2, a luma weight value of a pixel position (x, y) may be determined in a following formula: AwpWeightArrayY[x][y]=ReferenceWeights[(x<<1)−((y<<1)>>angleIdx)], where (x<<1)−((y<<1)>>angleIdx) represents a surrounding position pointed by the pixel position (x, y), ReferenceWeights[(x<<1)−((y<<1)>>angleIdx)] represents a reference weight value of the surrounding position. A value range of x is from 0 to M−1 and a value range of y is from 0 to N−1.

Circumstance 4: if subAngleIdx is 3, the luma weight value of the pixel position (x, y) may be determined in a following formula: AwpWeightArrayY[x][y]=ReferenceWeights[(x<<1)+((y<<1)>>angleIdx)], where (x<<1)+((y<<1)>>angleIdx) represents a surrounding position pointed by the pixel position (x, y), ReferenceWeights[(x<<1)+((y<<1)>>angleIdx)] represents a reference weight value of the surrounding position. A value range of x is from 0 to M−1 and a value range of y is from 0 to N−1.

The above steps a2 and a3 may be combined into one step, that is, the step a2 (the reference weight list ReferenceWeight[x] is configured based on stepIdx, angleIdx and subAngleIdx, and configuring the reference weight list ReferenceWeight[x] means setting the reference weight values for the surrounding positions outside the current block) and the step a3 (the luma weight value of the pixel position is obtained based on angleIdx and the reference weight list ReferenceWeight[x]) may be combined into a step of obtaining the luma weight value of the pixel position based on stepIdx, angleIdx and subAngleIdx, that is, determining the luma weight value of the pixel position based on a coordinate value of a surrounding matching position of the current block and a coordinate value of the weight transform start position of the current block.

With the circumstance 1 as an example, if subAngleIdx is 0, that is, the weighted prediction angle is in the angle area 0, for example, the weighted prediction angle is the weighted prediction angle 0 or the weighted prediction angle 1, the weight transform start position FirstPos may be determined in a following formula: FirstPos=(ValidLength_H>>1)−6+DeltaPos_H. Then, the luma weight value of the pixel position (x, y) is determined in a following formula: AwpWeightArrayY[x][y]=Clip3(0, 8, (y<<1)+((x<<1)>>angleIdx)−FirstPos), where (y<<1)+((x<<1)>>angleIdx) represents a surrounding matching position pointed by the pixel position (x, y). Other circumstances are similar.

At step a4, a chroma weight value of the pixel position is obtained based on the luma weight value of the pixel position, and the luma weight value of the pixel position and the chroma weight value of the pixel position can form a target weight value of the pixel position.

For example, if a format of a chroma resolution is 4:2:0, the chroma weight value of the pixel position (x, y) is determined in a following formula: AwpWeightArrayUV[x][y]=AwpWeightArrayY[x<<1][y<<1]. For another example, if the format of the chroma resolution is 4:4:4, the chroma weight value of the pixel position (x, y) is determined in a following formula: AwpWeightArrayUV[x][y]=AwpWeightArrayY[x][y]. A value range of x is from 0 to M/2−1 and a value range of y is from 0 to N/2−1.

The step a4 can be implemented in another manner: instead of obtaining the chroma weight value based on the luma weight value, the chroma weight value of the pixel position is obtained based on angleIdx and the reference weight list ReferenceWeight[x]. For example, if the format of the chroma resolution is 4:2:0, the chroma weight value of the pixel position may be obtained based on angleIdx and the reference weight list ReferenceWeight[x].

For example, if subAngleIdx is 0, the chroma weight value of the pixel position (x, y) is determined in a following formula: AwpWeightArrayUV[x][y]=ReferenceWeights[(y<<2)+((x<<2)>>angleIdx)].

For example, if subAngleIdx is 1, the chroma weight value of the pixel position (x, y) is determined in a following formula: AwpWeightArrayUV [x][y]=ReferenceWeights[(y<<2)−((x<<2)>>angleIdx)].

For example, if subAngleIdx is 2, the chroma weight value of the pixel position (x, y) is determined in a following formula: AwpWeightArrayUV [x][y]=ReferenceWeights[(x<<2)−((y<<2)>>angleIdx)].

For example, if subAngleIdx is 3, the chroma weight value of the pixel position (x, y) is determined in a following formula: AwpWeightArrayUV [x][y]=ReferenceWeights[(x<<2)+((y<<2)>>angleIdx)].

In the above formulas, a value range of x is from 0 to M−1 and a value range of y is from 0 to N−1.

Figure 6D:
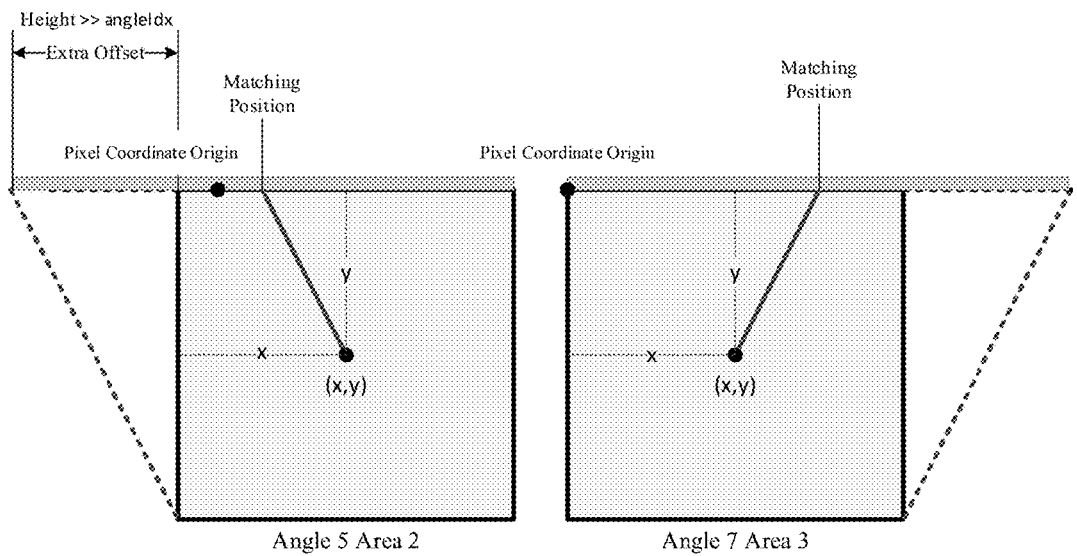

In the steps a3 and a4, the formulas of the circumstances differ in the following. As shown in FIG. 6D, examples of the angle area 2 and the angle area 3 are shown. When the upper left corner of the current block is taken as the coordinate origin, a calculation formula of a surrounding matching position of (x, y) in the angle area 2 may be x−y>>angleIdx, and the calculation formula of the surrounding matching position of (x, y) in the angle area 3 may be x+y>>angleIdx. When the ½-pel precision is adopted, the calculation formula of the surrounding matching position of (x, y) in the angle area 2 may be (x<<1)−((y<<1)>>angleIdx), and the calculation formula of the surrounding matching position of (x, y) in the angle area 3 may be (x<<1)+((y<<1)>>angleIdx). The angle area 0 and the angle area 1 can be implemented in a similar way except that the positions of x, y are exchanged.

Embodiment 9. In the above embodiments 1 to 3, the first prediction value of the pixel position is determined based on the first prediction mode and the second prediction value of the pixel position is determined based on the second prediction mode.

In this embodiment, descriptions are made with the first prediction mode being an inter prediction mode and the second prediction mode being an inter prediction mode as an example.

The first prediction mode is the inter prediction mode, the second prediction mode is the inter prediction mode, and a motion compensation candidate list is constructed, where the motion compensation candidate list includes at least two pieces of candidate motion information. One piece of candidate motion information is selected from the motion compensation candidate list as first target motion information of the current block, and another piece of candidate motion information is selected from the motion compensation candidate list as second target motion information of the current block. For each pixel position of the current block, the first prediction value of the pixel position is determined based on the first target motion information and the second prediction value of the pixel position is determined based on the second target motion information.

Illustratively, the coder-side and the decoder-side both can construct a motion compensation candidate list, and the motion compensation candidate list in the coder-side may be same as the motion compensation candidate list in the decoder-side, which is not limited herein.

Illustratively, pieces of the candidate motion information in the motion compensation candidate list are all single-hypothesis motion information, for example, the candidate motion information in the motion compensation candidate list is unidirectional motion information rather than bidirectional motion information. Since the pieces of candidate motion information are all single-hypothesis motion information, the motion compensation candidate list may be a unidirectional motion compensation candidate list.

Illustratively, when the motion compensation candidate list is constructed, spatial motion information (e.g., one or more spatial motion vectors) may be firstly added, and then temporal motion information (e.g., one or more temporal motion vectors) may be added; and/or, when the motion compensation candidate list is constructed, unidirectional motion information (e.g., one or more unidirectional motion vectors) may be firstly added, and then bidirectional motion information (e.g., one or more bidirectional motion vectors) may be added, which is not limited herein.

Illustratively, when the bidirectional motion information is added into the motion compensation candidate list, the bidirectional motion information is firstly split into two pieces of unidirectional motion information, and the two pieces of split unidirectional motion information are added into the motion compensation candidate list in order. Or, when the bidirectional motion information is added into the motion compensation candidate list, the bidirectional motion information is firstly cut into one piece of unidirectional motion information, and then this one piece of unidirectional motion information is added into the motion compensation candidate list. Illustratively, cutting the bidirectional motion information into one piece of unidirectional motion information includes: directly taking the unidirectional motion information from List0 (reference picture list 0); or, directly taking the unidirectional motion information from List1 (reference picture list 1); or, determining to take the unidirectional motion information from List0 or List1 based on an order of adding.

The above are only examples of the motion compensation candidate list and the motion information in the motion compensation candidate list is not limited herein.

The coder-side may, based on RDO, select one piece of candidate motion information from the motion compensation candidate list as the first target motion information of the current block, and select another piece of candidate motion information from the motion compensation candidate list as the second target motion information of the current block, where the first target motion information is different from the second target motion information, which is not limited herein.

In a possible implementation, when the coder-side sends a coded bit stream to the decoder-side, the coded bit stream may carry indication information a and indication information b. The indication information a indicates an index value 1 of the first target motion information of the current block and the index value 1 represents which candidate motion information in the motion compensation candidate list is the first target motion information. The indication information b indicates an index value 2 of the second target motion information of the current block and the index value 2 represents which candidate motion information in the motion compensation candidate list is the second target motion information. Illustratively, the index value 1 and the index value 2 may be different.

After receiving the coded bit stream, the decoder-side may parse the indication information a and the indication information b from the coded bit stream. Based on the indication information a, the decoder-side selects candidate motion information corresponding to the index value 1 from the motion compensation candidate list as the first target motion information of the current block. Based on the indication information b, the decoder-side selects candidate motion information corresponding to the index value 2 from the motion compensation candidate list as the second target motion information of the current block.

In another possible implementation, when the coder-side sends the coded bit stream to the decoder-side, the coded bit stream may carry indication information a and indication information c. The indication information a indicates an index value 1 of the first target motion information of the current block and the index value 1 represents which candidate motion information in the motion compensation candidate list is the first target motion information. The indication information c indicates difference between the index value 1 and an index value 2, where the index value 2 represents which candidate motion information in the motion compensation candidate list is the second target motion information. Illustratively, the index value 1 and the index value 2 may be different.

After receiving the coded bit stream, the decoder-side may parse the indication information a and the indication information c from the coded bit stream. Based on the indication information a, the decoder-side selects candidate motion information corresponding to the index value 1 from the motion compensation candidate list as the first target motion information of the current block. Based on the indication information c, the decoder-side firstly determines the index value 2 based on the index value 1 and the difference between the index value 1 and the index value 2, and then selects candidate motion information corresponding to the index value 2 from the motion compensation candidate list as the second target motion information of the current block.

A process in which the coder-side/decoder-side determines the first prediction value of the pixel position based on the first target motion information and determines the second prediction value of the pixel position based on the second target motion information can be referred to the inter prediction process and will not be repeated herein.

Illustratively, when the first prediction value of the pixel position is determined based on the first target motion information, the first prediction value of the pixel position may be obtained by using an inter weighted prediction mode. For example, an initial prediction value of the pixel position is determined based on the first target motion information, and then the initial prediction value is multiplied by a preset factor to obtain an adjustment prediction value. If the adjustment prediction value is greater than a maximum prediction value, the maximum prediction value is taken as the first prediction value of the current block; if the adjustment prediction value is less than a minimum prediction value, the minimum prediction value is taken as the first prediction value of the current block; and if the adjustment prediction value is not less than the minimum prediction value or not greater than the maximum prediction value, the adjustment prediction value is taken as the first prediction value of the current block. The above manner is only illustrative and will not be limited herein.

Similarly, when the second prediction value of the pixel position is determined based on the second target motion information, the second prediction value of the pixel position may be obtained by using the inter weighted prediction mode. The specific implementation can be referred to the above example and will not be repeated herein.

In the above cases, indication information of the prediction information of the first prediction mode and indication information of the prediction information of the second prediction mode may be interchangeable as long as the coder-side and the decoder-side are consistent. An interchange of the indication information does not affect a parsing process, that is, there is no parsing dependence. In a case of a same prediction mode candidate list, the indication information of the prediction information of the first prediction mode cannot be equal to the indication information of the prediction information of the second prediction mode. It is assumed that two indexes are coded, where an index value a is 1 and an index value b is 3, when the index value a is firstly coded, the index value b may be coded as 2(3−1); when the index value b is firstly coded, the index value b is to be coded as 3. In a word, coding indication information with a smaller index value first can reduce a coding overhead for coding a larger index value. Under a construction manner of the prediction mode candidate list, the first prediction mode highly probably comes from a left side, and based on this prior experience, adjustment can be made to the coder-side and the decoder-side, and indication information on the prediction information in an area adjacent to the left side can be firstly coded.

In the above case, the prediction mode candidate list may be a motion compensation candidate list, the prediction information of the first prediction mode may be the first target motion information and the prediction information of the second prediction mode may be the second target motion information. In the coded bit stream, the indication information of the first target motion information, such as the index value a, is firstly coded, and then the indication information of the second target motion information, such as the index value b, is coded. Alternatively, the indication information of the second target motion information, such as the index value b, is firstly coded, and then the indication information of the first target motion information, such as the index value a, is coded. For example, if the index value a is 1 and the index value b is 3, the index value a is coded before the index value b. For another example, if the index value b is 1 and the index value a is 3, the index value b is coded before the index value a.

Figure 7:
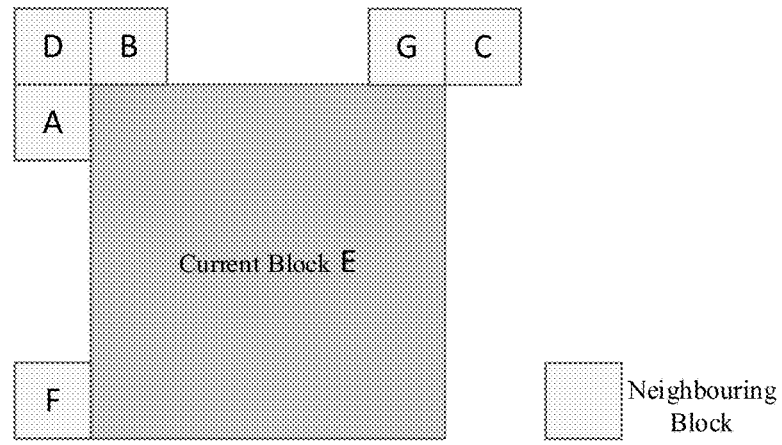
FIG. 7 is a schematic diagram illustrating neighbouring blocks of a current block according to an embodiment of the present disclosure.

Embodiment 10. For the embodiment 9, a motion compensation candidate list is to be constructed, which may be a unidirectional motion compensation candidate list. FIG. 7 is a schematic diagram of a current block and neighbouring blocks. In a process of constructing the motion compensation candidate list, based on the order of F, G, C, A, B, and D, pieces of unidirectional motion information are added into the motion compensation candidate list in an order of List0 priority, and a duplicate check is to be performed in a process of adding. The order of F, G, C, A, B, and D is only an example and another order may also be adopted, which is not limited herein.

If the motion compensation candidate list is not full, remaining bidirectional motion information is further split into unidirectional motion information and added into the motion compensation candidate list in the order of List0 as priority, and the duplicate check is to be performed during a process of adding.

Finally, if the motion compensation candidate list is not full, temporal motion information is further split into unidirectional motion information and added into the motion compensation candidate list in the order of List0 as priority, and the duplicate check is to be performed during a process of adding.

A strategy of List0 as priority is as follows: if there is motion information of List0, the motion information of List0 is added to the motion compensation candidate list and the duplicate check is to be performed during a process of adding. If there is motion information of List1, the motion information of List1 is added to the motion compensation candidate list and the duplicate check is to be performed during a process of adding.

The process of constructing the motion compensation candidate list is described below in combination with several specific application scenarios.

Application scenario 1: at step 1, as shown in FIGS. 7, F, G, C, A, B, and D are neighbouring prediction blocks of the current block E, and based on the order of F, G, C, A, B, and D (this order may be changeable, for example, the order of D, B, A, C, G, and F may be used, or another order may be used; further, one or more neighbouring prediction blocks may be deleted, for example, only F, G, C, A and D are used), their related motion information (if any) is added into the motion compensation candidate list in the order of List0 as priority, and the duplicate check is to be performed during a process of adding, until the detecting of all motion information is completed or a length of the motion compensation candidate list reaches X−1.

At step 2, since a length of the motion compensation candidate list is less than X, unidirectional motion information pointing to List0 (if any) in derived temporal motion information is added to the motion compensation candidate list and the duplicate check is to be performed during a process of adding.

At step 3, if the length of the motion compensation candidate list is less than X, unidirectional motion information pointing to List1 (if any) in the derived temporal motion information is added to the motion compensation candidate list and the duplicate check is to be performed during a process of adding.

At step 4, if the length of the motion compensation candidate list is less than X, a repetitive filling operation is performed for a last piece of unidirectional motion information in the motion compensation candidate list until the length of the motion compensation candidate list is X.

In the above embodiment, X may be any positive integer, for example, X may be 4 or 5 or the like.

Application scenario 2: at step 1, F, G, C, A, B, and D are neighbouring prediction blocks of the current block E, and based on the order of F, G, C, A, B, and D, their related motion information (if any) is added into the motion compensation candidate list in the order of List0 as priority, and the duplicate check is to be performed during the process of adding, until the detecting of all motion information is completed or a length of the motion compensation candidate list reaches X.

At step 2, if the length of the motion compensation candidate list is less than X, unidirectional motion information pointing to List0 (if any) in the derived temporal motion information is added to the motion compensation candidate list and the duplicate check is to be performed during a process of adding.

At step 3, if the length of the motion compensation candidate list is less than X, unidirectional motion information pointing to List1 (if any) in the derived temporal motion information is added to the motion compensation candidate list and the duplicate check is to be performed during the process of adding.

At step 4, if the length of the motion compensation candidate list is less than X, a repetitive filling operation is performed for a last piece of unidirectional motion information in the motion compensation candidate list until the length of the motion compensation candidate list is X.

In the above embodiment, X may be any positive integer, for example, X may be 4 or 5 or the like.

Illustratively, the application scenario 1 differs from the application scenario 2 in that the application scenario 1 has at least one reserved position for the temporal motion information, that is, at step 1, the length of the motion compensation candidate list reaches X−1 at most rather than reaches X.

Application scenario 3: at step 1, F, G, C, A, B, and D are neighbouring prediction blocks of the current block E, and based on the order of F, G, C, A, B, and D, unidirectional motion information (if any) is added into the motion compensation candidate list in turn, and the duplicate check is to be performed during a process of adding, until the detecting of all unidirectional motion information is completed or the length of the motion compensation candidate list reaches X−1.

At step 2, if the length of the motion compensation candidate list is less than X−1, bidirectional motion information (if any) of F, G, C, A, B, and D is added into the motion compensation candidate list in the order of List0 as priority and the duplicate check is to be performed during a process of adding, until the detecting of all bidirectional motion information is completed or a length of the motion compensation candidate list reaches X−1.

At step 3, if the length of the motion compensation candidate list is less than X, unidirectional motion information (if any) pointing to List0 in derived temporal motion information is added to the motion compensation candidate list and the duplicate check is to be performed during a process of adding.

At step 4, if the length of the motion compensation candidate list is less than X, unidirectional motion information (if any) pointing to List1 in the derived temporal motion information is added to the motion compensation candidate list and the duplicate check is to be performed during a process of adding.

At step 5, if the length of the motion compensation candidate list is less than X, a repetitive filling operation is performed for a last piece of unidirectional motion information in the motion compensation candidate list until the length of the motion compensation candidate list is X.

In the above embodiment, X may be any positive integer, for example, X may be 4 or 5 or the like.

In a possible implementation, the application scenario 3 may be described in another form:

At step 1, F, G, C, A, B, and D are neighbouring prediction blocks of the current block E, and based on the order of F, G, C, A, B, and D, availability of F, G, C, A, B, and D is determined: if F is present and an inter prediction mode is adopted, F may be determined to be available; otherwise, F is determined to be unavailable. If G is present and the inter prediction mode is adopted, G may be determined to be available; otherwise, G is determined to be unavailable. If C is present and the inter prediction mode is adopted, C may be determined to be available; otherwise, C is determined to be unavailable. If A is present and the inter prediction mode is adopted, A may be determined to be available; otherwise, A is determined to be unavailable. If B is present and the inter prediction mode is adopted, B may be determined to be available; otherwise, B is determined to be unavailable. If D is present and the inter prediction mode is adopted, D may be determined to be available; otherwise, D is determined to be unavailable.

At step 2, based on the order of F, G, C, A, B, and D, available unidirectional motion information is added to the motion compensation candidate list in turn and the duplicate check is to be performed during a process of adding, until the length of the motion compensation candidate list reaches X−1 or traversal is completed.

At step 3, if the length of the motion compensation candidate list is less than X−1, available bidirectional motion information is split into unidirectional motion information pointing to List0 and unidirectional motion information pointing to List1 which are then added into the motion compensation candidate list in turn and subjected to the duplicate check until the length of the motion compensation candidate list is X−1 or traversal is completed.

At step 4, derived temporal bidirectional motion information is split into unidirectional motion information pointing to List0 and unidirectional motion information pointing to List1; the duplicate check is performed firstly for the unidirectional motion information, and if the unidirectional motion information is not duplicate, the unidirectional motion information is added to the motion compensation candidate list until the length of the motion compensation candidate list is X or traversal is completed.

At step 5, if the length of the motion compensation candidate list is less than X, a repetitive filling operation is performed for a last piece of unidirectional motion information in the motion compensation candidate list until the length of the motion compensation candidate list is X.

In the above embodiment, X may be any positive integer, for example, X may be 4 or 5 or the like.

Application scenario 4: at step 1, F, G, C, A, B, and D are neighbouring prediction blocks of the current block E, and based on the order of F, G, C, A, B, and D, unidirectional motion information (if any) is added into the motion compensation candidate list in turn, and the duplicate check is to be performed during a process of adding, until the detecting of all unidirectional motion information is completed or a length of the motion compensation candidate list reaches X.

At step 2, if the length of the motion compensation candidate list is less than X, bidirectional motion information (if any) of F, G, C, A, B, and D is added into the motion compensation candidate list in the order of List0 as priority and the duplicate check is to be performed during a process of adding, until the detecting of all bidirectional motion information is completed or the length of the motion compensation candidate list reaches X.

At step 3, if the length of the motion compensation candidate list is less than X, unidirectional motion information (if any) pointing to List0 in the derived temporal motion information is added to the motion compensation candidate list and the duplicate check is to be performed during a process of adding.

At step 4, if the length of the motion compensation candidate list is less than X, unidirectional motion information (if any) pointing to List1 in the derived temporal motion information is added to the motion compensation candidate list and the duplicate check is to be performed during a process of adding.

At step 5, if the length of the motion compensation candidate list is less than X, a repetitive filling operation is performed for a last piece of unidirectional motion information in the motion compensation candidate list until the length of the motion compensation candidate list is X.

In the above embodiment, X may be any positive integer, for example, X may be 4 or 5 or the like.

Illustratively, the application scenario 3 differs from the application scenario 4 in that the application scenario 3 has at least one reserved position for temporal motion information, that is, at step 1, a length of the motion compensation candidate list reaches X−1 at most rather than reaches X.

In the above application scenarios 1 to 4, a derivation scheme of the temporal motion information belongs to related arts, for example, the temporal motion information of the current block can be derived through a collocated block of a collocated picture, which is not limited herein.

Application scenario 5: in the application scenarios 1 to 4, if a length of the motion compensation candidate list is less than X, the repetitive filling operation is performed for a last piece of unidirectional motion information in the motion compensation candidate list. In the application scenario 5, the repetitive filling operation is no longer performed for the last piece of unidirectional motion information but a filling operation is performed by derivation. For example, with any one piece of valid motion information (x, y, ref_idx, ListX) in the motion compensation candidate list as a basis, ref_idx and ListX represent a reference index and a reference list respectively, which are collectively called reference picture information, and at least one piece of candidate motion information as followings can be added:

(x+a, y+b, ref_idx, ListX), where a and b may be any integer; (k1*x, k1*y, ref_idx_new1, ListX), where k1 is any non-zero positive integer, that is a scaling operation is performed for a motion vector; (k2*x, k2*y, ref_idx_new2, ListY), where k2 is any non-zero positive integer, that is, a scaling operation is performed for the motion vector.

Furthermore, adding zero motion vectors may also be performed, that is, candidate motion information may be (0, 0, ref_idx3, ListZ). For above candidate motion information, when the candidate motion information is added to the motion compensation candidate list, the duplicate check may be performed or not performed.

Application scenario 6: in the application scenarios 1 to 4, a length of the motion compensation candidate list is X. For the embodiment 9, two pieces of candidate motion information are selected from the motion compensation candidate list as target motion information of the current block.

Therefore, the length of the motion compensation candidate list may be from 2 to H, where H may be configured based on experience, for example, configured as 4, or 5 or the like. On this basis, the coder-side may set a length of the motion compensation candidate list (e.g., a length of the motion compensation candidate list of an AWP mode, or a length of the motion compensation candidate list of an Enhanced Angular Weighted Prediction (EAWP) mode) through a sequence-level syntax. For example, awp_max_cand_num is used to indicate a length of the motion compensation candidate list. If a value indicated by awp_max_cand_num is "a" which ranges between 2 and H, the decoder-side may determine the length of the motion compensation candidate list based on awp_max_cand_num, for example, the length X is "a". Optionally, awp_max_cand_num_minus2 is used to indicate a length of motion compensation candidate list. If the value indicated by awp_max_cand_num_minus2 is "a" which ranges between 0 and (H−2), the decoder-side may determine the length of the motion compensation candidate list based on awp_max_cand_num_minus2, for example, the length X is a+2. Optionally, the coder-side may set a length of the motion compensation candidate list through a picture-level syntax, for example, the length of the motion compensation candidate list is indicated based on slice_awp_max_cand_num. If a value indicated by slice_awp_max_cand_num is "a" which ranges between 2 and H, the decoder-side may determine the length of the motion compensation candidate list based on slice_awp_max_cand_num, for example, the length X is "a". Optionally, slice_awp_max_cand_num_minus2 is used to indicate a length of the motion compensation candidate list. If a value indicated by slice_awp_max_cand_num_minus2 is "a" which ranges between 0 and (H−2), the decoder-side may determine the length of the motion compensation candidate list based on slice_awp_max_cand_num_minus2, for example, the length X is a+2.

Application scenario 7: in the application scenarios 1 to 4, the motion compensation candidate list may be constructed. In the application scenario 7, the motion compensation candidate list is denoted as AwpUniArray and motion information in AwpUniArray is referred to as candidate motion information. For the embodiment 9, candidate motion information may be selected from AwpUniArray as target motion information of the current block, and then, a prediction value of a pixel position is determined based on the target motion information.

For the embodiment 9, two pieces of candidate motion information are selected from AwpUniArray as first target motion information and second target motion information of the current block. On this basis, the decoder-side may parse AwpCandIdx0 and AwpCandIdx1 from a coded bit stream and assign the (AwpCandIdx0+1)-th motion information in AwpUniArray to mvAwp0L0, mvAwp0L1, RefIdxAwp0L0 and RefIdxAwp0L1, and assign the (AwpCandIdx1+1)-th motion information in AwpUniArray to mvAwp1L0, mvAwp1L1, RefIdxAwp1L0 and RefIdxAwp1L1. The (AwpCandIdx0+1)-th motion information in AwpUniArray may also be assigned to mvAwp1L0, mvAwp1L1, RefIdxAwp1L0, and RefIdxAwp1L1, and the (AwpCandIdx1+1)-th motion information in AwpUniArray may be assigned to mvAwp0L0, mvAwp0L1, RefIdxAwp0L0 and RefIdxAwp0L1, which is not limited herein.

Illustratively, AwpCandIdx0 represents an index value of first target motion information. Therefore, the (AwpCandIdx0+1)-th motion information in AwpUniArray may be assigned to the first target motion information. For example, if AwpCandIdx0 is 0, the first motion information in AwpUniArray is assigned to the first target motion information; if AwpCandIdx0 is 1, the second motion information in the AwpUniArray is assigned to the first target motion information and so on.

mvAwp0L0, mvAwp0L1, RefIdxAwp0L0 and RefIdxAwp0L1 are combined as the first target motion information, that is, the first target motion information includes unidirectional motion information pointing to List0 and unidirectional motion information pointing to List1.

If the (AwpCandIdx0+1)-th motion information in AwpUniArray is the unidirectional motion information pointing to List0, the first target motion information includes the unidirectional motion information pointing to List0, and the unidirectional motion information pointing to List1 is null.

If the (AwpCandIdx0+1)-th motion information in AwpUniArray is the unidirectional motion information pointing to List1, the first target motion information includes the unidirectional motion information pointing to List1, and the unidirectional motion information pointing to List0 is null.

Illustratively, mvAwp0L0 and RefIdxAwp0L0 represent unidirectional motion information pointing to List0 in first target motion information, and mvAwp0L1 and RefIdxAwp0L1 represent unidirectional motion information pointing to List1 in the first target motion information.

If RefIdxAwp0L0 is valid, which indicates the unidirectional motion information pointing to List0 is valid. Thus, a prediction mode of the first target motion information is PRED_List0, that is, a prediction value of the pixel position of the unidirectional motion information pointing to List0 may be adopted.

If RefIdxAwp0L1 is valid, which indicates the unidirectional motion information pointing to List1 is valid. Thus, the prediction mode of the first target motion information is PRED_List1, that is, a prediction value of the pixel position of the unidirectional motion information pointing to List1 may be adopted.

Illustratively, AwpCandIdx1 represents an index value of the second target motion information. Therefore, the (AwpCandIdx1+1)-th motion information in AwpUniArray may be assigned to the second target motion information. For example, if AwpCandIdx1 is 0, the first motion information in AwpUniArray is assigned to the second target motion information; if AwpCandIdx1 is 1, the second motion information in the AwpUniArray is assigned to the second target motion information and so on.

mvAwp1L0, mvAwp1L1, RefIdxAwp1L0 and RefIdxAwp1L1 are combined as the second target motion information, that is, the second target motion information includes unidirectional motion information pointing to List0 and unidirectional motion information pointing to List1.

If the (AwpCandIdx1+1)-th motion information in AwpUniArray is the unidirectional motion information pointing to List0, the second target motion information includes the unidirectional motion information pointing to List0, and the unidirectional motion information pointing to List1 is null.

If the (AwpCandIdx1+1)-th motion information in AwpUniArray is the unidirectional motion information pointing to List1, the second target motion information includes the unidirectional motion information pointing to List1, and the unidirectional motion information pointing to List0 is null.

Illustratively, mvAwp1L0 and RefIdxAwp1L0 represent unidirectional motion information pointing to List0 in second target motion information, and mvAwp1L1 and RefIdxAwp1L1 represent unidirectional motion information pointing to List1 in the second target motion information.

If RefIdxAwp1L0 is valid, which indicates the unidirectional motion information pointing to List0 is valid. Thus, a prediction mode of the second target motion information is PRED_List0, that is, a prediction value of the pixel position of the unidirectional motion information pointing to List0 may be adopted.

If RefIdxAwp1L1 is valid, which indicates the unidirectional motion information pointing to List1 is valid. Thus, the prediction mode of the second target motion information is PRED_List1, that is, a prediction value of the pixel position of the unidirectional motion information pointing to List1 may be adopted.

Embodiment 11. In the above embodiments 1 to 3, it is to determine the first prediction value of the pixel position based on the first prediction mode, and determine the second prediction value of the pixel position based on the second prediction mode. In this embodiment, descriptions are made with the first prediction mode is an inter prediction mode and the second prediction mode is an inter prediction mode as an example.

The first prediction mode is the inter prediction mode, the second prediction mode is the inter prediction mode, and a motion compensation candidate list is constructed, where the motion compensation candidate list includes at least two pieces of candidate motion information. One piece of candidate motion information is selected from the motion compensation candidate list as first origin motion information of the current block, and another piece of candidate motion information is selected from the motion compensation candidate list as second origin motion information of the current block, where the first origin motion information and the second origin motion information are different. Then, based on the first origin motion information, first target motion information of the current block is determined, and based on the second origin motion information, second target motion information of the current block is determined. For each pixel position of the current block, a first prediction value of the pixel position is determined based on the first target motion information and a second prediction value of the pixel position is determined based on the second target motion information.

A process of constructing the motion compensation candidate list can be referred to the embodiments 9 and 10 and will not be repeated herein. A process of determining the first prediction value based on the first target motion information and determining the second prediction value based on the second target motion information can be referred to the embodiment 9 and will not be repeated herein. Different from the embodiment 9, in the embodiment 11, the candidate motion information selected from the motion compensation candidate list is as origin motion information rather than as target motion information. After the origin motion information is obtained, the target motion information may be obtained based on the origin motion information. A specific obtaining process can be referred to the subsequent embodiments.

To sum up, for the above circumstance, when at least one of the first prediction mode or the second prediction mode is the inter prediction mode, a motion compensation candidate list may be constructed, where the motion compensation candidate list includes at least one piece of candidate motion information. Next, two pieces of candidate motion information are selected from the motion compensation candidate list as the first origin motion information and the second origin motion information of the current block. The first target motion information is determined based on the first origin motion information and the second target motion information is determined based on the second origin motion information. Next, two prediction values of the pixel position are determined based on the two pieces of target motion information.

For how to determine the target motion information based on the origin motion information, the embodiments provide schemes of superimposing unidirectional motion information on a motion vector difference. For example, the origin motion information includes an origin motion vector and the target motion information includes a target motion vector. To determine a target motion vector of the current block based on the origin motion vector, a motion vector difference (MVD) corresponding to the origin motion vector may be obtained and the target motion vector is determined based on the motion vector difference and the origin motion vector, that is, a sum of the motion vector difference and the origin motion vector is taken as the target motion vector.

Embodiment 12. On a basis of embodiment 11, direction information and amplitude information of the motion vector difference are agreed on. If the direction information indicates that a direction is rightward and the amplitude information indicates that an amplitude is Ar, the motion vector difference is (Ar, 0). If the direction information indicates that the direction is downward and the amplitude information indicates that the amplitude is Ad, the motion vector difference is (0, −Ad). If the direction information indicates that the direction is leftward and the amplitude information indicates that the amplitude is Al, the motion vector difference is (−Al, 0). If the direction information indicates that the direction is upward and the amplitude information indicates that the amplitude is Au, the motion vector difference is (0, Au). If the direction information indicates that the direction is right-upward and the amplitude information indicates that the amplitude is Aru, the motion vector difference is (Aru, Aru). If the direction information indicates that the direction is left-upward and the amplitude information indicates that the amplitude is Alu, the motion vector difference is (−Alu, Alu). If the direction information indicates that the direction is left-downward and the amplitude information indicates that the amplitude is Ald, the motion vector difference is (−Ald, −Ald). If the direction information indicates that the direction is right-downward and the amplitude information indicates that the amplitude is Ard, the motion vector difference is (Ard, −Ard).

It is noted that the above amplitudes Ar, Ad, Al, Au, Aru, Alu, Ald, and Ard respectively indicate one set of values, and the values in the amplitude sets of different directions may be completely same or partially same, or completely different.

Illustratively, the motion vector difference may support all or part of the above direction information, a value range of the amplitude A supported by the motion vector difference may be configured based on experience, and the amplitude A may include at least one value, which is not limited herein.

For example, the motion vector difference supports four directions: upward, downward, leftward and rightward, and the motion vector difference supports following five step length configurations: ¼-pel, ½-pel, 1-pel, 2-pel and 4-pel, that is, the value of the amplitude A may be 1, 2, 4, 8 and 16. To sum up, when the direction is upward, the motion vector difference may be (0, 1), (0, 2), (0, 4), (0, 8), and (0, 16). When the direction is downward, the motion vector difference may be (0, −1), (0, −2), (0, −4), (0, −8), and (0, −16). When the direction is leftward, the motion vector difference may be (−1, 0), (−2, 0), (−4, 0), (−8, 0), and (−16, 0). When the direction is rightward, the motion vector difference may be (1, 0), (2, 0), (4, 0), (8, 0), and (16, 0).

For another example, the motion vector difference supports four directions: upward, downward, leftward and rightward, and the motion vector difference supports following six step length configurations: ¼-pel, ½-pel, 1-pel, 2-pel, 3-pel and 4-pel, that is, the value of the amplitude A may be 1, 2, 4, 8 and 16. To sum up, when the direction is upward, the motion vector difference may be (0, 1), (0, 2), (0, 4), (0, 8), (0, 12) and (0, 16). The motion vector differences of other directions may be implemented in a same way as in the "upward" direction and will not be repeated herein.

For another example, the motion vector difference supports eight directions: upward, downward, leftward, rightward, left-upward, left-downward, right-upward, and right-downward, and the motion vector difference supports following three step length configurations: ¼-pel, ½-pel and 1-pel, that is, the value of the amplitude A may be 1, 2 and 4. To sum up, when the direction is left-upward, the motion vector difference may be (−1, 1), (−2, 2), and (−4, 4). When the direction is right-upward, the motion vector difference may be (1, 1), (2, 2), and (4, 4). The motion vector differences of other directions may be implemented in a same way as in the "left upward and right upward" directions, and the values of the motion vector differences can be referred to the above agreement and will not be repeated herein.

For another example, the motion vector difference supports four directions: upward, downward, leftward and rightward, and the motion vector difference supports following four step length configurations: ¼-pel, ½-pel, 1-pel, and 2-pel, that is, the value of the amplitude A may be 1, 2, 4, and 8.

The above examples are only illustrative and no limitation is made herein. For example, the direction supported by the motion vector difference may be selected arbitrarily, for example, may be selected as upward, downward, leftward, rightward, left-upward and left-downward, or as two directions, such as upward and downward, or the like. For another example, the step length configuration supported by the motion vector difference may be changeable, and can be configured flexibly. For another example, the step length configuration may be adaptively configured based on coding parameters such as a QP (Quantization Parameter) and the like. For example, 1-pel, 2-pel, 4-pel and 8-pel may be adopted for a larger QP, and ¼-pel, ½-pel, 1-pel and 2-pel may be adopted for a smaller QP. For another example, an appropriate step length configuration may be set at sequence level, picture level, frame level, slice level, tile level, patch level, CTU level, and the like, and the decoder-side performs a decoding operation according to the step length configurations parsed at sequence level, picture level, frame level, slice level, tile level, patch level, CTU level, and the like.

For ease of descriptions, in subsequent embodiments, the motion vector difference supports the upward and downward directions, and supports the step length configurations such as 1-pel and 2-pel, in a case of ¼-pel precision, the motion vector difference may be (0, 4), (0, 8), (0, −4), (0, −8), that is, (0, 1<<2), (0, 1<<3), (0, −1<<2) and (0, −1<<3).

After constructing the motion compensation candidate list, the coder-side may sequentially traverse each candidate motion vector in the motion compensation candidate list. When a candidate motion vector 1 is traversed, a sum of the candidate motion vector 1 and the motion vector difference (0, 4) is taken as a candidate motion vector 1-1, and a RDO cost value 1-1 corresponding to the candidate motion vector 1-1 is determined. The above determination process is not limited herein. A sum of the candidate motion vector 1 and the motion vector difference (0, 8) is taken as a candidate motion vector 1-2, and a RDO cost value 1-2 corresponding to the candidate motion vector 1-2 is determined. A sum of the candidate motion vector 1 and the motion vector difference (0, −4) is taken as a candidate motion vector 1-3, and a RDO cost value 1-3 corresponding to the candidate motion vector 1-3 is determined. A sum of the candidate motion vector 1 and the motion vector difference (0, −8) is taken as a candidate motion vector 1-4, and a RDO cost value 1-4 corresponding to the candidate motion vector 1-4 is determined.

By analogy, for each of the candidate motion vectors traversed, a RDO cost value can be obtained by processing in the above manner. After all candidate motion vectors are traversed, a minimum RDO cost value is selected from all RDO cost values. If a RDO cost value 1-1 is minimum, the coder-side may code following contents in a coded bit stream: an index value of the candidate motion vector 1 in the motion compensation candidate list, direction information and amplitude information of the motion vector difference (0, 4), where the direction information is used to indicate a direction of the motion vector difference (0, 4) is upward, and the amplitude information is used to indicate an amplitude of the motion vector difference (0, 4) is 4. For example, indication information of the direction information may be 0, which indicates a first direction in a direction list (upward and downward), and indication information of the amplitude information may be 4 which indicates a first step length configuration in a step length configuration list (1-pel, 2-pel). The above process is a simplified example, which is not limited herein as long as the direction information and the amplitude information can be indicated.

For example, when the motion vector difference supports four directions: upward, downward, leftward and rightward, and the motion vector difference supports five step length configurations: ¼-pel, ½-pel, 1-pel, 2-pel and 4-pel, the direction information of the motion vector difference may be coded by using 2 bin fixed-length code (four values in total), where the four values of the 2 bin fixed-length code respectively represent four directions: upward, downward, leftward and rightward. The amplitude information of the motion vector difference may be coded by using truncated unary, that is, the five step length configurations are indicated by truncated unary.

For another example, when the motion vector difference supports four directions: upward, downward, leftward and rightward, and the motion vector difference supports six step length configurations: ¼-pel, ½-pel, 1-pel, 2-pel, 3-pel and 4-pel, the direction information of the motion vector difference may be coded by using 2 bin fixed-length code (four values in total), and the amplitude information of the motion vector difference may be coded by using truncated unary.

For another example, when the motion vector difference supports eight directions: upward, downward, leftward, rightward, left-upward, left-downward, right-upward and right-downward, and the motion vector difference supports three step length configurations: ¼-pel, ½-pel and 1-pel, the direction information of the motion vector difference may be coded by using 3 bin fixed-length code (eight values in total), and the amplitude information of the motion vector difference may by coded by using truncated unary.

For another example, when the motion vector difference supports four directions: upward, downward, leftward, rightward, and the motion vector difference supports four step length configurations: ¼-pel, ½-pel, 1-pel, and 2-pel, the direction information of the motion vector difference may be coded by using truncated unary, and the amplitude information of the motion vector difference may be coded by using 2 bin fixed-length code (four values in total).

The above coding manners are only examples and not limited herein.

To sum up, the coder-side may search an optimal motion vector within a certain area and then take difference between the optimal motion vector and a candidate motion vector as a Motion Vector Difference (MVD), and code the amplitude information and the direction information of the motion vector difference and an index value of the candidate motion vector in the motion compensation candidate list into a bit stream. When the coder-side searches for the optimal motion vector within a certain area, the direction and the amplitude of the motion vector difference are expected to be agreed on, that is, the optimal motion vector is searched within limited ranges of the motion vector difference, such as (Ar, 0), (0, −Ad), (−Al, 0), (0, Au), (Aru, Aru), (−Aru, Alu), (−Ald, −Ald), and (Ard, −Ard) and the like, rather than the optimal motion vector is searched within any range of the motion vector difference.

After receiving the coded bit stream of the current block, the decoder-side may parse the index value of the candidate motion vector in the motion compensation candidate list from the coded bit stream, and select a candidate motion vector corresponding to the index value in the motion compensation candidate list, and take the candidate motion vector as an origin motion vector of the current block. The decoder-side may also parse the direction information and the amplitude information of the motion vector difference from the coded bit stream and determine the motion vector difference based on the direction information and the amplitude information.

Next, the decoder-side may determine a target motion vector of the current block based on the motion vector difference and the origin motion vector, for example, a sum of the motion vector difference and the origin motion vector can be taken as the target motion vector of the current block.

Referring to the above embodiment, when coding direction information of the motion vector difference, the coder-side may use a fixed-length code or a truncated unary or the like. Therefore, the decoder-side may use the fixed-length code or the truncated unary or the like to decode the direction information of the motion vector difference so as to obtain the direction information of the motion vector difference, such as upward, downward, leftward, rightward, left-upward, left-downward, right-upward, and right-downward and so on.

Referring to the above embodiment, when coding amplitude information of the motion vector difference, the coder-side may use a fixed-length code or a truncated unary or the like. Therefore, the decoder-side may use the fixed-length code or the truncated unary or the like to decode the amplitude information of the motion vector difference so as to obtain the amplitude information of the motion vector difference, such as step length configurations: ¼-pel, ½-pel, 1-pel, 2-pel and the like, and then determine a value of the amplitude A of the motion vector difference based on the step length configuration, such as ¼-pel, ½-pel, 1-pel and 2-pel.

To sum up, the decoder-side may parse the direction information and the amplitude information of the motion vector difference from the coded bit stream, and then determine the motion vector difference based on the direction information and the amplitude information.

In a possible implementation, the coder-side may further code flag information in the coded bit stream, where the flag information indicates superimposing motion vector difference on origin motion vector, or not superimposing the motion vector difference on the origin motion vector. The flag information may be a sub-mode flag of an EAWP mode. Further, the EAWP mode may also be called AWP with Motion Vector Refinement (AWP-MVR) mode. After receiving the coded bit stream of the current block, the decoder-side firstly parses the sub-mode flag of the Enhanced Angular Weighted Prediction (EAWP) mode from the coded bit stream of the current block. If the sub-mode flag indicates superimposing the motion vector difference on the origin motion vector, the decoder-side parses the direction information and the amplitude information of the motion vector difference from the coded bit stream of the current block, and determines the motion vector difference based on the direction information and the amplitude information, and determines the target motion vector of the current block based on the origin motion vector and the motion vector difference. If the sub-mode flag indicates not superimposing the motion vector difference on the origin motion vector, the decoder-side does not parse the direction information or the amplitude information of the motion vector difference, but directly takes the origin motion vector as the target motion vector of the current block.

Illustratively, when the sub-mode flag of the EAWP mode is a first sub-mode value, it indicates superimposing the motion vector difference on the origin motion vector; when the sub-mode flag of the EAWP mode is a second sub-mode value, it indicates not superimposing the motion vector difference on the origin motion vector. The first sub-mode value and the second sub-mode value may be configured based on experience, for example, the first sub-mode value may be 1 and the second sub-mode value may be 0, or, for example, the first sub-mode value may be 0 and the second sub-mode value may be 1. Above are only two examples and no limitation is made herein.

In a possible implementation, for the embodiment 11, the first origin motion information includes a first origin motion vector, the first target motion information includes a first target motion vector, the second origin motion information includes a second origin motion vector and the second target motion information includes a second target motion vector. Based on the above, a first motion vector difference corresponding to the first origin motion vector may be obtained, and the first target motion vector is determined based on the first motion vector difference and the first origin motion vector, that is, a sum of the first motion vector difference and the first origin motion vector is taken as the first target motion vector. A second motion vector difference corresponding to the second origin motion vector may be obtained, and the second target motion vector is determined based on the second motion vector difference and the second origin motion vector, that is, a sum of the second motion vector difference and the second origin motion vector is taken as the second target motion vector.

The coder-side may use the RDO to determine the first motion vector difference corresponding to the first origin motion vector and determine the second motion vector difference corresponding to the second origin motion vector, which is not limited herein.

When the coder-side sends the coded bit stream of the current block to the decoder-side, the coded bit stream may carry direction information and amplitude information of the first motion vector difference and direction information and amplitude information of the second motion vector difference.

The decoder-side, after receiving the coded bit stream of the current block, may parse the direction information and the amplitude information of the first motion vector difference from the coded bit stream, and determine the first motion vector difference based on the direction information and the amplitude information of the first motion vector difference, and may parse the direction information and the amplitude information of the second motion vector difference from the coded bit stream and determine the second motion vector difference based on the direction information and the amplitude information of the second motion vector difference.

Next, the decoder-side may determine the first target motion vector of the current block based on the first motion vector difference and the first origin motion vector, and determine the second target motion vector of the current block based on the second motion vector difference and the second origin motion vector.

In a possible implementation, the coder-side may also code a first sub-mode flag and a second sub-mode flag of an EAWP prediction mode in a coded bit stream, where the first sub-mode flag indicates superimposing motion vector difference on a first origin motion vector, or not superimposing the motion vector difference on the first origin motion vector, and the second sub-mode flag indicates superimposing motion vector difference on a second origin motion vector, or not superimposing the motion vector difference on the second origin motion vector.

In a possible implementation, the above first sub-mode flag may also be a first flag bit in the coded bit stream, and the above second sub-mode flag may also be a second flag bit in the coded bit stream.

The decoder-side, after receiving the coded bit stream of the current block, may firstly parse the first sub-mode flag and the second sub-mode flag of the EAWP mode from the coded bit stream of the current block. If the first sub-mode flag indicates superimposing motion vector difference on a first origin motion vector, the decoder-side parses direction information and amplitude information of the first motion vector difference from the coded bit stream, and determines the first motion vector difference based on the direction information and the amplitude information of the first motion vector difference, and then determines the first target motion vector of the current block based on the first origin motion vector and the first motion vector difference. If the first sub-mode flag indicates not superimposing the motion vector difference on the first origin motion vector, the decoder-side does not parse the direction information or the amplitude information of the first motion vector difference, but directly takes the first origin motion vector as the first target motion vector of the current block. If the second sub-mode flag indicates superimposing the motion vector difference on a second origin motion vector, the decoder-side parses direction information and amplitude information of the second motion vector difference from the coded bit stream, and determines the second motion vector difference based on the direction information and the amplitude information of the second motion vector difference, and then determines the second target motion vector of the current block based on the second origin motion vector and the second motion vector difference. If the second sub-mode flag indicates not superimposing the motion vector difference on the second origin motion vector, the decoder-side does not parse the direction information or the amplitude information of the second motion vector difference, but directly takes the second origin motion vector as the second target motion vector of the current block.

Embodiment 13: on the basis of the embodiment 11, the coder-side may search an optimal motion vector within a certain area and then take difference between the optimal motion vector and the candidate motion vector as a Motion Vector Difference (MVD), and then code information of the motion vector difference into a bit stream and code an index value of the candidate motion vector in the motion compensation candidate list into the bit stream.

When searching for the optimal motion vector in a certain area, the coder-side may perform searching arbitrarily without limitation. For example, for each of the candidate motion vectors in the motion compensation candidate list, several edge motion vectors are searched with taking the candidate motion vector as a centre, a RDO cost value corresponding to each of the edge motion vectors is determined, and a minimum RDO cost value is selected from all RDO cost values, and an edge motion vector corresponding to the minimum RDO cost value is taken as the optimal motion vector.

If the optimal motion vector is obtained based on a candidate motion vector 1, the candidate motion vector 1 may be taken as an origin motion vector of the current block, and difference between the optimal motion vector and the candidate motion vector 1 is taken as the motion vector difference.

The coder-side may code following contents in the coded bit stream: an index value of the candidate motion vector 1 in the motion compensation candidate list; and information of the motion vector difference, where the information of the motion vector difference includes but not limited to information of horizontal component difference and/or information of vertical component difference. The information of the horizontal component difference may include an absolute value of the horizontal component difference and/or a sign value of the horizontal component difference, and the information of the vertical component difference may include an absolute value of the vertical component difference and/or a sign value of the vertical component difference.

The decoder-side may, after receiving the coded bit stream of the current block, parse the index value of the candidate motion vector in the motion compensation candidate list from the coded bit stream, and select the candidate motion vector corresponding to the index value from the motion compensation candidate list, and take the candidate motion vector as the origin motion vector of the current block. The decoder-side may also parse the information of the horizontal component difference and/or the information of the vertical component difference of the motion vector difference from the coded bit stream of the current block, and determine the motion vector difference based on the information of the horizontal component difference (e.g., the absolute value of the horizontal component difference and/or the sign value of the horizontal component difference) of the motion vector difference and the information of the vertical component difference (e.g., the absolute value of the vertical component difference and/or the sign value of the vertical component difference) of the motion vector difference.

Next, the decoder-side may determine a target motion vector of the current block based on the motion vector difference and the origin motion vector, for example, the decoder-side may take a sum of the motion vector difference and the origin motion vector as the target motion vector of the current block.

Illustratively, the decoder-side may determine the horizontal component difference based on the absolute value of the horizontal component difference and the sign value of the horizontal component difference, and determine the vertical vector difference based on the absolute value of the vertical component difference and the sign value of the vertical component difference. A combination of the horizontal component difference and the vertical component difference is the motion vector difference, that is, the motion vector difference includes the horizontal component difference and the vertical component difference.

In a possible implementation, the coder-side may also code a sub-mode flag of an EAWP mode in the coded bit stream, where the sub-mode flag indicates superimposing a motion vector difference on the origin motion vector, or not superimposing the motion vector difference on the origin motion vector. The decoder-side, after receiving the coded bit stream of the current block, parses the sub-mode flag of the EAWP mode from the coded bit stream. If the sub-mode flag indicates superimposing the motion vector difference on the origin motion vector, the information of the horizontal component difference and the information of the vertical component difference of the motion vector difference are parsed from the coded bit stream, the motion vector difference is determined based on the information of the horizontal component difference and the information of the vertical component difference, and the target motion vector of the current block is determined based on the origin motion vector and the motion vector difference. If the sub-mode flag indicates not superimposing the motion vector difference on the origin motion vector, the information of the horizontal component difference and the information of the vertical component difference of the motion vector difference are not parsed but the origin motion vector is taken as the target motion vector of the current block.

In a possible implementation, for the embodiment 11, the first origin motion information includes a first origin motion vector, the first target motion information includes a first target motion vector, the second origin motion information includes a second origin motion vector and the second target motion information includes a second target motion vector. Based on this, a first motion vector difference corresponding to the first origin motion vector may be obtained and the first target motion vector is determined based on the first motion vector difference and the first origin motion vector, that is, a sum of the first motion vector difference and the first origin motion vector is taken as the first target motion vector. A second motion vector difference corresponding to the second origin motion vector may be obtained and the second target motion vector is determined based on the second motion vector difference and the second origin motion vector, that is, a sum of the second motion vector difference and the second origin motion vector is taken as the second target motion vector.

For the coder-side, the coded bit stream of the current block may carry information of the horizontal component difference ((e.g., the absolute value of the horizontal component difference and/or the sign value of the horizontal component difference) and information of the vertical component difference (e.g., the absolute value of the vertical component difference and/or the sign value of the vertical component difference) of the first motion vector difference as well as information of the horizontal component difference and information of the vertical component difference of the second motion vector difference.

After receiving the coded bit stream of the current block, the decoder-side may parse the information of the horizontal component difference and the information of the vertical component difference of the first motion vector difference from the coded bit stream, and determine the first motion vector difference based on the information of the horizontal component difference and the information of the vertical component difference of the first motion vector difference. The decoder-side may also parse the information of the horizontal component difference and the information of the vertical component difference of the second motion vector difference from the coded bit stream, and determine the second motion vector difference based on the information of the horizontal component difference and the information of the vertical component difference of the second motion vector difference. The first target motion vector is determined based on the first motion vector difference and the first origin motion vector, and the second target motion vector is determined based on the second motion vector difference and the second origin motion vector.

In a possible implementation, the coder-side may also code a first sub-mode flag and a second sub-mode flag of an EAWP mode in the coded bit stream, where the first sub-mode flag indicates superimposing motion vector difference on a first origin motion vector, or not superimposing the motion vector difference on the first origin motion vector; the second sub-mode flag indicates superimposing motion vector difference on a second origin motion vector, or not superimposing the motion vector difference on the second origin motion vector.

After receiving the coded bit stream of the current block, the decoder-side may firstly parse the first sub-mode flag and the second sub-mode flag of the EAWP mode from the coded bit stream of the current block. If the first sub-mode flag indicates superimposing the motion vector difference on the first origin motion vector, the decoder-side parses information of the horizontal component difference and information of the vertical component difference of the first motion vector difference from the coded bit stream of the current block, and determines the first motion vector difference based on the information of the horizontal component difference and the information of the vertical component difference of the first motion vector difference, and then determines the first target motion vector of the current block based on the first origin motion vector and the first motion vector difference. If the first sub-mode flag indicates not superimposing the motion vector difference on the first origin motion vector, the decoder-side does not parse the information of the horizontal component difference or the information of the vertical component difference of the first motion vector difference, but directly takes the first origin motion vector as the first target motion vector of the current block. If the second sub-mode flag indicates superimposing the motion vector difference on the second origin motion vector, the decoder-side parses information of the horizontal component difference and information of the vertical component difference of the second motion vector difference from the coded bit stream of the current block and determines the second motion vector difference based on the information of the horizontal component difference and the information of the vertical component difference of the second motion vector difference, and then determines the second target motion vector of the current block based on the second origin motion vector and the second motion vector difference. If the second sub-mode flag indicates not superimposing the motion vector difference on the second origin motion vector, the decoder-side does not parse the information of the horizontal component difference or the information of the vertical component difference of the second motion vector difference, but directly takes the second origin motion vector as the second target motion vector of the current block.

Embodiment 14: on the basis of embodiments 11 to 13, for two motion vector differences, relevant syntax for superimposing the motion vector difference on unidirectional motion information is described below in combination with several specific application scenarios.

Application scenario 1: Table 4 shows an example of relevant syntax, where SkipFlag represents whether a current block is in a Skip mode, DirectFlag represents whether the current block is in a Direct mode, and AwpFlag represents whether the current block is in an AWP mode.

awp_idx (an index of an angular weighted prediction mode) is an index value of the angular weighted prediction mode under the skip mode or the direct mode, and a value of AwpIdx (refer to Embodiment 8 for the definition of AwpIdx) may be equal to a value of awp_idx. If there is no awp_idx in a bit stream, the value of AwpIdx is equal to 0.

awp_cand_idx0 (a first motion information index of the angular weighted prediction mode) is a first motion information index value of the angular weighted prediction mode under the skip mode or the direct mode. A value of AwpCandIdx0 (refer to Embodiment 10 for relevant definition) is equal to the value of awp_cand_idx0. If there is no awp_cand_idx0 in the bit stream, the value of AwpCandIdx0 is equal to 0.

awp_cand_idx1 (a second motion information index of the angular weighted prediction mode) is a second motion information index value of the angular weighted prediction mode under the skip mode or the direct mode. A value of AwpCandIdx1 (refer to Embodiment 10 for relevant definition) is equal to the value of awp_cand_idx1. If there is no awp_cand_idx1 in the bit stream, the value of AwpCandIdx1 is equal to 0.

awp_mvd_flag (a flag of an enhanced angular weighted prediction mode) is a binary variable. When awp_mvd_flag is a first value (e.g., 1), it indicates that the current block is in the enhanced angular weighted prediction mode; when awp_mvd_flag is a second value (e.g., 0), it indicates that the current block is in a non-enhanced angular weighted prediction mode. Illustratively, a value of AwpMvdFlag may be equal to the value of awp_mvd_flag. If there is no awp_mvd_flag in the bit stream, the value of AwpMvdFlag is equal to 0.

awp_mvd_sub_flag0 (a first sub-mode flag of the enhanced angular weighted prediction mode) is a binary variable. When awp_mvd_sub_flag0 is a first value, it indicates that the first motion information of the enhanced angular weighted prediction mode is to be superimposed with a motion information difference; when awp_mvd_sub_flag0 is a second value, it indicates that the first motion information of the enhanced angular weighted prediction mode is not to be superimposed with the motion information difference. Illustratively, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) is a binary variable. When awp_mvd_sub_flag1 is a first value, it indicates that the second motion information of the enhanced angular weighted prediction mode is to be superimposed with the motion information difference; when awp_mvd_sub_flag1 is a second value, it indicates that the second motion information of the enhanced angular weighted prediction mode is not to be superimposed with the motion information difference. Illustratively, a value of AwpMvdSubFlag1 may be equal to a value of awp_mvd_sub_flag1. If there is no awp_mvd_sub_flag1 in the bit stream, there may be the following case: if AwpMvdFlag is equal to 1, the value of AwpMvdSubFlag1 is equal to 1, and otherwise, the value of AwpMvdSubFlag1 may be 0.

awp_mvd_dir0 (a direction index value of the motion vector difference of the first motion information) is a direction index value of the motion vector difference of the first motion information of the enhanced angular weighted prediction mode. Illustratively, a value of AwpMvdDir0 may be equal to a value of awp_mvd_dir0. If there is no awp_mvd_dir0 in the bit stream, the value of AwpMvdDir may be equal to 0.

awp_mvd_step0 (a step length index value of the motion vector difference of the first motion information) is a step length index value of the motion vector difference of the first motion information of the enhanced angular weighted prediction mode. Illustratively, a value of AwpMvdStep0 may be equal to a value of awp_mvd_step0. If there is no awp_mvd_step0 in the bit stream, the value of AwpMvdStep0 may be equal to 0.

awp_mvd_dir1 (a direction index value of the motion vector difference of the second motion information) is a direction index value of the motion vector difference of the second motion information of the enhanced angular weighted prediction mode. Illustratively, a value of AwpMvdDir1 may be equal to a value of awp_mvd_dir1. If there is no awp_mvd_dir1 in the bit stream, the value of AwpMvdDir1 may be equal to 0.

awp_mvd_step1 (a step length index value of the motion vector difference of the second motion information) is a step length index value of the motion vector difference of the second motion information of the enhanced angular weighted prediction mode. Illustratively, a value of AwpMvdStep1 may be equal to a value of awp_mvd_step1. If there is no awp_mvd_step1 in the bit stream, the value of AwpMvdStep1 may be equal to 0.

TABLE 4

| Definition of a coding unit | Descriptor |
|---|---|
| ... | |
| if ((SkipFlag \|\| DirectFlag) &&AwpFlag) { | |
|   awp_idx | ae(v) |
|   awp_cand_idx0 | ae(v) |
|   awp_cand_idx1 | ae(v) |
|   awp_mvd_flag | ae(v) |
|   if (AwpMvdFlag) { | |
|     awp_mvd_sub_flag0 | ae(v) |
|     if (AwpMvdSubFlag0) { | |
|       awp_mvd_dir0 | ae(v) |
|       awp_mvd_step0 | ae(v) |
|       awp_mvd_sub_flag1 | ae(v) |
|     } | |
|     if (AwpMvdSubFlag1) { | |
|       awp_mvd_dir1 | ae(v) |
|       awp_mvd_step1 | ae(v) |
|     } | |
|   } | |
| } | |
| ... | |

Application scenario 2: Table 5 shows an example of relevant syntax, where SkipFlag represents whether the current block is in a Skip mode, DirectFlag represents whether the current block is in a Direct mode, and AwpFlag represents whether the current block is in an AWP mode.

For awp_idx, awp_cand_idx0 and awp_cand_idx1, reference may be made to the application scenario 1, and no redundant descriptions are made herein.

awp_mvd_sub_flag0 (a first sub-mode flag of an enhanced angular weighted prediction mode) is a binary variable. When awp_mvd_sub_flag0 is a first value, it indicates that first motion information of the enhanced angular weighted prediction mode is to be superimposed with a motion information difference; when awp_mvd_sub_flag0 is a second value, it indicates that the first motion information of the enhanced angular weighted prediction mode is not to be superimposed with the motion information difference. Illustratively, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) is a binary variable. When awp_mvd_sub_flag1 is a first value, it indicates that the second motion information of the enhanced angular weighted prediction mode is to be superimposed with the motion information difference; when awp_mvd_sub_flag1 is a second value, it indicates that the second motion information of the enhanced angular weighted prediction mode is not to be superimposed with the motion information difference. Illustratively, a value of AwpMvdSubFlag1 may be equal to the value of awp_mvd_sub_flag1. If there is no awp_mvd_sub_flag1 in the bit stream, the value of AwpMvdSubFlag1 is equal to 0.

For awp_mvd_dir0, awp_mvd_step0, awp_mvd_dir1 and awp_mvd_step1, reference may be made to the application scenario 1.

TABLE 5

| Definition of an coding unit | Descriptor |
|---|---|
| ... | |
| if ((SkipFlag \|\| DirectFlag) &&AwpFlag) { | |
|   awp_idx | ae(v) |
|   awp_cand_idx0 | ae(v) |
|   awp_cand_idx1 | ae(v) |
|   awp_mvd_sub_flag0 | ae(v) |
|   if (AwpMvdSubFlag0) { | |
|     awp_mvd_dir0 | ae(v) |
|     awp_mvd_step0 | ae(v) |
|   } | |
|   awp_mvd_sub_flag1 | ae(v) |
|   if (AwpMvdSubFlag1) { | |
|     awp_mvd_dir1 | ae(v) |
|     awp_mvd_step1 | ae(v) |
|   } | |
| } | |
| ... | |

Illustratively, the application scenario 1 and the application scenario 2 are different in followings: in the application scenario 1, syntax awp_mvd_flag is present, but in the application scenario 2, syntax awp_mvd_flag is not present. In the application scenario 1, the enhanced angular weighted prediction mode is controlled through awp_mvd_flag, that is, the enhanced angular weighted prediction mode is controlled by a master switch.

Illustratively, the application scenarios 1 and 2 may be implementations of the embodiment 12.

Application scenario 3: Table 6 shows an example of relevant syntax, where SkipFlag represents whether the current block is in a Skip mode, DirectFlag represents whether the current block is in a Direct mode, and AwpFlag represents whether the current block is in an AWP mode.

awp_idx (an index of the angular weighted prediction mode) is an index value of the angular weighted prediction mode under the skip mode or the direct mode, and a value of AwpIdx may be equal to a value of awp_idx. If there is no awp_idx in the bit stream, the value of AwpIdx is equal to 0.

awp_cand_idx0 (a first motion information index of the angular weighted prediction mode) is the first motion information index value of the angular weighted prediction mode under the skip mode or the direct mode. A value of Awp-CandIdx0 (refer to Embodiment 10 for relevant definition) is equal to a value of awp_cand_idx0. If there is no awp_cand_idx0 in the bit stream, the value of AwpCandIdx0 is equal to 0.

awp_cand_idx1 (a second motion information index of the angular weighted prediction mode) is the second motion information index value of the angular weighted prediction mode under the skip mode or the direct mode. A value of AwpCandIdx1 (refer to Embodiment 10 for relevant definition) is equal to a value of awp_cand_idx1. If there is no awp_cand_idx1 in the bit stream, the value of AwpCandIdx1 is equal to 0.

awp_mvd_flag (a flag of an enhanced angular weighted prediction mode) is a binary variable. When awp_mvd_flag is a first value (e.g., 1), it indicates that the current block is in the enhanced angular weighted prediction mode; when awp_mvd_flag is a second value (e.g., 0), it indicates that the current block is in a non-enhanced angular weighted prediction mode. Illustratively, a value of AwpMvdFlag may be equal to the value of awp_mvd_flag. If there is no awp_mvd_flag in the bit stream, the value of AwpMvdFlag is equal to 0.

awp_mvd_sub_flag0 (a first sub-mode flag of the enhanced angular weighted prediction mode) is a binary variable. When awp_mvd_sub_flag0 is a first value, it indicates that the first motion information of the enhanced angular weighted prediction mode is to be superimposed with the motion information difference; when awp_mvd_sub_flag0 is a second value, it indicates that the first motion information of the enhanced angular weighted prediction mode is not to be superimposed with the motion information difference. Illustratively, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) is a binary variable. When awp_mvd_sub_flag1 is a first value, it indicates that the second motion information of the enhanced angular weighted prediction mode is to be superimposed with the motion information difference; when awp_mvd_sub_flag1 is a second value, it indicates that the second motion information of the enhanced angular weighted prediction mode is not to be superimposed with the motion information difference. Illustratively, a value of AwpMvdSubFlag1 may be equal to the value of awp_mvd_sub_flag1. If there is no awp_mvd_sub_flag1 in the bit stream, there may be following cases: if AwpMvdFlag is equal to 1, the value of AwpMvdSubFlag1 is equal to 1, otherwise, the value of AwpMvdSubFlag1 may be equal to 0. Illustratively, awp_mv_diff_x_abs0 (an absolute value of a horizontal component difference of the first motion vector in the enhanced angular weighted prediction mode) and awp_mv_diff_y_abs0 (an absolute value of a vertical component difference of the first motion vector in the enhanced angular weighted prediction mode) are absolute values of the first motion vector difference of the enhanced angular weighted prediction mode. AwpMvDiffXAbs0 is equal to a value of awp_mv_diff_x_abs0, and AwpMvDiffYAbs0 is equal to a value of awp_mv_diff_y_abs0. awp_mv_diff_x_sign0 (a sign value of the horizontal component difference of the first motion vector in the enhanced angular weighted prediction mode) and awp_mv_diff_y_sign0 (a sign value of the vertical component difference of the first motion vector in the enhanced angular weighted prediction mode) are sign bits of the first motion vector difference of the enhanced angular weighted prediction mode. A value of AwpMvDiffXSign0 is equal to a value of awp_mv_diff_x_sign0, and a value of AwpMvDiffYSign0 is equal to a value of awp_mv_diff_y_sign0.

In a possible implementation, if there is no awp_mv_diff_x_sign0 or awp_mv_diff_y_sign0 in the bit stream, the value of AwpMvDiffXSign0 or the value of AwpMvDiffYSign0 is equal to 0. If the value of AwpMvDiffXSign0 is equal to 0, AwpMvDiffX0 is equal to AwpMvDiffXAbs0; if the value of AwpMvDiffXSign0 is equal to 1, AwpMvDiffX0 is equal to −AwpMvDiffXAbs0; If the value of AwpMvDiffYSign0 is equal to 0, AwpMvDiffY0 is equal to AwpMvDiffYAbs0; if the value of AwpMvDiffYSign0 is equal to 1, AwpMvDiffY0 is equal to −AwpMvDiffYAbs0. The values of AwpMvDiffX0 and AwpMvDiffY0 range from −32768 to 32767.

Illustratively, awp_mv_diff_x_abs1 (an absolute value of a horizontal component difference of the second motion vector in the enhanced angular weighted prediction mode) and awp_mv_diff_y_abs1 (an absolute value of a vertical component difference of the second motion vector in the enhanced angular weighted prediction mode) are absolute values of the second motion vector difference of the enhanced angular weighted prediction mode. AwpMvDiffXAbs1 is equal to the value of awp_mv_diff_x_abs1, and AwpMvDiffYAbs1 is equal to the value of awp_mv_diff_y_abs1. awp_mv_diff_x_sign1 (a sign value of the horizontal component difference of the second motion vector in the enhanced angular weighted prediction mode) and awp_mv_diff_y_sign1 (a sign value of the vertical component difference of the second motion vector in the enhanced angular weighted prediction mode) are sign bits of the second motion vector difference of the enhanced angular weighted prediction mode. A value of AwpMvDiffXSign1 is equal to a value of awp_mv_diff_x_sign1, and a value of AwpMvDiffYSign1 is equal to a value of awp_mv_diff_y_sign1.

In a possible implementation, if there is no awp_mv_diff_x_sign1 or awp_mv_diff_y_sign1 in the bit stream, the value of AwpMvDiffXSign1 or AwpMvDiffYSign1 is equal to 0. If the value of AwpMvDiffXSign1 is equal to 0, AwpMvDiffX1 is equal to AwpMvDiffXAbs1; if the value of AwpMvDiffXSign1 is equal to 1, AwpMvDiffX1 is equal to −AwpMvDiffXAbs1. If the value of AwpMvDiffYSign1 is equal to 0, AwpMvDiffY1 may be equal to AwpMvDiffYAbs1; if the value of AwpMvDiffYSign1 is equal to 1, AwpMvDiffY1 may be equal to −AwpMvDiffYAbs1. The values of AwpMvDiffX1 and AwpMvDiffY1 range from −32768 to 32767.

TABLE 6

| Definition of a coding unit | Descriptor |
| --- | --- |
| ... | |
| if ((SkipFlag \|\| DirectFlag) &&AwpFlag) { | |
|   awp_idx | ae(v) |
|   awp_cand_idx0 | ae(v) |
|   awp_cand_idx1 | ae(v) |
|   awp_mvd_flag | ae(v) |
|   if (AwpMvdFlag) { | |
|     awp_mvd_sub_flag0 | ae(v) |
|     if (AwpMvdSubFlag0) { | |
|       awp_mv_diff_x_abs0 | ae(v) |
|       if (AwpMvDiffXAbs0) | |
|         awp_mv_diff_x_sign0 | ae(v) |
|       awp_mv_diff_y_abs0 | ae(v) |
|       if (AwpMvDiffYAbs0) | |

TABLE 6-continued

| Definition of a coding unit | Descriptor |
| --- | --- |
|         awp_mv_diff_y_sign0 | ae(v) |
|     awp_mvd_sub_flag1 | ae(v) |
|     } | |
|     if (AwpMvdSubFlag1) { | |
|       awp_mv_diff_x_abs1 | ae(v) |
|       if (AwpMvDiffXAbs1) | |
|         awp_mv_diff_x_sign1 | ae(v) |
|       awp_mv_diff_y_abs1 | ae(v) |
|       if (AwpMvDiffYAbs1) | |
|         awp_mv_diff_y_sign1 | ae(v) |
|     } | |
|   } | |
| } | |
| ... | |

Application scenario 4: Table 7 shows an example of relevant syntax, where SkipFlag represents whether the current block is in a Skip mode, DirectFlag represents whether the current block is in a Direct mode, and AwpFlag represents whether the current block is in an AWP mode.

For awp_idx, awp_cand_idx0 and awp_cand_idx1, reference may be made to the application scenario 1 and no redundant descriptions are made herein.

awp_mvd_sub_flag0 (a first sub-mode flag of an enhanced angular weighted prediction mode) is a binary variable. When awp_mvd_sub_flag0 is a first value, it indicates that the first motion information of the enhanced angular weighted prediction mode is to be superimposed with the motion information difference; when awp_mvd_sub_flag0 is a second value, it indicates that the first motion information of the enhanced angular weighted prediction mode is not to be superimposed with the motion information difference. Illustratively, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) is a binary variable. When awp_mvd_sub_flag1 is a first value, it indicates that the second motion information of the enhanced angular weighted prediction mode is to be superimposed with the motion information difference; when awp_mvd_sub_flag1 is a second value, it indicates that the second motion information of the enhanced angular weighted prediction mode is not to be superimposed with the motion information difference. Illustratively, a value of AwpMvdSubFlag1 may be equal to the value of awp_mvd_sub_flag1. If there is no awp_mvd_sub_flag1 in the bit stream, the value of AwpMvdSubFlag1 may be equal to 0.

Illustratively, for parameters such as awp_mv_diff_x_abs0, awp_mv_diff_y_abs0, awp_mv_diff_x_sign0, awp_mv_diff_y_sign0, awp_mv_diff_x_abs1, awp_mv_diff_y_abs1, awp_mv_diff_x_sign1 and awp_mv_diff_y_sign1 in Table 7, reference may be made to the application scenario 3 and no redundant descriptions are made herein.

TABLE 7

| Definition of a coding unit | Descriptor |
| --- | --- |
| ... | |
| if ((SkipFlag \|\| DirectFlag) &&AwpFlag) { | |
|   awp_idx | ae(v) |
|   awp_cand_idx0 | ae(v) |
|   awp_cand_idx1 | ae(v) |
|   awp_mvd_sub_flag0 | ae(v) |

TABLE 7-continued

| Definition of a coding unit | Descriptor |
|---|---|
| if (AwpMvdSubFlag0) { | |
|   awp_mv_diff_x_abs0 | ae(v) |
|   if (AwpMvDiffXAbs0) | |
|     awp_mv_diff_x_sign0 | ae(v) |
|   awp_mv_diff_y_abs0 | ae(v) |
|   if (AwpMvDiffYAbs0) | |
|     awp_mv_diff_y_sign0 | ae(v) |
| } | |
| awp_mvd_sub_flag1 | ae(v) |
| if (AwpMvdSubFlag1) { | |
|   awp_mv_diff_x_abs1 | ae(v) |
|   if (AwpMvDiffXAbs1) | |
|     awp_mv_diff_x_sign1 | ae(v) |
|   awp_mv_diff_y_abs1 | ae(v) |
|   if (AwpMvDiffYAbs1) | |
|     awp_mv_diff_y_sign1 | ae(v) |
| } | |
| } | |
| ... | |

Illustratively, the application scenario 3 and the application scenario 4 are different in followings: in the application scenario 3, syntax awp_mvd_flag is present, but in the application scenario 4, syntax awp_mvd_flag is not present. In the application scenario 3, the enhanced angular weighted prediction mode is controlled through awp_mvd_flag, that is, the enhanced angular weighted prediction mode is controlled by a master switch.

Illustratively, the application scenario 3 and the application scenario 4 are implementations of the embodiment 13.

The application scenario 3 or 4 and the application scenario 1 or 2 are different in followings: in the application scenario 1 or 2, several preferred MVDs are used but in the application scenario 3 or 4, all MVDs within a certain search range are allowed, for example, based on a manner of the application scenario 5, all MVDs are searched for within a certain search range.

Application scenario 5: Table 8 shows an example of relevant syntax. Table 8 illustrates a MVD coding manner.
1. Whether |MVD_X| is greater than 0 is determined, where | ... | is an absolute value sign and MVD_X refers to a horizontal component of the MVD.
2. Whether |MVD_Y| is greater than 0 is determined, where | ... | is the absolute value sign and MVD_Y refers to a vertical component of the MVD.
3. If |MVD_X| is greater than 0, whether |MVD_X| is greater than 1 is determined.
4. If |MVD_Y| is greater than 0, whether |MVD_Y| is greater than 1 is determined.
5. If |MVD_X| is greater than 1, |MVD_X|−2 is coded.
6. If |MVD_X| is greater than 0, a sign bit of MVD_X is coded.
7. If |MVD_Y| is greater than 1, |MVD_Y|−2 is coded.
8. If |MVD_Y| is greater than 0, a sign bit of MVD_Y is coded.

TABLE 8

| | Descriptor |
|---|---|
| mvd_coding( x0, y0, refList ,cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |

TABLE 8-continued

| | Descriptor |
|---|---|
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2 [ 1 ] | ae(v) |
|     mvd_sign_flag[ 1 ] | ae(v) |
|   } | |
| } | |

Application scenario 6: derivation is made for the above application scenarios 1 to 4 to fully merge an AWP mode and an EAWP mode, that is, 0 span is added to the span without coding a flag bit to be enabled or not. For example, the motion vector difference supports four directions: upward, downward, leftward and rightward, and the motion vector difference supports following 6 step length configurations: 0-pel, ¼-pel, ½-pel, 1-pel, 2-pel, 4-pel, that is, one step length configuration 0-pel is added. On this basis, Table 4 or 5 may be updated to Table 9, and Table 6 or 7 may be updated to Table 10. For meanings of relevant syntax in Tables 9 and 10, reference may be made to Table 4 and Table 6 and no redundant descriptions are made herein.

TABLE 9

| Definition of a coding unit | Descriptor |
|---|---|
| ... | |
| if ((SkipFlag || DirectFlag) &&AwpFlag) { | |
|   awp_idx | ae(v) |
|   awp_cand_idx0 | ae(v) |
|   awp_cand_idx1 | ae(v) |
|   awp_mvd_step0 | ae(v) |
|   if (AwpMvdStep0 != 0) | |
|     awp_mvd_dir0 | ae(v) |
|   awp_mvd_step1 | ae(v) |
|   if (AwpMvdStep1 != 0) | |
|     awp_mvd_dir1 | ae(v) |
| } | |
| ... | |

TABLE 10

| Definition of a coding unit | Descriptor |
|---|---|
| ... | |
| if ((SkipFlag || DirectFlag) &&AwpFlag) { | |
|   awp_idx | ae(v) |
|   awp_cand_idx0 | ae(v) |
|   awp_cand_idx1 | ae(v) |
|   awp_mv_diff_x_abs0 | ae(v) |
|   if (AwpMvDiffXAbs0) | |
|     awp_mv_diff_x_sign0 | ae(v) |
|   awp_mv_diff_y_abs0 | ae(v) |
|   if (AwpMvDiffYAbs0) | |
|     awp_mv_diff_y_sign0 | ae(v) |
|   awp_mv_diff_x_abs1 | ae(v) |
|   if (AwpMvDiffXAbs1) | |
|     awp_mv_diff_x_sign1 | ae(v) |
|   awp_mv_diff_y_abs1 | ae(v) |
|   if (AwpMvDiffYAbs1) | |
|     awp_mv_diff_y_sign1 | ae(v) |
| } | |
| ... | |

Application scenario 7: The above embodiments involve an AWP mode, a DAWP mode (double inter angular weighted prediction) and an EAWP mode can be controlled to be enabled or disabled by use of high-level syntax. For example, the AWP mode is controlled to be enabled or disabled by using a high-level syntax 1. For another example, the DAWP mode is controlled to be enabled or disabled by using a high-level syntax 2. For another example, the EAWP mode is controlled to be enabled or disabled by using a high-level syntax 3. For another example, the AWP mode and the DAWP mode are controlled to be enabled or disabled at the same time by using a high-level syntax 4. For another example, the AWP mode and the EAWP mode are controlled to be enabled or disabled at the same time by using a high-level syntax 5. For another example, the DAWP mode and the EAWP mode are controlled to be enabled or disabled at the same time by using a high-level syntax 6. For another example, the AWP mode, the DAWP mode and the EAWP mode are controlled to be enabled or disabled at the same time by using a high-level syntax 7. The above are only examples and no limitations are made herein.

In the above embodiments, the high-level syntax may be a sequence parameter set-level high-level syntax or a picture parameter set-level high-level syntax, or a slice head-level high-level syntax, or a picture head-level high-level syntax, which are not limited herein. For example, based on the sequence parameter set-level high-level syntax, by use of sps_awp_enable_flag, sh_awp_enable_flag and awp_enable_flag and the like, the AWP mode may be controlled to be enabled or disabled, or the EAWP mode may be controlled to be enabled or disabled, or several modes may be controlled to be enabled or disabled at the same time, which is not limited herein.

Illustratively, in the above embodiments, target motion information may be obtained based on origin motion information. After the target motion information is obtained, the target motion information of the current block may be stored in a manner which is not limited herein.

Illustratively, the above embodiments 1 to 14 may be implemented separately or by combination. For example, the embodiments 1 and 2 may be combined for implementation; the embodiments 1 and 3 may be combined for implementation; the embodiments 1, 2 and 3 may be combined for implementation. The embodiment 4 may be combined with one or more of the embodiments 1 to 3 for implementation; the embodiment 5 (or embodiment 6 or embodiment 7) may be combined with the embodiment 2 (or embodiment 3) for implementation. The embodiment 8 may be combined with the embodiment 2 (or embodiment 3). The embodiment 9 may be combined with one or more of the embodiments 9 to 14, or combined with one or more of the embodiments 1 to 8 for implementation or the like. The above are only examples and the combinations of the embodiments are not limited herein.

Figure 8A:
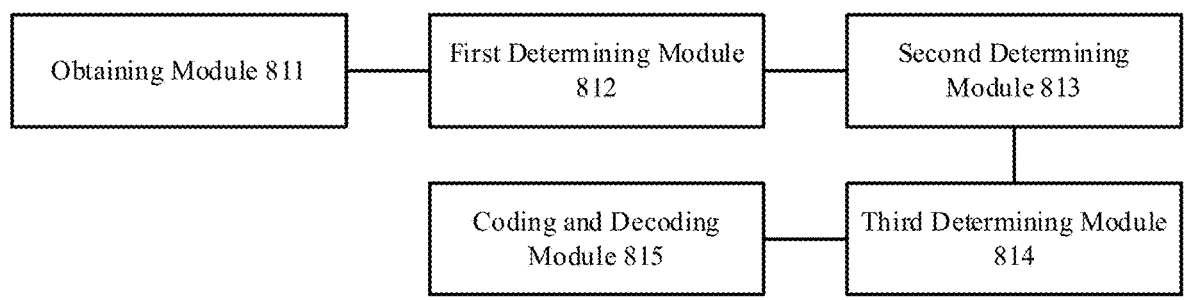
FIG. 8A is a structural schematic diagram illustrating a coding and decoding apparatus according to an embodiment of the present disclosure.

Based on a same application idea as the above methods, embodiments of the present disclosure further provide coding apparatuses and decoding apparatuses. The two kinds of apparatuses both can be referred to an apparatus shown in FIG. 8A. The apparatus includes an obtaining module 811, a first determining module 812, a second determining module 813, a third determining module 814, and a coding and decoding module 815. For a coding apparatus, the coding and decoding module 815 performs coding function and for a decoding apparatus, the coding and decoding module 815 performs decoding function.

In some examples, the coding apparatus includes, a module (e.g., the obtaining module 811) configured to, when determining to enable a weighted prediction for a current block, obtain a weighted prediction angle of the current block for the current block; a module (e.g., the first determining module 812) configured to, for each pixel position of the current block, determine a surrounding matching position pointed by the pixel position from surrounding positions outside the current block based on the weighted prediction angle of the current block; a module (e.g., the second determining module 813) configured to determine a target weight value of the pixel position based on a reference weight value associated with the surrounding matching position, and determine an association weight value of the pixel position based on the target weight value of the pixel position; a module (e.g., the third determining module 814) configured to, for each pixel position of the current block, determine a first prediction value of the pixel position based on a first prediction mode of the current block, and determine a second prediction value of the pixel position based on a second prediction mode of the current block; based on the first prediction value, the target weight value, the second prediction value and the association weight value, determine a weighted prediction value of the pixel position; and a module (e.g., the coding and decoding module 815) configured to determine weighted prediction values of the current block based on the weighted prediction values of all pixel positions of the current block.

In some examples, the decoding apparatus includes a module (e.g., the obtaining module 811) configured to, when determining to enable the weighted prediction for a current block, obtain a weighted prediction angle of the current block for the current block; a module (e.g., the first determining module 812) configured to, for each pixel position of the current block, determine a surrounding matching position pointed by the pixel position from surrounding positions outside the current block based on the weighted prediction angle of the current block; a module (e.g., the second determining module 813) configured to determine a target weight value of the pixel position based on a reference weight value associated with the surrounding matching position, and determine an association weight value of the pixel position based on the target weight value of the pixel position; a module (e.g., the third determining module 814) configured to, for each pixel position of the current block, determine a first prediction value of the pixel position based on a first prediction mode of the current block, and determine a second prediction value of the pixel position based on a second prediction mode of the current block; based on the first prediction value, the target weight value, the second prediction value and the association weight value, determine a weighted prediction value of the pixel position; and a module (e.g., the coding and decoding module 815) configured to determine weighted prediction values of the current block based on the weighted prediction values of all pixel positions of the current block.

The second determining module 813 is further configured to: configure reference weight values for the surrounding positions outside the current block; where the reference weight values of the surrounding positions outside the current block are pre-configured or configured based on weight configuration parameters; the weight configuration parameters include a weight transform rate and a weight transform start position. Illustratively, the weight transform start position is determined by at least one of the following parameters: the weighted prediction angle of the current block, a weighted prediction position of the current block or a size of the current block.

Illustratively, a number of the surrounding positions outside the current block is determined based on the size of the current block and/or the weighted prediction angle of the current block; the reference weight values of the surrounding positions outside the current block monotonically increase or monotonically decrease.

Illustratively, the reference weight values of the surrounding positions outside the current block include one or more reference weight values of target positions, one or more reference weight values of first neighbouring positions of the target positions and one or more reference weight values of second neighbouring positions of the target positions. Optionally, the reference weight values of the first neighbouring positions are all second reference weight values, and the reference weight values of the second neighbouring positions are all third reference weight values, where the second reference weight values are different from the third reference weight values.

The target positions include one reference weight value or at least two reference weight values; if the target positions include at least two reference weight values, the at least two reference weight values of the target positions monotonically increase.

Illustratively, the weighted prediction angle of the current block is a horizontal angle; or, the weighted prediction angle of the current block is a vertical angle; or, an absolute value of a slope of the weighted prediction angle of the current block is n-th power of 2, where n is an integer.

Illustratively, the surrounding positions outside the current block may include one or more integer pixel positions or one or more sub-pixel positions, or both one or more integer pixel positions and one or more sub-pixel positions. The surrounding positions outside the current block may include: surrounding positions at one row one the upper outside of the current block, or surrounding positions at one column on the left outside of the current block.

The second determining module 813 is specifically configured to: if the surrounding matching position is an integer pixel position and the integer pixel position is set with a reference weight value, determine the target weight value of the pixel position based on the reference weight value of the integer pixel position; alternatively, if the surrounding matching position is a sub-pixel position and the sub-pixel position is set with a reference weight value, determine the target weight value of the pixel position based on the reference weight value of the sub-pixel position.

Illustratively, the first prediction mode is an inter prediction mode and the second prediction mode is an inter prediction mode.

Illustratively, the third determining module 814 is further configured to construct a motion compensation candidate list, where the motion compensation candidate list includes at least two pieces of candidate motion information; select one piece of candidate motion information from the motion compensation candidate list as first target motion information of the current block; determine the first prediction value of the pixel position based on the first target motion information; select another piece of candidate motion information from the motion compensation candidate list as second target motion information of the current block; determine a second prediction value of the pixel position based on the second target motion information.

The third determining module 814 is further configured to: construct a motion compensation candidate list, where the motion compensation candidate list includes at least two pieces of candidate motion information; select one piece of candidate motion information from the motion compensation candidate list as first origin motion information of the current block; determine the first target motion information of the current block based on the first origin motion information; determine the first prediction value of the pixel position based on the first target motion information; select another piece of candidate motion information from the motion compensation candidate list as second origin motion information of the current block; determine the second target motion information of the current block based on the second origin motion information; determine the second prediction value of the pixel position based on the second target motion information.

The first origin motion information includes a first origin motion vector, the first target motion information includes a first target motion vector, the second origin motion information includes a second origin motion vector and the second target motion information includes a second target motion vector. The third determining module 814 is further configured to: obtain a motion vector difference corresponding to the first origin motion vector and determine the first target motion vector based on the motion vector difference corresponding to the first origin motion vector and the first origin motion vector; obtain a motion vector difference corresponding to the second origin motion vector and determine the second target motion vector based on the motion vector difference corresponding to the second origin motion vector and the second origin motion vector. If the apparatus is applied to the decoder-side, the third determining module 814 is further configured to: parse direction information and amplitude information on the corresponding motion vector difference from a coded bit stream of the current block; and determine the corresponding motion vector difference based on the direction information and the amplitude information of corresponding motion vector difference.

Illustratively, If the direction information indicates a direction is rightward and the amplitude information indicates an amplitude is Ar, the motion vector difference is (Ar, 0); If the direction information indicates the direction is downward and the amplitude information indicates the amplitude is Ad, the motion vector difference is (0, −Ad); If the direction information indicates the direction is leftward and the amplitude information indicates the amplitude is Al, the motion vector difference is (−Al, 0); If the direction information indicates the direction is upward and the amplitude information indicates the amplitude is Au, the motion vector difference is (0, Au).

The third determining module 814 is further configured to: parse flag information from the coded bit stream of the current block; if the flag information indicates superimposing the motion vector difference on the origin motion vector, parse the direction information and the amplitude information on the corresponding motion vector difference from the coded bit stream of the current block.

Figure 8B:
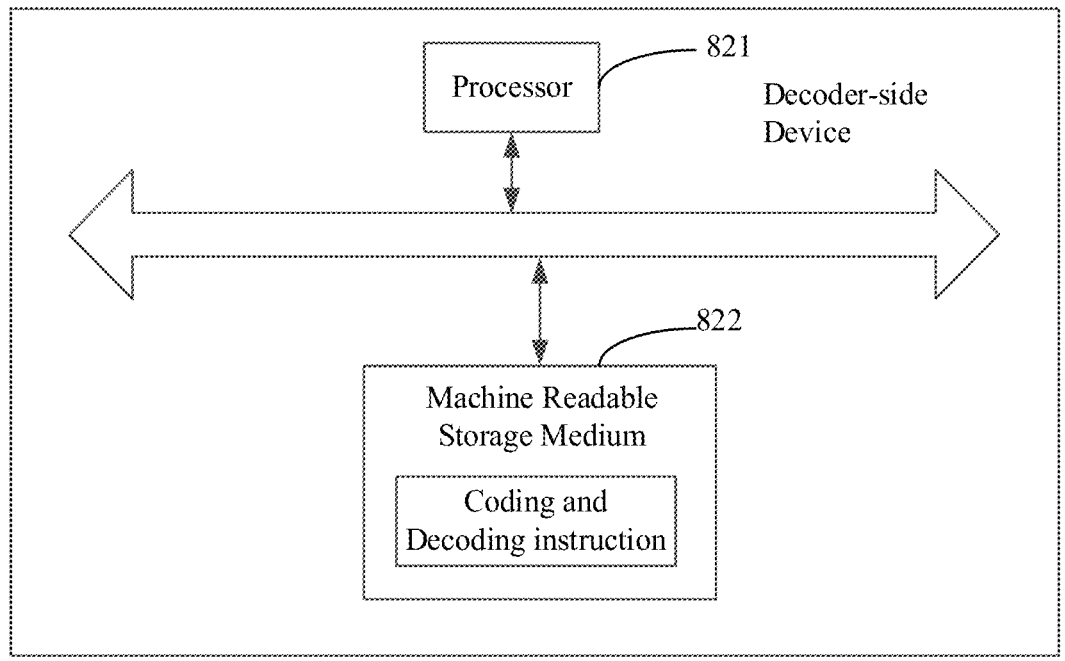
FIG. 8B is a hardware structure diagram of a decoder-side device according to an embodiment of the present disclosure.

Based on the application idea as the above methods, embodiments of the present disclosure provide a decoder-side device (also called a video decoder). In terms of hardware, the hardware architecture is shown in FIG. 8B. The decoder-side device includes one or more processors 821 and a machine readable storage medium 822, where the machine readable storage medium 822 stores machine executable instructions executable by the processor 821. The processor 821 is configured to execute the machine executable instructions to perform the methods disclosed as above. For example, the processor 821 is configured to execute the machine executable instructions to perform following steps: when determining to enable a weighted prediction for a current block, obtaining a weighted prediction angle of the current block for the current block; for each pixel position of the current block, determining a surrounding matching position pointed by the pixel position from surrounding positions outside the current block based on the weighted prediction angle of the current block; determining a target weight value of the pixel position based on a reference weight value associated with the surrounding matching position, and determining an association weight value of the pixel position based on the target weight value of the pixel position; for each pixel position of the current block, determining a first prediction value of the pixel position based on a first prediction mode of the current block, and determining a second prediction value of the pixel position based on a second prediction mode of the current block; based on the first prediction value, the target weight value, the second prediction value and the association weight value, determining a weighted prediction value of the pixel position; determining weighted prediction values of the current block based on the weighted prediction values of all pixel positions of the current block.

Figure 8C:
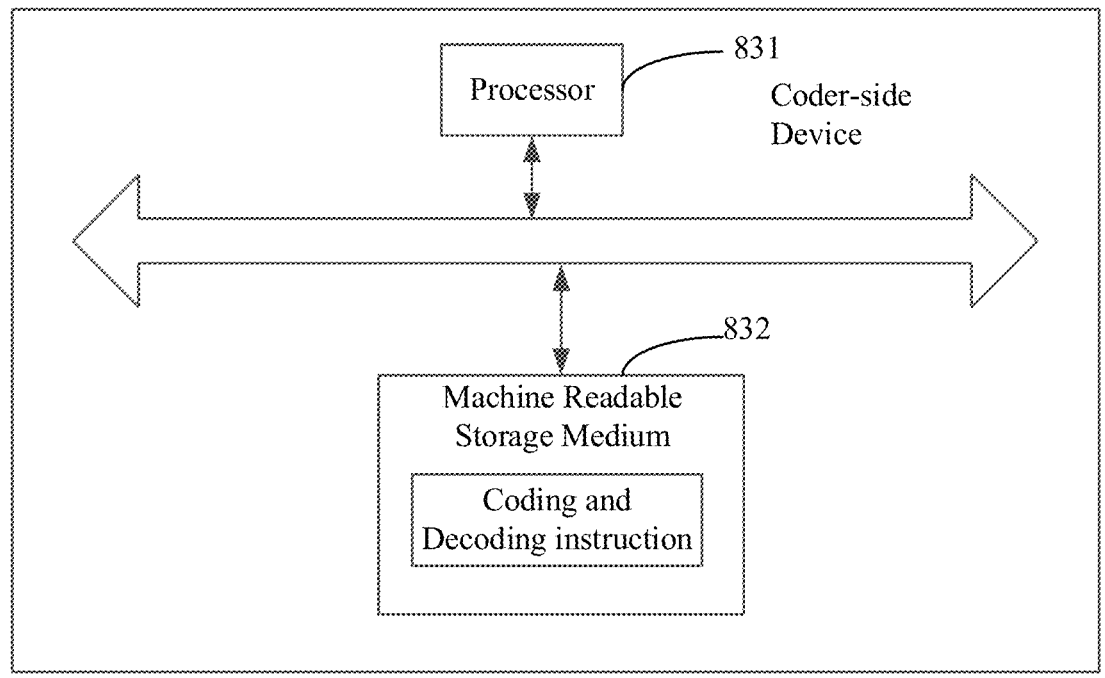
FIG. 8C is a hardware structure diagram of a coder-side device according to an embodiment of the present disclosure.

Based on a same application idea as the above methods, embodiments of the present disclosure provide a coder-side device (also called a video coder). In terms of hardware, the hardware architecture is shown in FIG. 8C. The coder-side device includes one or more processors 831 and a machine readable storage medium 832, where the machine readable storage medium 832 stores machine executable instructions executable by the processor 831. The processor 831 is configured to execute the machine executable instructions to perform the methods disclosed as above. For example, the processor 831 is configured to execute the machine executable instructions to perform the following steps: when determining to enable a weighted prediction for a current block, obtaining a weighted prediction angle of the current block for the current block; for each pixel position of the current block, determining a surrounding matching position pointed by the pixel position from surrounding positions outside the current block based on the weighted prediction angle of the current block; determining a target weight value of the pixel position based on a reference weight value associated with the surrounding matching position, and determining an association weight value of the pixel position based on the target weight value of the pixel position; for each pixel position of the current block, determining a first prediction value of the pixel position based on a first prediction mode of the current block, and determining a second prediction value of the pixel position based on a second prediction mode of the current block; based on the first prediction value, the target weight value, the second prediction value and the association weight value, determining a weighted prediction value of the pixel position; determining weighted prediction values of the current block based on the weighted prediction values of all pixel positions of the current block.

Based on a same application idea as the above methods, embodiments of the present disclosure further provide a camera device, which can include the coding and decoding apparatus in any one of the above embodiments. The camera device may adopt above processes.

Based on a same application idea as the above methods, embodiments of the present disclosure provide a machine readable storage medium storing several computer instructions, where the computer instructions are executed by a processor to perform the methods disclosed in the above embodiments of the present disclosure, for example, the coding and decoding methods in the above embodiments.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a game console, a tablet computer, wearable equipment, or combinations of any several devices of these devices. For the convenience of description, the above-mentioned apparatuses, when described, is divided into various units by function for descriptions. When the present disclosure is implemented, the functions of different units may be implemented in software and/or hardware.

Those skilled in the art should understand that the embodiments of the present disclosure may be provided as methods, systems, or computer program products. Therefore, the present disclosure may take the form of a pure hardware embodiment, a pure software embodiment, or an embodiment combining both software and hardware. Furthermore, the embodiments of the present disclosure may take the form of a computer program product implemented on one or more computer available storage mediums (including but not limited to disk memories, CD-ROM, optical memories, etc.) containing computer available program codes.

The above descriptions are only some examples of the present disclosure, and are not used to limit the present disclosure. For those skilled in the art, the present disclosure may have various changes and modifications. Any modifications, equivalent replacements, improvements and the like made in the spirit and principle of this present disclosure shall fall within the scope of claims of the present disclosure.

What is claimed is:

1. A method, when determining to enable a weighted prediction for a current block, the method comprising:
   for the current block, obtaining a weighted prediction angle of the current block;
   for each pixel position of the current block,
      determining a surrounding matching position pointed by the pixel position from surrounding positions outside the current block based on the weighted prediction angle of the current block;
      determining a target weight value of the pixel position based on a reference weight value associated with the surrounding matching position;
      determining an association weight value of the pixel position based on the target weight value of the pixel position;
      determining a first prediction value of the pixel position based on a first prediction mode of the current block;
      determining a second prediction value of the pixel position based on a second prediction mode of the current block; and
      determining, based on the first prediction value, the target weight value, the second prediction value and the association weight value, a weighted prediction value of the pixel position; and
   determining weighted prediction values of the current block based on the weighted prediction values of all pixel positions of the current block;
   wherein before determining the target weight value of the pixel position based on the reference weight value associated with the surrounding matching position, the method further comprises:
      configuring reference weight values for the surrounding positions outside the current block,
      wherein the reference weight values of the surrounding positions outside the current block are pre-configured or configured based on weight configuration parameters, and the weight configuration parameters comprise a weight transform rate and a weight transform start position.

2. The method of claim 1, wherein the weight transform start position is determined by at least one of following parameters: the weighted prediction angle of the current block, a weighted prediction position of the current block, or a size of the current block.

3. The method of claim 1, wherein a number of the surrounding positions outside the current block is determined based on at least one of:
   a size of the current block or the weighted prediction angle of the current block, and
   wherein the reference weight values of the surrounding positions outside the current block monotonically increase or monotonically decrease.

4. The method of claim 1,
   wherein the reference weight values of the surrounding positions outside the current block comprise one or more reference weight values of target positions, one or more reference weight values of first neighbouring positions of the target positions, and one or more reference weight values of second neighbouring positions of the target positions, and
   wherein the one or more reference weight values of the first neighbouring positions are all second reference weight values, the one or more reference weight values of the second neighbouring positions are all third reference weight values, and the second reference weight values are different from the third reference weight values.

5. The method of claim 4, wherein,
   the target positions comprise one reference weight value or at least two reference weight values;
   in response to determining that the target positions comprise at least two reference weight values, the at least two reference weight values of the target positions monotonically increase.

6. The method of claim 1, wherein,
   the weighted prediction angle of the current block is a horizontal angle; or,
   the weighted prediction angle of the current block is a vertical angle; or,
   an absolute value of a slope of the weighted prediction angle of the current block is n-th power of 2, wherein n is an integer.

7. The method of claim 1, wherein the surrounding positions outside the current block comprise one or more integer pixel positions or one or more sub-pixel positions, or both one or more integer pixel positions and one or more sub-pixel positions; and
   wherein the surrounding positions outside the current block comprise: surrounding positions neighbouring an upper side of the current block, or surrounding positions neighbouring a left side of the current block.

8. The method of claim 1, wherein determining the target weight value of the pixel position based on the reference weight value associated with the surrounding matching position comprises:
   in response to determining that the surrounding matching position is an integer pixel position and the integer pixel position is set with a reference weight value, determining the target weight value of the pixel position based on the reference weight value of the integer pixel position; and
   in response to determining that the surrounding matching position is a sub-pixel position and the sub-pixel position is set with a reference weight value, determining the target weight value of the pixel position based on the reference weight value of the sub-pixel position.

9. The method of claim 1, wherein the first prediction mode is an inter prediction mode and the second prediction mode is an inter prediction mode.

10. The method of claim 9, further comprising:
    constructing a motion compensation candidate list, wherein the motion compensation candidate list comprises at least two pieces of candidate motion information,
    wherein determining the first prediction value of the pixel position based on the first prediction mode of the current block comprises:
      selecting one piece of candidate motion information from the motion compensation candidate list as first target motion information of the current block; and
      determining the first prediction value of the pixel position based on the first target motion information, and
    wherein determining the second prediction value of the pixel position based on the second prediction mode of the current block comprises:
      selecting another piece of candidate motion information from the motion compensation candidate list as second target motion information of the current block; and
      determining the second prediction value of the pixel position based on the second target motion information.

11. The method of claim 9, further comprising:
    constructing a motion compensation candidate list, wherein the motion compensation candidate list comprises at least two pieces of candidate motion information,
    wherein determining the first prediction value of the pixel position based on the first prediction mode of the current block comprises:
      selecting one piece of candidate motion information from the motion compensation candidate list as first origin motion information of the current block;
      determining first target motion information of the current block based on the first origin motion information; and
      determining the first prediction value of the pixel position based on the first target motion information, and
    wherein determining the second prediction value of the pixel position based on the second prediction mode of the current block comprises:
      selecting another piece of candidate motion information from the motion compensation candidate list as second origin motion information of the current block;
      determining second target motion information of the current block based on the second origin motion information; and
      determining the second prediction value of the pixel position based on the second target motion information.

12. The method of claim 11,
    wherein the first origin motion information comprises a first origin motion vector, the first target motion information comprises a first target motion vector, and determining the first target motion information of the current block based on the first origin motion information comprises:

obtaining a motion vector difference corresponding to the first origin motion vector; and determining the first target motion vector based on the motion vector difference corresponding to the first origin motion vector and the first origin motion vector; and wherein the second origin motion information comprises a second origin motion vector, the second target motion information comprises a second target motion vector, and determining the second target motion information of the current block based on the second origin motion information comprises:

obtaining a motion vector difference corresponding to the second origin motion vector; and determining the second target motion vector based on the motion vector difference corresponding to the second origin motion vector and the second origin motion vector.

13. The method of claim 12, wherein in response to determining that the method is applied to a decoder-side, obtaining the motion vector difference corresponding to the first origin motion vector comprises:

parsing direction information and amplitude information on the motion vector difference corresponding to the first origin motion vector from a coded bit stream of the current block; and determining the motion vector difference corresponding to the first origin motion vector based on the direction information and the amplitude information on the motion vector difference corresponding to the first origin motion vector, and obtaining the motion vector difference corresponding to the second origin motion vector comprises:

parsing direction information and amplitude information on the motion vector difference corresponding to the second origin motion vector from the coded bit stream of the current block; and determining the motion vector difference corresponding to the second origin motion vector based on the direction information and the amplitude information on the motion vector difference corresponding to the second origin motion vector.

14. The method of claim 13, wherein, in response to determining that the direction information indicates a direction being rightward and the amplitude information indicates an amplitude being Ar, the motion vector difference is (Ar, 0);

in response to determining that the direction information indicates the direction being downward and the amplitude information indicates the amplitude being Ad, the motion vector difference is (0, −Ad);

in response to determining that the direction information indicates the direction being leftward and the amplitude information indicates the amplitude being Al, the motion vector difference is (−Al, 0);

in response to determining that the direction information indicates the direction being upward and the amplitude information indicates the amplitude being Au, the motion vector difference is (0, Au).

15. The method of claim 13, wherein parsing the direction information and the amplitude information on the motion vector difference corresponding to the first or the second origin motion vector from the coded bit stream of the current block comprises:

parsing flag information from the coded bit stream of the current block; and in response to determining that the flag information indicates superimposing the motion vector difference on the origin motion vector, parsing the direction information and the amplitude information on the motion vector difference corresponding to the first or the second origin motion vector from the coded bit stream of the current block.

16. A decoder-side device, comprising:

a processor, and a machine readable storage medium, wherein the machine readable storage medium stores machine executable instructions executable by the processor, and the processor is configured to execute the machine executable instructions to perform:

when determining to enable a weighted prediction for a current block, for the current block, obtaining a weighted prediction angle of the current block;

for each pixel position of the current block, determining a surrounding matching position pointed by the pixel position from surrounding positions outside the current block based on the weighted prediction angle of the current block;

determining a target weight value of the pixel position based on a reference weight value associated with the surrounding matching position;

determining an association weight value of the pixel position based on the target weight value of the pixel position;

determining a first prediction value of the pixel position based on a first prediction mode of the current block;

determining a second prediction value of the pixel position based on a second prediction mode of the current block; and determining, based on the first prediction value, the target weight value, the second prediction value and the association weight value, a weighted prediction value of the pixel position; and determining weighted prediction values of the current block based on the weighted prediction values of all pixel positions of the current block;

wherein before determining the target weight value of the pixel position based on the reference weight value associated with the surrounding matching position, further comprising:

configuring reference weight values for the surrounding positions outside the current block, wherein the reference weight values of the surrounding positions outside the current block are preconfigured or configured based on weight configuration parameters, and the weight configuration parameters comprise a weight transform rate and a weight transform start position.

17. A coder-side device, comprising:

a processor, and a machine readable storage medium, wherein the machine readable storage medium stores machine executable instructions executable by the processor and the processor is configured to execute the machine executable instructions to perform:

when determining to enable a weighted prediction for a current block, for the current block, obtaining a weighted prediction angle of the current block;

for each pixel position of the current block,
  determining a surrounding matching position pointed by the pixel position from surrounding positions outside the current block based on the weighted prediction angle of the current block;
  determining a target weight value of the pixel position based on a reference weight value associated with the surrounding matching position;
  determining an association weight value of the pixel position based on the target weight value of the pixel position;
  determining a first prediction value of the pixel position based on a first prediction mode of the current block;
  determining a second prediction value of the pixel position based on a second prediction mode of the current block; and
  determining, based on the first prediction value, the target weight value, the second prediction value and the association weight value, a weighted prediction value of the pixel position; and determining weighted prediction values of the current block based on the weighted prediction values of all pixel positions of the current block;
  wherein before determining the target weight value of the pixel position based on the reference weight value associated with the surrounding matching position, further comprising:
    configuring reference weight values for the surrounding positions outside the current block,
    wherein the reference weight values of the surrounding positions outside the current block are pre-configured or configured based on weight configuration parameters, and the weight configuration parameters comprise a weight transform rate and a weight transform start position.

18. A non-transitory computer readable storage medium, storing at least one machine-executable instruction, wherein the at least one machine-executable instruction is executed by at least one processor to perform the method according to claim 1.

* * * * *